Dec. 12, 1961 F. C. WILLIAMS ET AL 3,012,724

ELECTRONIC DIGITAL COMPUTING DEVICES

Original Filed June 1, 1950 18 Sheets-Sheet 1

ELECTRONIC DIGITAL COMPUTING DEVICES

Dec. 12, 1961 F. C. WILLIAMS ET AL 3,012,724

ELECTRONIC DIGITAL COMPUTING DEVICES

Original Filed June 1, 1950 18 Sheets-Sheet 4

ELECTRONIC DIGITAL COMPUTING DEVICES

Original Filed June 1, 1950

Dec. 12, 1961 F. C. WILLIAMS ET AL 3,012,724

ELECTRONIC DIGITAL COMPUTING DEVICES

Original Filed June 1, 1950 18 Sheets-Sheet 8

ELECTRONIC DIGITAL COMPUTING DEVICES

United States Patent Office 3,012,724
Patented Dec. 12, 1961

3,012,724

ELECTRONIC DIGITAL COMPUTING DEVICES

Frederic Calland Williams, Romiley, Tom Kilburn, Davyhulme, Manchester, Maxwell Herman Alexander Newman, Altrincham, and Geoffrey Colin Tootill, Hawley, Camberley, England, assignors, by mesne assignments, to International Business Machines Corporation, New York, N.Y., a corporation of New York

Original application June 1, 1950, Ser. No. 165,434, now Patent No. 2,810,516, dated Oct. 22, 1957. Divided and this application July 22, 1957, Ser. No. 673,522
Claims priority, application Great Britain June 22, 1949
48 Claims. (Cl. 235—157)

This invention relates to electronic digital computing machines and is particularly, although by no means exclusively, concerned with binary-digital computing systems which employ digital storage or memory devices of the type described in the paper by F. C. Williams and T. Kilburn, Proc. Institution of Electrical Engineers, part III, March 1949, pages 81–100.

This application is a divisional application from application Serial No. 165,434, filed June 1, 1950, by F. C. Williams et al., for "Electronic Digital Computing Devices."

Universal digital computing machines, i.e. computing machines which are intrinsically capable of performing any computation desired, provided that adequate storage is provided, operate by handling a mathematical problem as a series of simple arithmetic operations which can be performed upon numbers which are held in a storage or "memory" within the machine. Such machines, in general, conform to a similar pattern. In these machines there exists a store in which all data required in the solution of a problem is recorded, each element of data having a unique location or "address" defined by its spatial or temporal position or by a combination of both, one or more arithmetic organs, which generally include a subsidiary store or accumulator, in which elementary arithmetical operations can be performed between numbers fed (generally at different times) to the arithmetic organ, and finally a control system which controls the sequence of operations of the machine and orders the necessary transfers of numbers and arithmetical operations.

For any particular problem the programme of operations to be carried out by the machine is broken down into a series of orders, each of which represents an elementary number transfer or arithmetical operation. These orders may be conveniently expressed in code form as numbers and stored in the memory of the computing machine, as part of the data of the problem, until required and called into operation by the control system of the machine. Each step of operation performed by the machine in response to a single order may be reduced in effect to the transfer of a number between the store and some other portion of the machine (in general the arithmetic organ) and an arithmetical operation may or may not occur automatically as a result of the transfer. For example, two numbers may be added by first feeding one number from the store to the arithmetic organ, where it is stored in an accumulator, as a result of a first order or instruction and then feeding the second number from the store to the arithmetic organ, under the control of a second instruction, in such a fashion that it is added to the first number held in the accumulator. The coded order or instruction "words" therefore have to define the addresses in the main store of the machine from which or to which a number transfer is to occur and must also define the other destination or source of the transferred number and any arithmetical operation which is to occur as a result of the transference.

The obeying of each single instruction by the machine may be regarded as the fundamental unit of operation of the machine and the interval involved in the obeying of an instruction is referred to hereinafter as a "bar." A sub-interval or, as it is sometimes referred to, a minor cycle is occupied by the time taken to express within the machine in dynamic form a number or instruction word. Such intervals are referred to as "beats." It is apparent that any number transference must by itself occupy one beat as, in order to transfer a number or word which exists in static form in the store to another address where it is again represented in static form, it is necessary to convert the number or word to dynamic form and that such conversion is the essence of the transfer as any digit of a number or word existing transiently in dynamic form may be employed to recreate its static counterpart immediately in a storage location.

In working through a problem the computing machine normally obeys instructions sequentially and as the instruction words are stored in the main storage system of the machine each instruction word has to be read out in turn in dynamic form, the process of reading involving the transient identification of each digit of a word held in a store and the simultaneous provision of a transient signal representative of the digit, so that the word may effect the necessary control functions in the machine which are requisite for the obeying of the instruction. The sequential selection of instruction words from the store must be performed by a subsidiary controlling function of the machine; the utilization of each instruction word in the store necessarily involves in effect a transfer of that word out of the store and may be effected under the direction of a "control instruction" which is held in a subsidiary storage portion of the machine. It is arranged that upon the completion of the operation of obeying each instruction, the control instruction relating to the next instruction in the sequence to be obeyed is caused to become effective and initiate the events occupying the next bar in the operation of the machine. The control instructions required when instructions recorded in specified addresses in the store are to be selected sequentially may be readily derived, for example, by the operation of a completion signal at the end of each bar.

The automatic process of sequential selection of instructions may require to be broken automatically in certain circumstances. For example, transfer of the control exercised by the control instructions may be required to take place in response to an arbitrary instruction in the sequence, possibly a reversion to an instruction previously used or a jump ahead to a new instruction. Such transfers of control may occur as the result of a test made upon the state of a partial solution existing in the computing machine and the conditional transfer may be produced by appropriate arrangement of the instructions recorded in the store when the programme for the problem on hand was designed. For example, a particular group of $q$ instructions whose addresses may be denoted as $n+1$, $n+2$ . . . $n+q-1$, $n+q$ may be repeated if, at a particular stage in the solution of a problem the partial solution available complies with a certain requirement (e.g. of sign), while if the requirement is not complied with the machine may be required to progress to a new set of instructions. Such a conditional transfer of the control of the machine may be effected by arranging that instruction $n+q-1$ calls for the necessary test of the partial solution and that when instruction $n+q-1$ has been obeyed, causing the machine to proceed either to instruction $n+q$, or by omitting one instruction, to instruction $n+q+1$ in dependence upon the result of the test. Instruction $n+q$ may be designed to cause a backward transfer of control by causing the machine to subtract a quantity $q$ from the control instruction number, the number $q$ being obtained from the store wherein it was originally loaded as part of the data, so that the control instruction reverts to instruction $n$. The instruction $n+q+1$ on the other hand may be designed to allow the solution to proceed. Other arrangements may be made for control transfer; for example, an instruction $n$, selected by the control instruction after an instruction calling for a test has been completed, may require control to be transferred to an entirely new instruction in address location $m$ and this may be achieved by causing the instruction $n$ to replace the control instruction by a number $m-1$ so that the normal sequential selection function performed by the control instruction mechanism causes the instruction $m$ to be next selected. Alternatively, the instruction $n$ may be designed to cause the number $(m-1)-n$ to be added to the existing control instruction number with the same effect.

One existing form of computing machine of the general type outlined above comprises a memory, referred to as the Main Store, which consists of a number of cathode ray tube storage units operating upon the principles described in the aforesaid paper by F. C. Williams and T. Kilburn. The machine operates in the serial mode, i.e. numbers in binary notation are represented dynamically as trains of pulses in common channels and each word occupies an "address" comprising a line or portion of a line on one cathode ray tube of a raster-like pattern applied in common to all the cathode ray tubes in the store. Reading of a particular word in the store, i.e. the observation and reproduction in dynamic form of that word during one beat without destruction of the recorded word may be achieved by scanning of the appropriate address line in the appropriate cathode ray tube of the store. As explained in the aforesaid paper by F. C. Williams and T. Kilburn, the cathode ray tube store systems require for their operation that all the recorded information should be periodically regenerated, and this may be most conveniently carried out by arranging that sequential regeneration takes place during alternate, or so called "scan," beats according to a cyclic pattern while during intervening, or so called "action," beats selected addresses are made "active," i.e. the contents of a single selected address are made available for reading.

The mode of operation of the storage system with such interlaced scan and action beats, when taken in conjunction with the provision of a main store in which both data and instruction words are initially recorded, results in a rhythm of operation for the machine in which each bar normally comprises four beats. The above-mentioned existing machine, in order to operate in this rhythm, comprises in addition to the main store referred to above and an arithmetic organ, two subsidiary stores which perform the controlling function for the machine. These stores, each of which is of the cathode ray tube type, each has a capacity of one word and the first, which was known as the "control register," recorded a number which is referred to in this specification as the "control instruction" and which is effectively a number defining the address in the main store of an instruction which is being currently obeyed, while the second store, which was known as the "current instruction store," acts as an intermediate repository for each "current instruction word" read from the Main Store before that instruction word is fed to perform its address selection and controlling functions. In simple operation during the first (Scan 1) beat of a bar the control instruction number ($n$) is caused to be increased by one, by means of a suitable adding circuit associated with the regenerative loop of the control register store, and the number $n+1$, which is simultaneously read out, performs the selection of the address in the main store of the next instruction to be obeyed. During the next (Action 1) beat the selected instruction word is read out of the Main Store and written into the current instruction store where it is held until the next (Scan 2) beat when it is read out of this subsidiary store and fed to the address selection and routing control mechanism to prepare the source and destination and direction of transfer which will be involved in the word transfer comprised in the obeying of this instruction in the next beat. During the fourth (Action 2) beat this instruction will be obeyed, a number or instruction word being transferred between an address in the Main Store and some other part of the machine (generally the arithmetic organ when a number is being transferred, but possibly the control register if a control transfer is being effected) and will generally be completed in the single beat. If, however, the instruction is one which calls for an arithmetic operation occupying more than one beat then provision is made for holding up the initiation of the next bar until the scan beat following the beat in which the completion of instruction occurs. In the aforesaid existing machine it was assumed that the instruction words represented in a coded form the address in the Main Store and the address in the arithmetic organ (or elsewhere) between which a number transfer was to be effected and that one digit of the instruction word defined the direction in which the transfer was to occur.

The object of the present invention is to provide an improved computing machine similar in general principle to such existing machine previously referred to in which economy of apparatus, increased facilities of operation and enhanced operating speed may be achieved.

According to one feature of the invention the machine comprises a main storage device for recording both number and instruction data to be employed in the solution of a problem, an arithmetical organ for performing a chosen operation upon or between numbers or words fed thereto from said main storage device and a control system including means for storing and utilising a control instruction word and means for storing and utilising a particular or present instruction word selected and transferred from said main storage device under the control of said control instruction word characterized in that the storage of both said control instruction word and said present instruction word are effected within a single storage unit.

According to another feature of the invention the selection of the desired data from the main storage device and the controlling of the subsequent operation to be performed therewith within the machine are effected through the intermediary of different digit portions of a common instruction word.

According to a further feature of the invention the machine is provided with means for testing a partial solution and, in accordance with the result of such test, effecting conditional transfer of the control of instruction word selection to one or more different instruction words.

As already explained, machines of the general form described normally operate in a rhythm of four beats to a bar but in accordance with yet a further feature of the invention a second storage device is provided for recording instruction words and the operation of the machine then arranged to take place in a bar consisting of two beats only during the first of which a chosen instruction word is read out from said second storage device and is used to prepare means for selecting a data item from the first or main storage device and to prepare means for performing the required arithmetical or other operation while during the second beat such operations upon said data are obeyed whilst the control means simultaneously select the next instruction word in the second storage device in readiness for the next following operation. Such feature of the invention is particularly adapted for use with storage devices which require repeated regeneration of the data held therein in which case the respective regeneration or scan beats and the operative or action beats of the first and second storage devices are interleaved so that the instruction storage device performs an action beat while the main storage device performs a scan beat and vice versa.

In many applications the maximum number of digits required for the composition of the coded instruction word is less than half the number of digits which are required to provide the chosen maximum number capacity of the machine. The storage of these smaller words in positions within a storage device capable of accommodating the required maximum size of number or word is obviously wasteful and in accordance with yet another feature of the invention a computing machine employing digital storage or memory devices, such as cathode ray tube devices, for recording separate items of numerical or coded instruction data of predetermined maximum magnitude at locations which each have a unique address within the device is provided with arrangements for recording a plurality of items of appropriately smaller maximum magnitude within one unique address location of said device. Conveniently selection of any desired one of such plurality of items is performed upon a time-division basis.

The design and size of a given machine is governed largely by the maximum number of digits required in any number to give the desired degree of precision. While economic factors may restrict the maximum chosen to a value capable of properly handling only the majority of problems which may require to be solved, there are not infrequently occasions, such as when many arithmetical operations are performed in succession upon the input numbers or if the latter are raised to high powers, when it may be necessary to use in the expression of any one number, a greater number of digits than the chosen maximum of the machine, and in accordance with yet a further feature of the invention, the facility for doing this is provided in a machine operating in the serial mode and including an arithmetical organ which comprises a storage device of the cathode ray tube type wherein the maximum number of digits of a basic number or word are normally accommodated within one line scan on the screen of said tube by arranging the arithmetical organ to have a storage capacity of two lines, each line being capable of storing one basic word or number.

With a view to increasing the flexibility of the machine it is frequently arranged that stored instruction words can themselves be modified from time to time in order to carry out an extended range of different functions. This is customarily effected by treating the instruction word as a number and passing it through the arithmetical organ where the desired alteration is made by the simultaneous feeding to such organ of a modifying word. Such a process involves waste of normal operating time of the machine and in accordance with yet a further feature of the invention a subsidiary storage device capable of storing one or more words is provided and the machine is arranged so that, in its normal operation, as each instruction word is read out of its normal storage location and is fed to the control system of the machine, it is passed through a modifying device whereby it may, if desired, be modified by the simultaneous application to such device of a word from said subsidiary storage device.

In order that the various features of this invention may be readily understood a detailed description of one complete universal digital computing machine together with detailed descriptions of a number of further modifications will now be given in conjunction with the accompanying drawings in which:

FIGS. 1*a* and 1*b* form, in combination, a block schematic diagram of a complete digital computing machine in accordance with certain features of the present invention.

Figures 7, 10, 14:
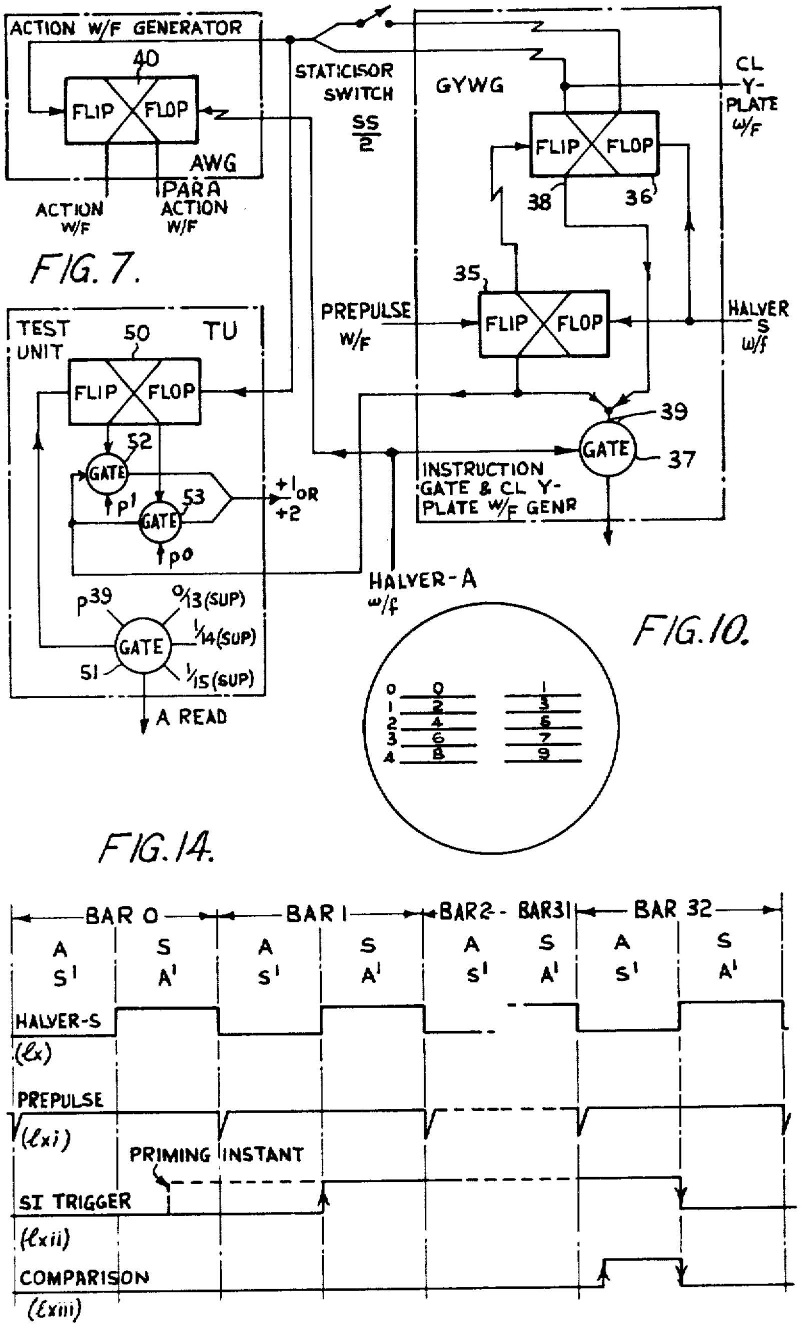
FIG. 7 is a more detailed block schematic diagram of the Instruction Gate and Y-Plate waveform generator for the control unit of FIG. 1*a*.
FIG. 10 is a diagrammatic view of a storage tube screen showing the storage arrangements for shortened instruction words according to a further modification of the invention.
Figure 11:
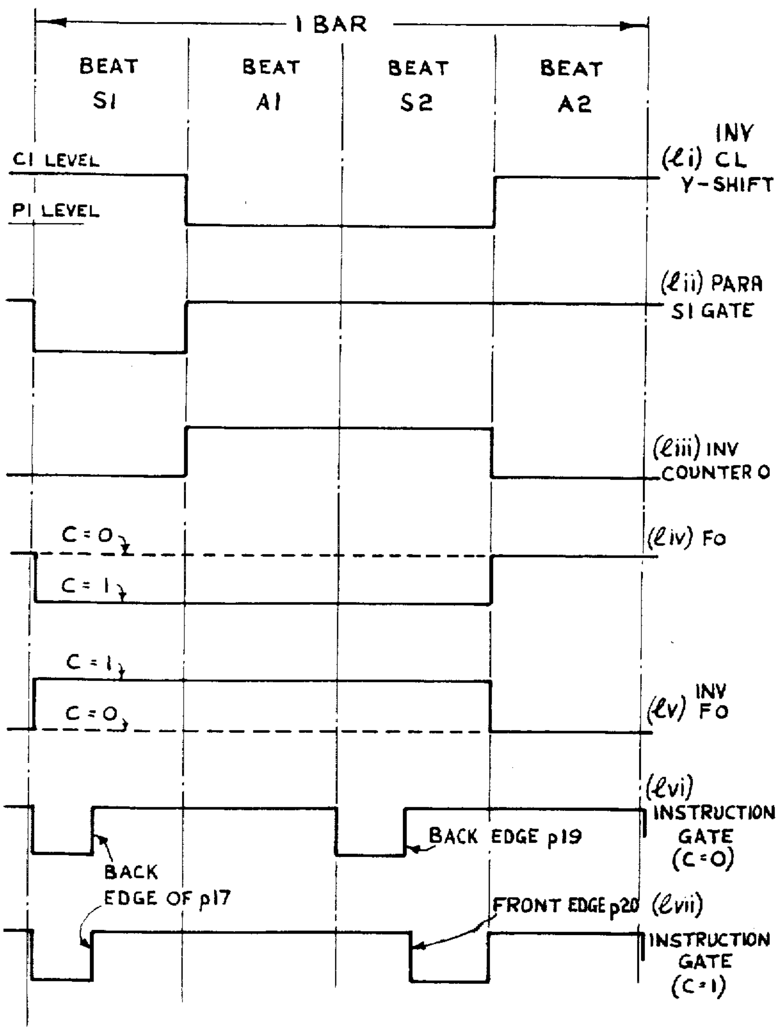
FIG. 11 is a series of waveform diagrams relating to the modification shown in FIG. 10.
Figure 12A:
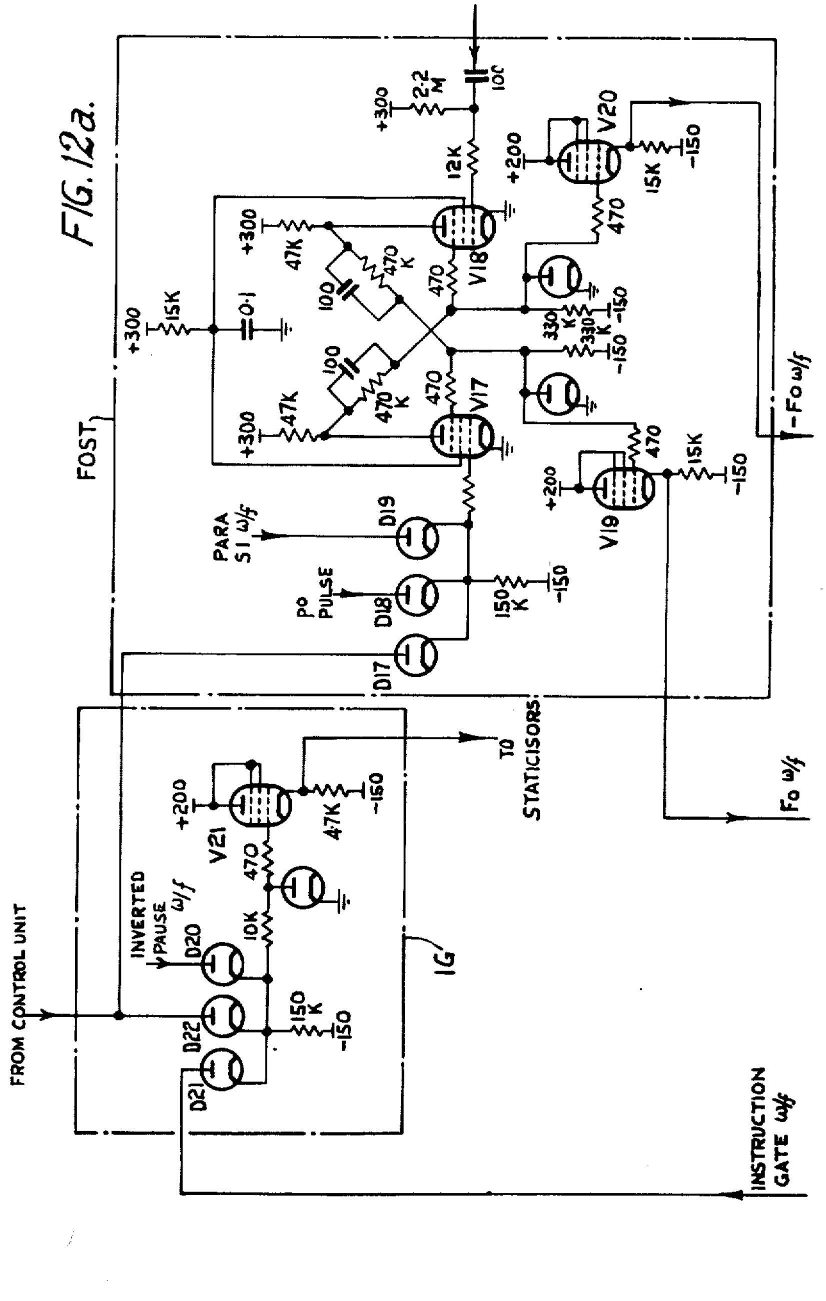
Figure 12B:
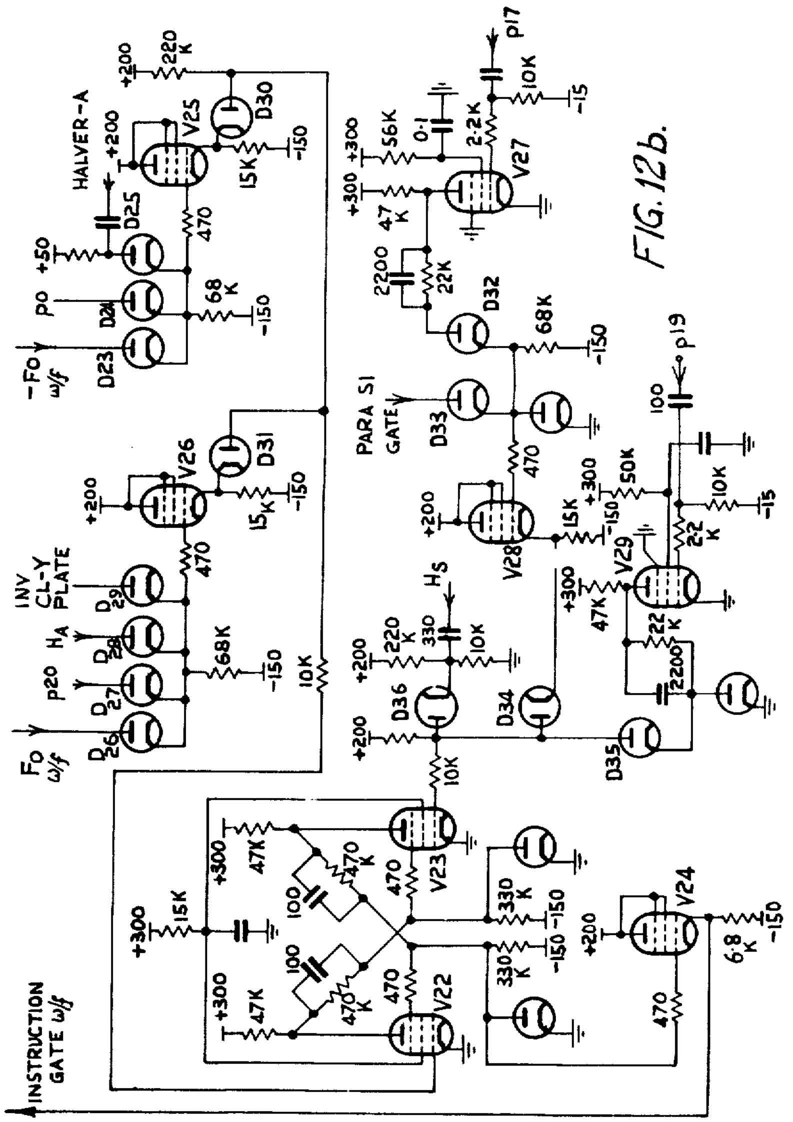

FIGS. 12*a* and 12*b* show a detailed circuit arrangement for the special F staticisor unit required in a machine similar to that of FIG. 1 but modified in accordance with the further embodiment illustrated in FIGS. 10 and 11.

Figure 13:
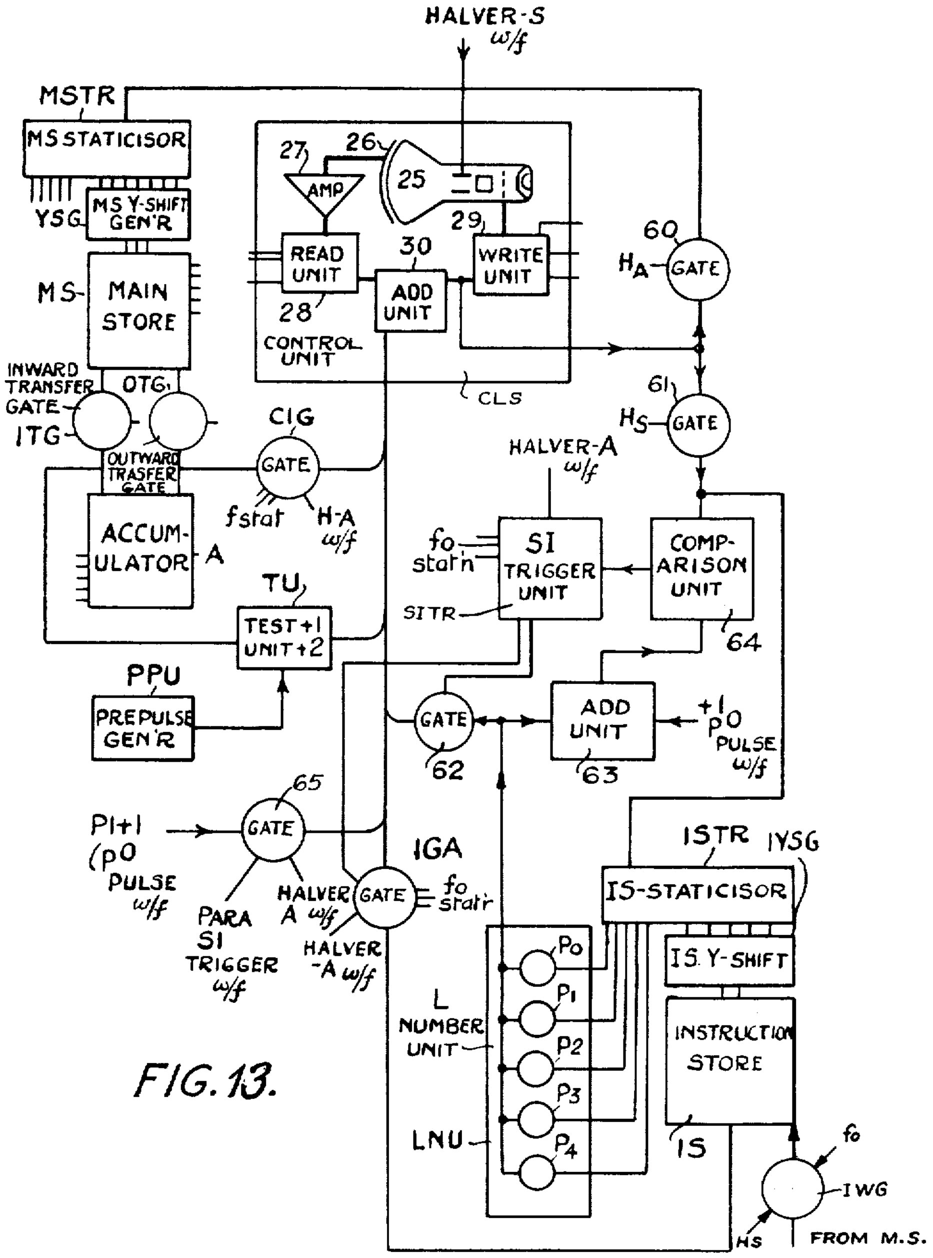

FIG. 13 is a block schematic diagram, again generally similar to FIG. 1 but illustrating yet a further modification of the invention.

FIG. 14 shows a number of waveform diagrams illustrating the modification of FIG. 13.

Figure 15:
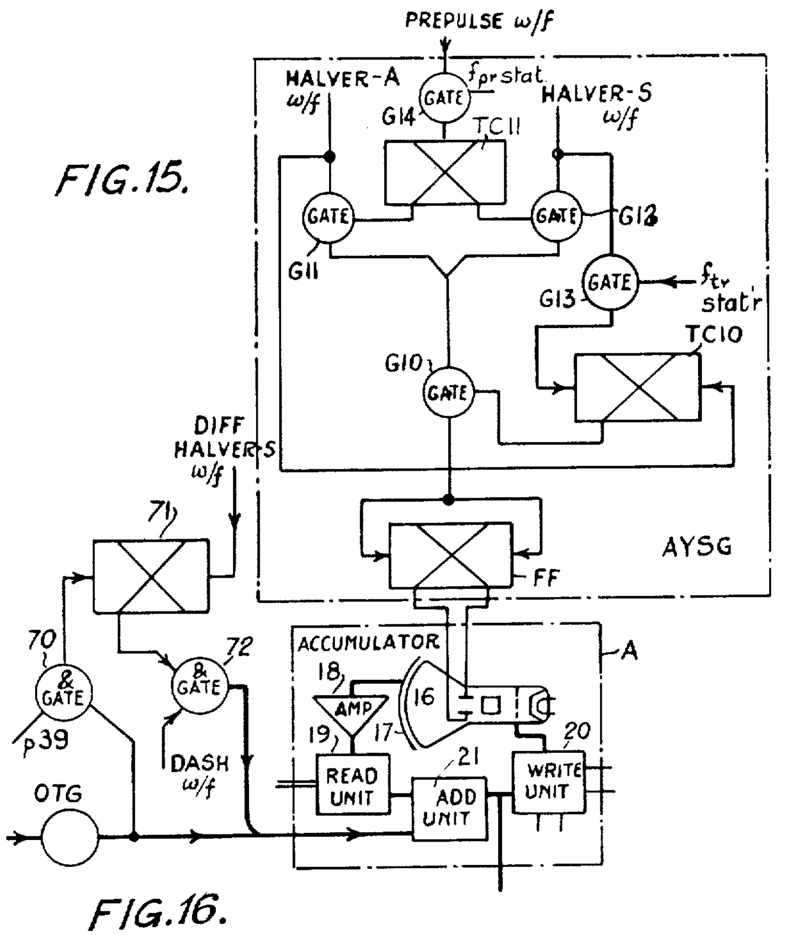

FIG. 15 is a block schematic diagram of a portion of the machine shown in FIG. 1 and relating to yet a further modification of the invention.

Figure 16:
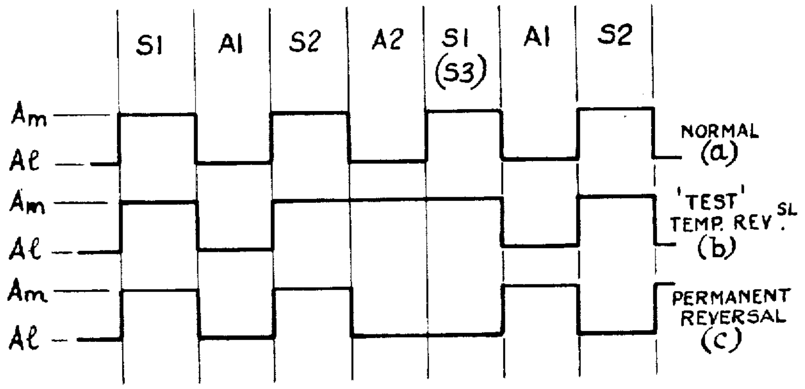

FIG. 16 shows a number of waveform diagrams related to the arrangement of FIG. 15.

Figures 17, 18:
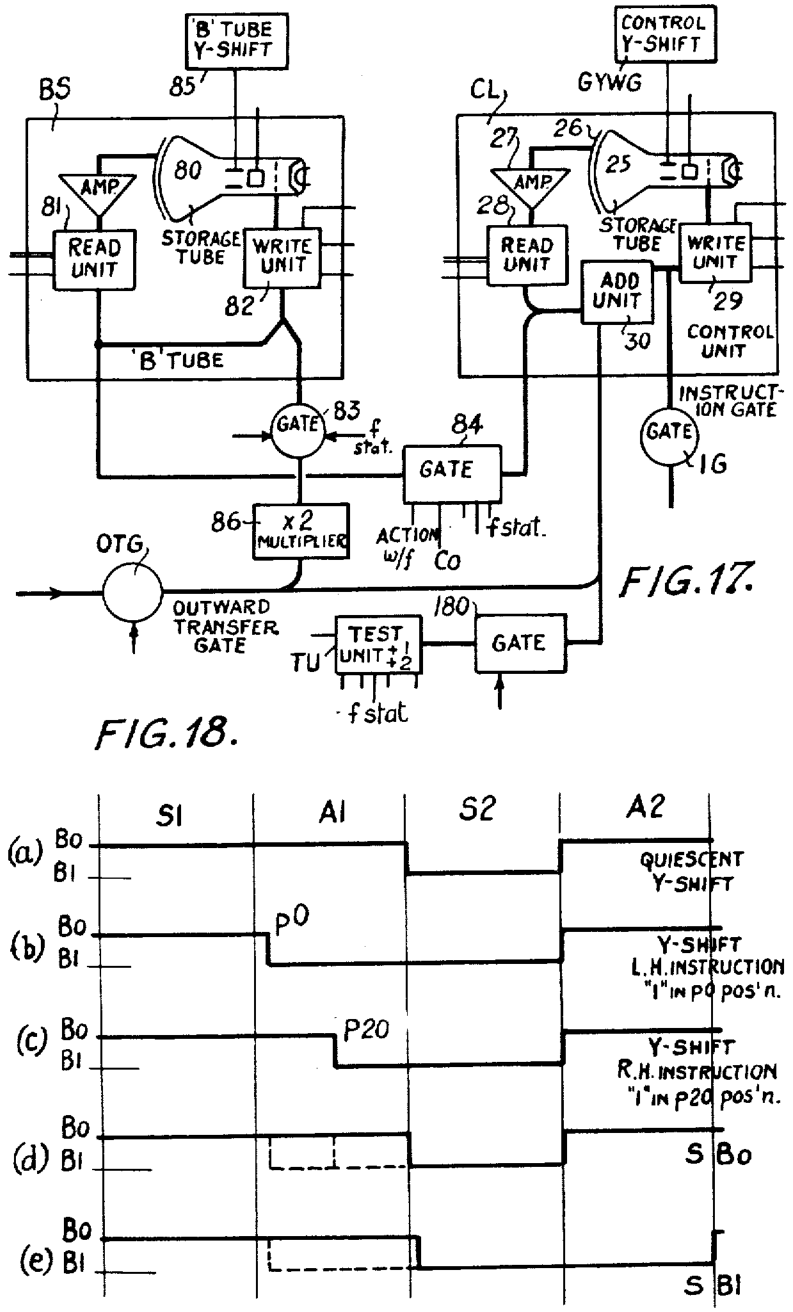

FIG. 17 is a further schematic block diagram of fragmentary character showing certain further modifications of the arrangement shown in FIG. 1 to explain another modification of the invention.

Figure 19:
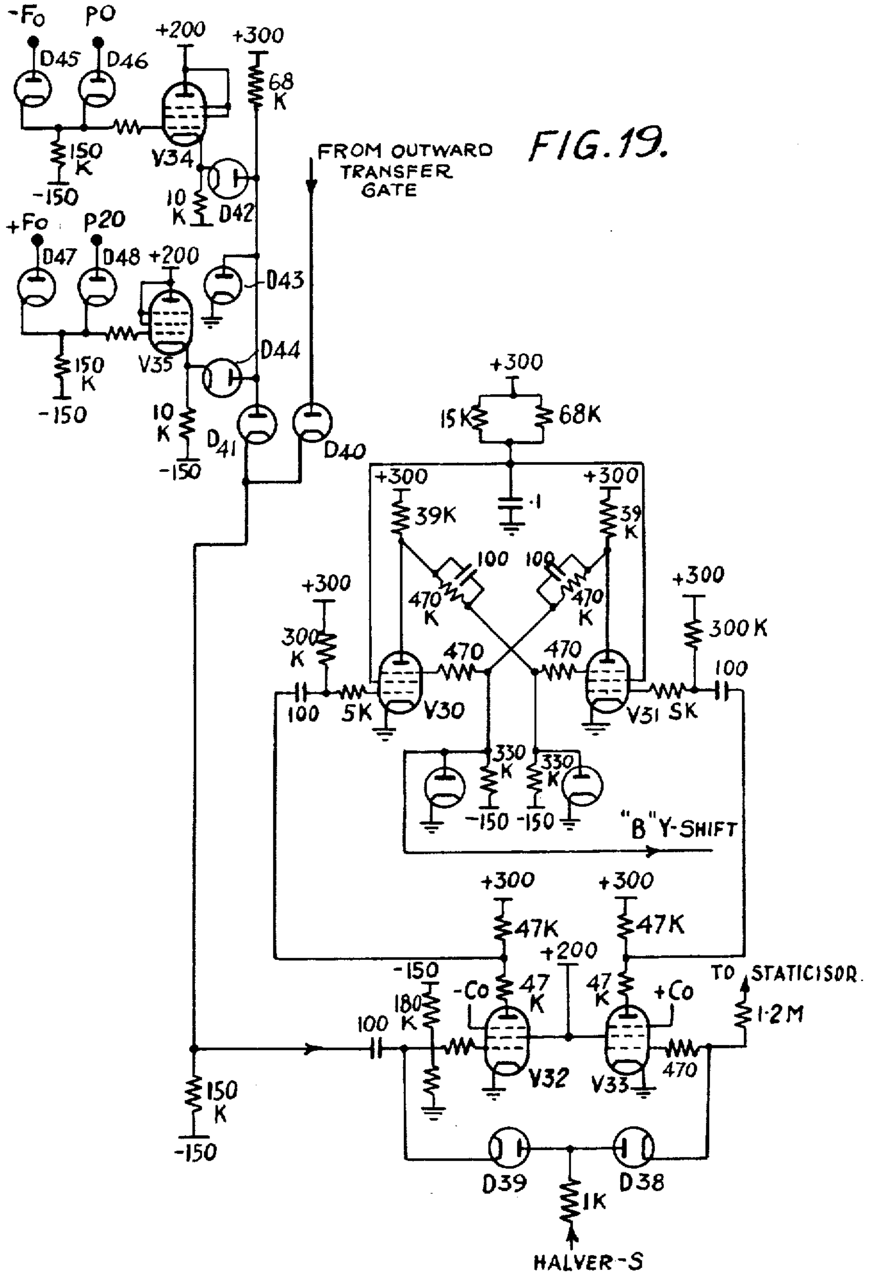

FIG. 18 comprises a series of waveform diagrams related to the arrangement of FIG. 17, while FIG. 19 is a detailed circuit arrangement for generating the particular form of Y-shift waveform disclosed in FIG. 18.

Figure 1A:
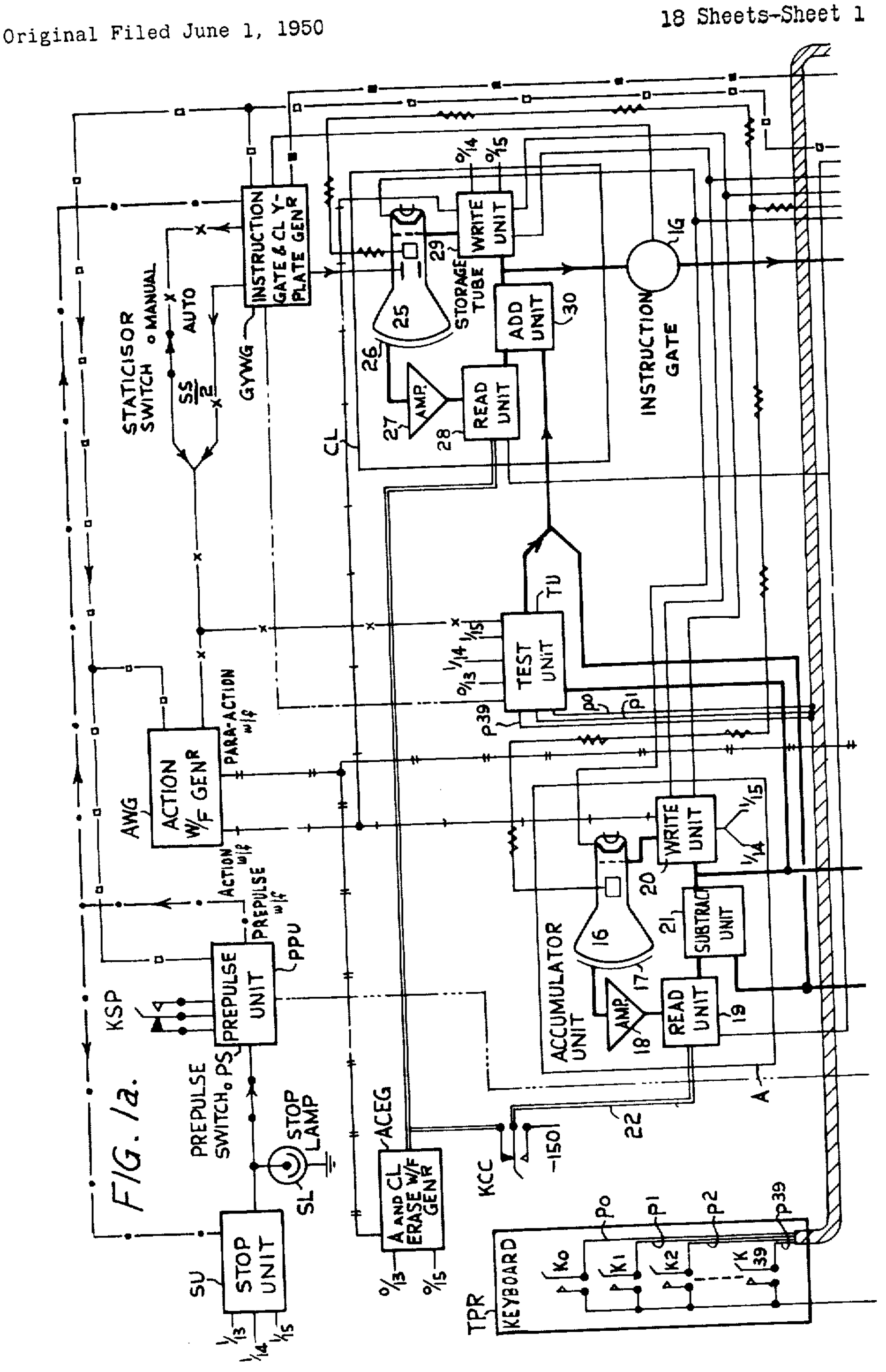
Figure 1B:
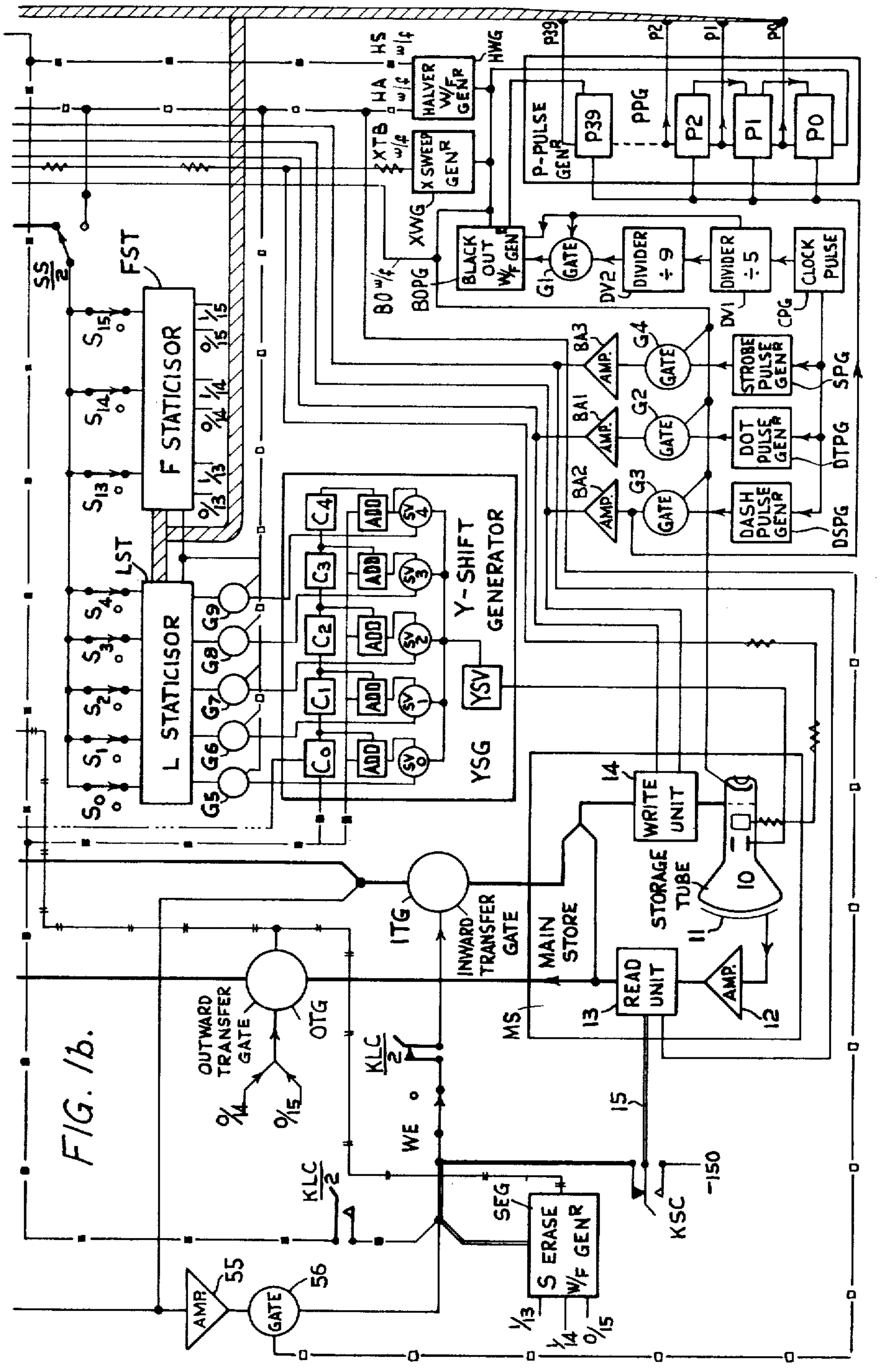
Figure 20:
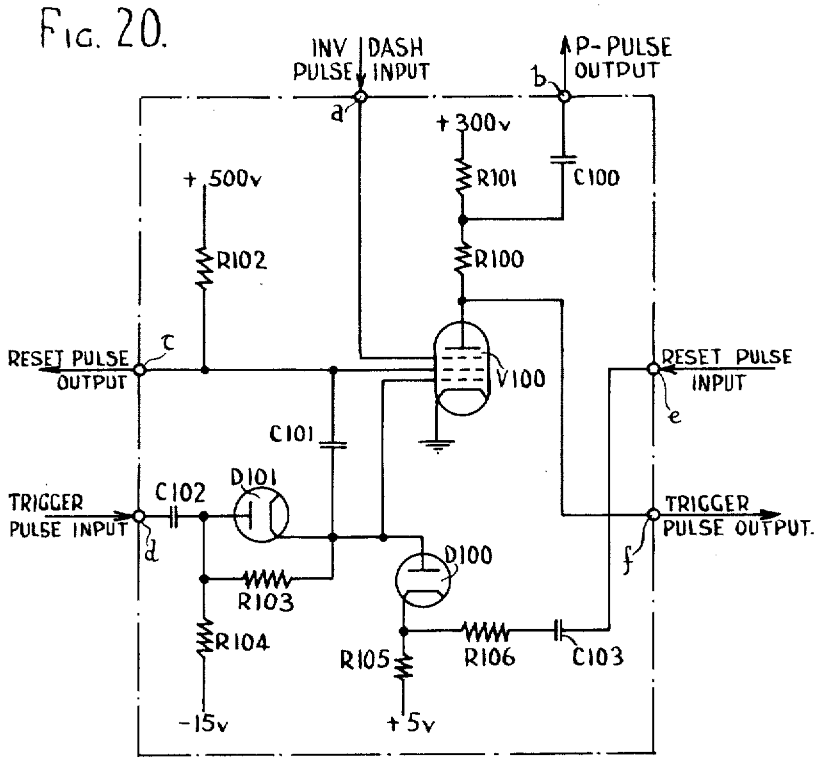
Figure 21:
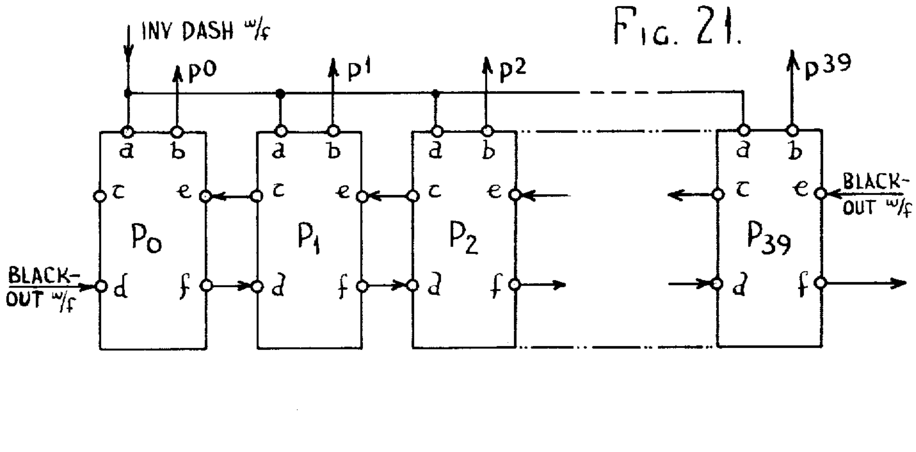

FIG. 20 is a detailed circuit diagram of one element of the pulse generating circuit PPG, FIG. 1*b* while FIG. 21 is an amplified block schematic diagram showing the interconnection of a plurality of such elements to form the complete device.

Figure 22:
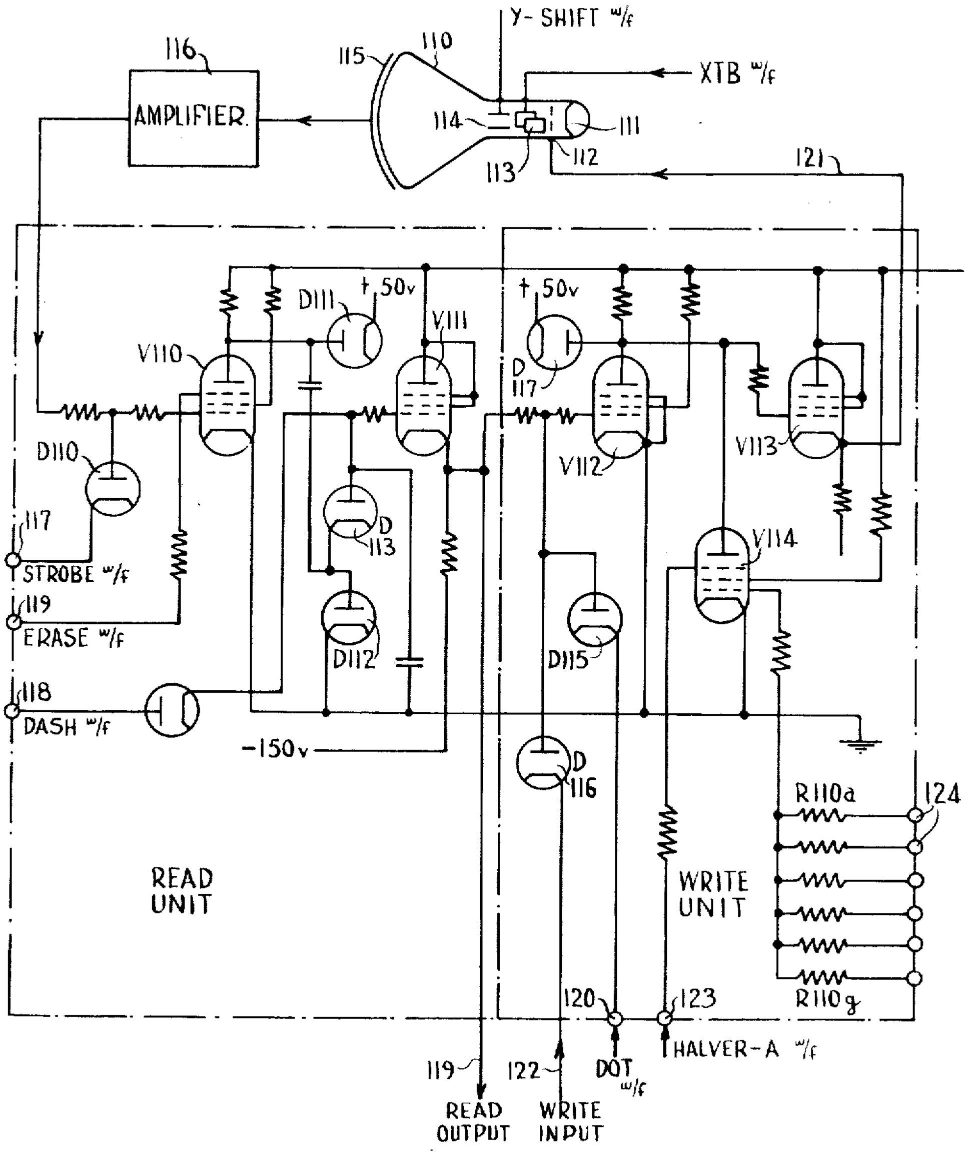

FIG. 22 is a part schematic, part detailed circuit diagram of a cathode ray tube storage device as employed in the Main Store MS, the accumulator, the control unit CL and other elements of the machine.

The general arrangement and method of operation of the particular embodiment chosen for illustration of the invention will first be described in broad outline with reference to the schematic diagram of FIGS. 1*a* and 1*b*. This machine operates under the binary system and is of the serial type. It utilises for various "memory" or storage purposes cathode ray tube storage means of the kind described in the aforesaid paper by F. C. Williams and T. Kilburn, wherein each binary digit "0" or "1" of a number or the equivalent coded address or instruction word is represented by one or other of two, e.g. "dot" or "dash" forms of discrete electric potential charge upon the screen of a cathode ray tube. The group of sequential dot and dash charges comprised in each number or word are arranged along the whole or part of a single linear deflection scan of the cathode ray tube beam so that, when required, a plurality of such numbers or words may be recorded and stored side by side, by causing the beam to provide a television type raster. Selection of any desired number or word can then be achieved by arranging for the appropriate positioning of the tube beam in the transverse or "Y" direction before commencing its linear or "X" scanning movement.

The machine shown in FIGS. 1*a* and 1*b* comprises a Main Store MS (FIG. 1*b*) which includes one or more cathode ray tube storage devices as referred to above arranged for side-by-side or raster type line storage and provided with the necessary ancillary apparatus by which numbers or words, in the form of pulse trains, can be written thereinto, read out therefrom, erased or continuously regenerated. Associated with this Main Store MS is a Y-Shift generator unit YSG for providing the requisite transverse or Y-deflection to the beam of the cathode ray tube of the Main Store for selecting any chosen one of the raster lines. The operation of this unit YSG is itself controlled during certain portions of the operation cycles of the machine by an L-Staticisor unit LST (FIG. 1*b*) whose function is to translate a dynamic pulse form signal into suitable static control voltages for the unit YSG whereby the latter provides a deflection of the tube beam in the Main Store MS to a raster line whose address is that indicated by the pulse signal fed to the staticisor unit.

The machine shown is capable of performing one simple type of arithmetical operation only, namely subtraction and this is effected in the arithmetical organ or Accumulator A (FIG. 1*a*) which includes a single cathode ray tube storage device arranged to deal with only one number or word at a time and provided with the requisite writing, reading, erasing and regenerating ancillary apparatus.

The control of the various elements of the machine during each bar in obedience to the particular instruction of the moment is effected by the control unit CL (FIG. 1*a*), which includes a single cathode ray tube storage device arranged for two-line storage and provided with the requisite ancillary apparatus for effecting writing in, reading out, erasing and regenerating each of the two stored words. This ancillary apparatus also includes means by which an externally applied number, in the form of a pulse signal, may be added to a word already in the store.

The necessary transverse or Y-deflection of the beam of the cathode ray tube in the control unit CL in order to deal with the appropriate one of the two stored words, is controlled by an Instruction Gate and Y-Plate waveform generator unit GYWG (FIG. 1*a*) which is itself controlled in its operation by certain fundamental timing waveforms existing within the machine.

The machine being described operates at a rhythm of four beats to each bar and the initiation of each bar is controlled by a special pulse waveform, hereinafter called a "prepulse" generated within a Prepulse Unit PPU. This unit is provided with a manually operable key KSP which serves, when thrown, to cause the release of a single prepulse only.

For the purpose of automatically changing the instruction word at the end of each bar so that the various sequential operations as defined by the programme laid down for the machine are effected in order the Test Unit TU (FIG. 1*a*) is provided and serves, in combination with the ancillary adding apparatus of the control unit CL, normally, to add 1 to the address number of a word stored in the latter. This test unit TU also comprises means for determining the compliance or otherwise of a solution number existing within the Accumulator A with a certain requirement, e.g. of its sign, and dependent upon the result of such test, for altering the aforesaid addition of 1 to an addition of 2.

For the purpose of stopping the automatic cyclic operation of the machine under certain circumstances there is provided a Stop Unit SU (FIG. 1*a*) with which is associated a warning or Stop Lamp SL.

A typewriter TPR (FIG. 1*c*) provided with a plurality of keys each significant of a different one of the total number of digit positions available in each number or instruction word is provided for initial setting up and testing purposes.

The routing of the various signals between units of the machine and the choice of its manner of operation are controlled through the intermediary of a number of gate or equivalent circuits among which are the Inward Transfer Gate ITG (FIG. 1*b*), the Outward Transfer Gate OTG (FIG. 1*b*) and the Instruction Gate IG (FIG. 1*a*). These gates and other circuits are controlled by the static voltage levels provided at different terminals of a further staticisor unit, the F-Staticisor unit FST (FIG. 1*b*) which, in similar manner to the L-Staticisor LST, above referred to, is itself controlled by portions of a dynamic pulse form signal fed thereto.

A change-over or Staticisor Switch (FIG. 1*a*)

$$\frac{SS}{2}$$

serves to convert the machine from automatic to manual operation while a series of switches, normally closed when the machine is in the automatic running condition, permit the setting of the L-Staticisor LST and the F-Staticisor FST in any desired one of their various conditions without the need of a special input pulse signal when operating under manual control. Similarly a Write/Erase key (FIG. 1*b*)

$$\frac{KLC}{2}$$

and a key (FIG. 1*b*) KSC permit correction of any entry under manual control conditions or clearance of the Main Store.

A number of further waveform generators governing the operation of the machine including an X-scan generator XWG (FIG. 1*b*) by which the beams of all the cathode ray tubes used are caused to scan in the X-direction in unison during each beat interval, subject to their being brightened to operative level. These waveforms and their generators will be referred to and described later in the more detailed description of the various parts. In broad outline the operation of the machine is as follows:

The initial setting up of the various number and instruction words in the Main Store MS is effected manually. To accomplish this the Staticisor Switch (FIG. 1*b*)

$$\frac{SS}{2}$$

is thrown to the manual position (i.e. opposite to that shown) and the appropriate Y level of the cathode ray tube in the Main Store MS at which recording is desired is then selected by closure of the appropriate one or combination of Switches S0–S4 associated with the L-Staticisor unit LST. Operation of any one of the keys K0–K39 (FIG. 1*a*) of the typewriter TPR serves to record a dash symbol at the appropriate position along the length of the particular raster line occurring at the chosen Y level. By repeated selection of different Y-levels by means of switches S0–S4 and operation of the appropriate typewriter keys any desired number of the various lines of the Main Store may be filled with the requisite mathematical numbers and the related instruction words for the desired computation.

Number words related to the mathematical quantities being dealt with will consist of an appropriate collection of binary digits up to the maximum capacity of one line of the tube which, in this case, is forty digits.

The instruction words will in general comprise two separate sections, the first consisting of a group of binary digits, which are related to and serve to signal the particular address, i.e. the particular line or Y-level in the Main Store MS at which a desired number word is located and a second section, again composed of a collection of binary digits which serve to signal and control the nature of the function which is required to be carried out on the particular number chosen by the previous address section of the word. In general with a machine of the simplest type described a total of five binary digit symbols will suffice to select any desired address level while a total of three binary digit symbols is sufficient to set up any of the different function operations which can be carried out. Accordingly the 1st, 2nd, 3rd, 4th and 5th digits of the word are used to signal the address and the 14th, 15th and 16th digits to signal the functional operation.

If erasure is desired at any time during this manual setting-up operation it can be effected by throwing keys $$\frac{KLC}{2}$$

and KSC. Regeneration of the information recorded in the Main Store is effected during each alternate (scan) beat and therefore starts immediately after insertion of any digit so that the numbers or words put into the store are available for use or alteration indefinitely thereafter.

Assuming all the required number and address words have been inserted in the Main Store MS then the normal automatic operation cycle can be initiated. This is effected by throwing the Staticisor Switch $$\frac{SS}{2}$$

to its autoposition (as shown) whereupon continuous operation on the basis of four beats to every bar will commence. Each beat will be initiated by a prepulse from the Prepulse Unit PPU. During such automatic operation in the first (Scan 1) beat regeneration takes place in all storage units and while it is doing so in the control unit CL a control instruction number ($n$) already stored in control unit CL on one, the CI line, of its two levels will be increased by 1 automatically by a pulse sent out from the test unit TU and the resultant new number ($n+1$) simultaneously read out of the control unit CL through the opened Instruction Gate IG to the L-Staticisor LST where the 1st and 5th digits of the number will set such L-Staticisor to a condition which provides a series of static output voltages for controlling the Y-shift generator YSG during the next following (action) beat such as will adjust the Y-level of the Main Store MS during that action beat to that of the next instruction number which is to be read out from the Main Store MS.

On the next (Action 1) beat there is no regeneration anywhere but the newly selected or present instruction number is read out from the Main Store MS through the opened Outward Transfer Gate OTG into the store CL at the alternative or P.I. level of the latter. The beam scanning level of the storage tube of this unit is suitably altered by a waveform supplied from the unit GYWG.

In the next following (Scan 2) beat, the new, present instruction word in the store CL is read out through the Instruction Gate IG to the F-Staticisor FST and the L-Staticisor LST. The F-Staticisor is operated by the 14th–16th digits of such words to provide a series of different voltages which when applied to the various circuit elements such as the Inward and Outward Transfer Gates ITG and OTG, the erase, writing, adding, subtracting or reading circuits of the various store units serve to set up the necessary routing and control arrangements for the particular function operation next to be performed. The address digits, i.e. the 1st to 5th digits of the same word cause similar operation in the L-Staticisor LST to reset the Y-shift generator YSG for the Main Store MS to the particular new level of the number stored in the Main Store MS which is next required to take part in the chosen operation.

In the fourth (Action 2) beat the aforesaid present instruction is obeyed by the transference of the selected number out of the main store MS over the particular path and through the operation of the appropriate other units as selected by the F-Staticisor FST to a destination which will normally be the Accumulator A.

In the next following operation the control instruction ($n+1$) previously existing at the first (C.I.) level in the unit CL is again increased by 1 whereupon the cycle is repeated substantially along the lines described. By arranging that the successive present instruction words read out from the Main Store define the required programme of operation, the required computation will be completed automatically.

If, at a certain point in the programme of operation, the next step is conditional upon the result of the partial solution at that point, then the present instruction brought into use from the Main Store is arranged to cause a testing operation by the unit TU which, according to the result obtained, either causes continuance with one sequence of instruction words by again providing the addition of 1 to the control instruction in control unit CL or, alternatively, by providing the addition of 2 to such number causes diversion to a fresh series of present instruction words. The completion of the programme or the suspension of operation at any time is arranged to cause operation of the Stop Unit SU which suspends the operation of the Prepulse Unit PPU and illuminates the Stop Lamp SL.

In the particular machine described the Accumulator or arithmetic unit A is adapted when required to cause subtraction of a given number written in from that already stored in the accumulator tube but of course a variety of other arrangements such as for effecting addition or multiplication may be used instead or even provided at the same time and selected by appropriate gating operation from the F-Staticisor.

In addition to the manual insertion of information into the store it may be necessary, either for initial setting up purposes or for subsequent test purposes, to operate the machine one bar at a time instead of according to a continuous automatic cycle. For this purpose the switch $$\frac{SS}{2}$$

is held in the manual position and the appropriate function set by operation of one or more of the switches S13 to S15 associated with the F-Staticisor. The operation of the machine is then initiated for one bar only by operation of key KSP.

The various units and their manner of operation will now be described in greater detail. The basic timing of the machine shown in FIGS. 1*a* and 1*b* is controlled by a clock pulse generator circuit CPG (FIG. 1*b*) which provides a series of square pulses whose period time is 8.5 microseconds. These pulses shown in diagram (*i*) of FIG. 2 will hereinafter be called Clock pulses. The time period of a total of 45 of these Clock pulses is assigned to each beat of the machine and of this period the time required by 5 Clock pulses is assigned to the requisite flyback motion of the beam of each cathode ray tube storage device before each linear scanning motion leaving a total of 40 Clock periods for the actual composition of each number or word. The dynamic form signal for each digit of a number or word is arranged to fall within the period of 1 Clock pulse and the machine therefore has a capacity, as already stated, of 40 digits in each number or word.

Figure 2:
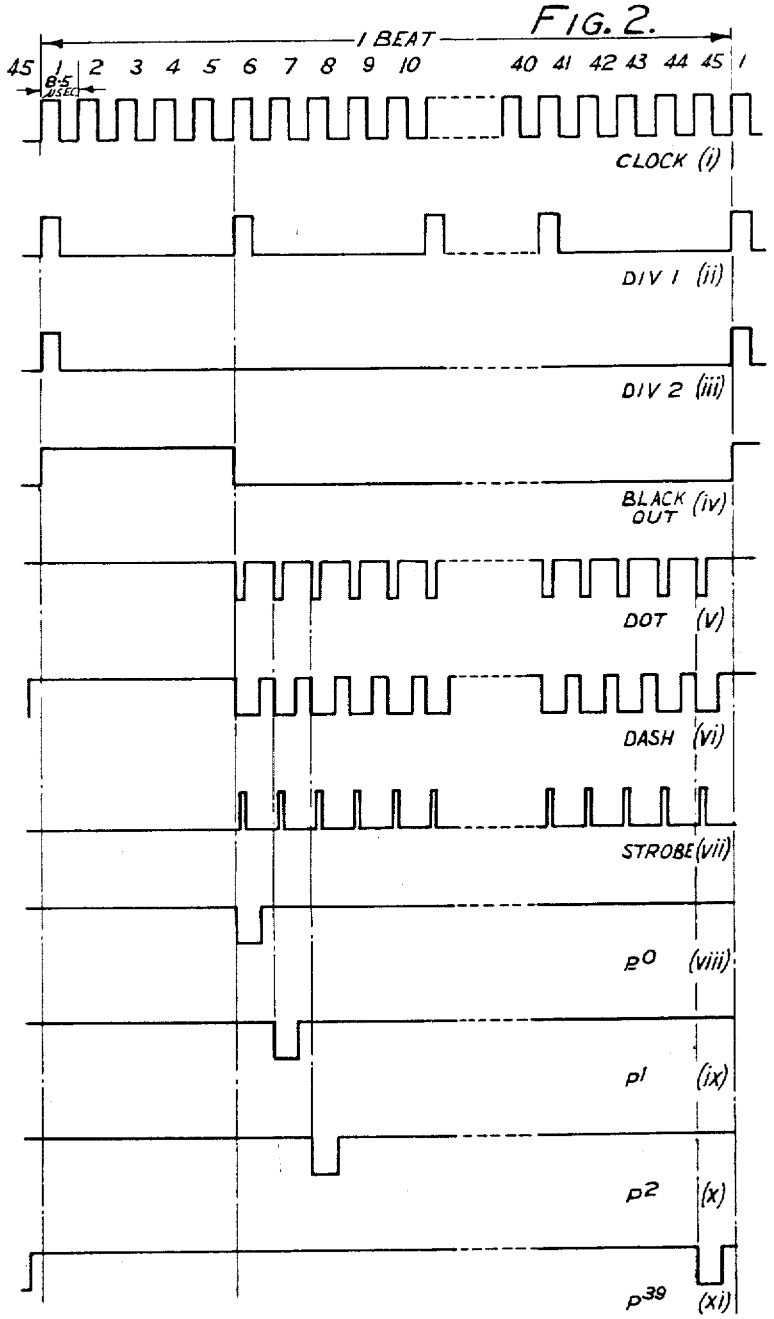
FIGS. 2, 3, 4 and 5 illustrate a series of waveform diagrams relating to various parts of the machine shown in FIGS. 1*a* and 1*b*.

The Clock pulses are applied to a divider circuit DV1 (FIG. 1*b*) which can be of any suitable form to provide an output pulse for every five input pulses as shown in waveform (*ii*) of FIG. 2. These pulses will hereinafter be called DIV1 pulses and are then applied to a further divider circuit DV2 which again is of any suitable form to provide an output pulse for every nine input pulses as shown in waveform (*iii*) of FIG. 2. These pulses, which occur one in synchronism with each 45th Clock pulse will hereinafter be referred to as the DIV2 pulses.

The pulses from divider circuit DV1 are applied as one triggering input to a flip-flop circuit BOPG, the other triggering input of which is supplied from the divider circuit DV2 by way of a gate circuit G1 which is opened by the further supply thereto of the pulses from the divider circuit DV1. The consequential output from circuit BOPG is a waveform as shown in diagram (*iv*) of FIG. 2, consisting of positive going square pulses during the period of Clock pulses 1 to 5 and then a quiescent period until the end of Clock pulse 45 and so on. This waveform which is used to ensure suppression of all the cathode ray tube beams during the flyback time following each line scan, will hereinafter be called the Black-Out waveform.

The requisite repetitive saw-tooth waveforms for causing linear scanning movement of the various cathode ray tube beams in the X direction are provided by the X-time base generator XWG (FIG. 1*b*) which is controlled by the Black-Out waveform so that the flyback portion commences at the instant of commencement of each positive going Black-Out pulse and the linear scanning portion at the instant of termination of each Black-Out pulse. One of the two (push-pull) X-time base waveforms, hereinafter called the XTB waveform is shown in diagram (*xiii*) of FIG. 3. The time scale of this diagram together with that of the redrawn Black-Out waveform (*iv*) has been reduced by 4 as compared with FIG. 2 to illustrate the 4 complete beats of a single bar S1, A1, S2 and A2.

As explained in detail in the aforesaid paper by F. C. Williams and T. Kilburn the setting up of one or the other of the two different forms of discrete charge upon the cathode ray tube screens, representative respectively of the binary digits "0" and "1" is effected by intensity modulation of the tube beam for time periods of different lengths whereby, due to the concurrent X scanning movement of the beam, a "dot" or a "dash" charge pattern is provided. For effecting such beam modulation the machine is provided with a dot pulse generator DTPG (FIG. 1*b*) and a dash pulse generator DSPG each of which are supplied with the Clock waveform to initiate triggering of suitable pulse generating circuits, the constants of the circuit of DTPG being such as to provide a series of two microsecond negative going pulses each coincident with a Clock pulse as shown in diagram (*v*) of FIG. 2 and the corresponding constants of the circuit of DSPG being such as to provide a series of five microsecond pulses each coincident with a Clock pulse as shown in diagram (*vi*) of FIG. 2. By supplying the output from each of the circuits DPTG and DSPG through gate circuits G2 and G3 which are controlled by an output from the Black-Out waveform generator BOPG the Dot and Dash pulses are inhibited during the time of the first five Clock pulses of each complete beat of 45 pulses so as to provide a series of separate groups of Dot and Dash pulses, 40 in number, and each coincident in time respectively with Clock pulses 6 to 45. These Dot and Dash waveforms are conveniently made available through buffer amplifiers BA1, BA2.

In order to allow selection of specific ones of said Dot or Dash pulse series and for other similar purposes there are provided a group of 40 single pulse waveforms, each on separate leads and each consists of a single 5 microsecond pulse coincident in timing with one or other of the Dash pulses. These waveforms will hereinafter be referred to as the "*p* pulses" and diagram (*viii*), FIG. 2, shows the first of the group comprising a negative-going pulse synchronised in time with the first Dash pulse and called, for convenience in computing, the "*p*0" pulse since it coincides with the position in the group of 40 pulses, of the lowest significant figure $2^0$ in the binary scale (for convenience, the order of significance of the digit positions is assumed to increase from left to right). The next pulse of the group, the "*p*1" pulse (denoting $2^1$ in the binary scale) is shown in diagram (*ix*), FIG. 2, and is coincident in time with the second Dash pulse while diagrams (*x*) and (*xi*) respectively illustrate the next or "*p*2" pulse ($2^2$) and the last or "*p*39" pulse ($2^{39}$). The intervening pulses of the group are not shown since their form will be obvious. These "*p*" pulses are conveniently produced, in the manner described in detail later with reference to FIGS. 20 and 21 by a series of trigger circuits PPG (FIG. 1*b*) all of which are supplied with the Dash waveform. Normally each circuit is in inoperative condition and produces no output but each can be conditioned for operation by the application of a positive transient voltage in readiness to provide an output pulse coincident with the arrival thereat of the next Dash pulse. The first trigger circuit $p^0$ of the series is conditioned by the application thereto of the Black-Out waveform while the subsequent trigger circuits $p^1$ to $p^{39}$ are each conditioned by voltages derived from the immediately preceding circuit. The last circuit $p^{39}$ is reset by the leading edge of the next following Black-Out pulse from the circuit BOPG. For convenience in illustration the various output leads from the *p* pulse generator are shown collectively as a single multiple conductor and the significance of any particular single conductor from such multiple is indicated by the addition of the particular *p*-pulse number involved thereagainst at its point of attachment to any unit.

As described in detail in the aforesaid paper by F. C. Williams and T. Kilburn the reading or interpretation of an already stored charge pattern on a cathode ray tube screen is effected by sampling a portion only of each discrete charge as the cathode ray tube beam is sweeping thereacross and for the purpose of controlling such sampling or reading instants a further series of pulses, hereinafter called the Strobe pulses are provided. These pulses which are shown in diagram (*vii*), FIG. 2, are positive-going and have about one microsecond duration commencing at instants slightly later than the leading edges of the Dot and Dash pulses. They are derived in the circuit shown from a pulse generator circuit SPG (FIG. 1*b*) triggered from the Clock pulse waveform and fed, in similar manner to the Dot and Dash pulses, through a gate circuit G4, controlled by the Black-Out pulses, to a buffer amplifier BA3.

As already referred to, the natural decay of the cathode ray tube charge patterns with time, owing to leakage necessitates their frequent and repeated regeneration and this is effected where necessary in the machine described by assigning alternate X-time base scans to regeneration and using the intervening scans for operational purposes. These periods are those known as the scan and action beats respectively, each four beat bar therefore comprising a Scan 1 beat, an Action 1 beat, a Scan 2 beat and an Action 2 beat. For the purpose of effecting control of various elements during these alternate beats, two further square waveforms, at half the frequency of the Black-Out and XTB waveforms are provided as shown in diagrams (*xiv*) and (*xv*) of FIG. 3. They are derived from square wave generator circuit HWG (FIG. 1*b*) comprising a flip-flop circuit triggered from one state to the other by the Black-Out waveform. One output comprising positive-going half cycles coincident with the scan beat periods will hereinafter be referred to as the Halver-S waveform while a second paraphase output having its positive-going half cycles coincident with the action beat periods will hereinafter be referred to as the Halver-A waveform.

Figure 3:
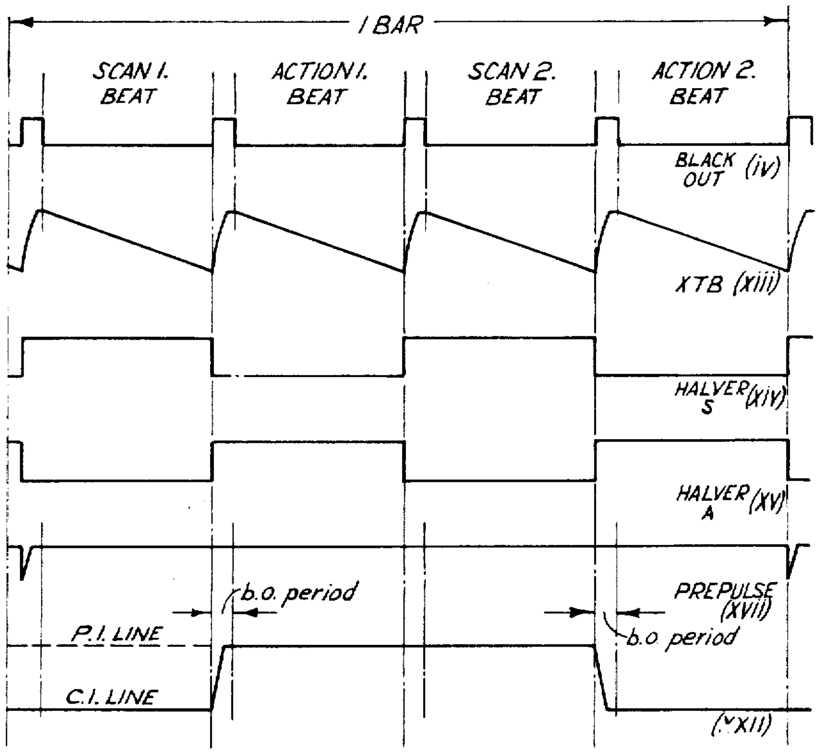
Figure 5:
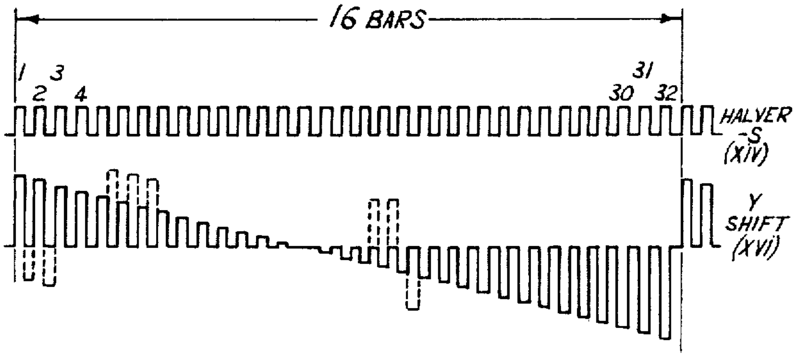
Figure 4:
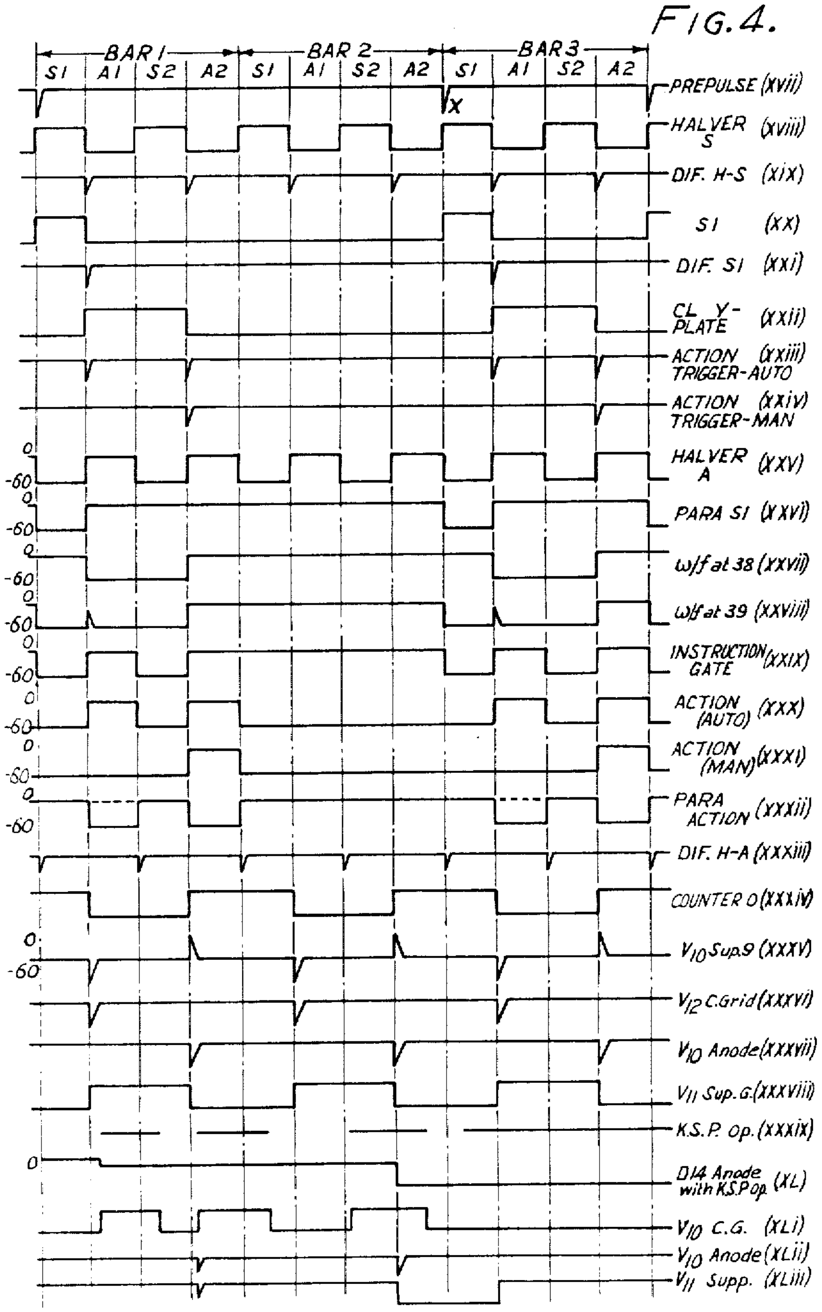

The necessary transverse or Y deflection of the cathode ray tube beam of the Main Store MS is effected by a stepped waveform as shown in diagram (*xvi*) of FIG. 5 which is still further reduced in its time scale as compared with FIGS. 2, 3 and 4 to show a complete Y scan cycle occupying the time period of some 32 lines in the complete raster corresponding to a storage capacity of 32 separate words or numbers. The Halver-S waveform to which this Y-Shift waveform is time related has been redrawn to the same time scale in diagram (*xiv*), FIG. 5. As will be seen the Y-Shift waveform comprises a series of separate square pulses of progressively changing amplitude with the intervening and equal time periods at a, normally, common voltage level. The aforesaid differing pulses coincide in timing with the scan beat periods of the Halver-S wave and consequently provide for the progressive shift of the tube beam in the Y or transverse direction whereby regeneration of each stored word or number is effected regularly and in turn by the X-Scan movement which takes place during each of these scan beat periods. The intervening voltage level periods coincide in time with the action beat periods of the Halver-S wave and, as described in the aforesaid paper by F. C. Williams and T. Kilburn and as referred to later, the voltage level of any one of these intervening periods can be set to any one of the 32 levels marked by the aforesaid differing or scan period pulses for the purpose of selecting any one of the storage lines of the charge pattern raster during an action period. Examples of such change of voltage level of the intervening periods is indicated in dotted lines in diagram (*xxxv*), FIG. 5.

The above described Y-Shift generator circuit YSG (FIG. 1*b*) resembles that described in detail in FIG. 35 of the aforesaid paper by F. C. Williams and T. Kilburn and comprises a cascade of scale-of-two-counter circuits C0, C1, C2, C3 and C4 supplied at the first counter circuit C0 with the Halver-S waveform. Each counter produces square waves which are successively submultiples of the Halver-S wave frequency. The output of each counter circuit is added to the Halver waveform and is then applied as one of two alternative controlling inputs to an associated switching valve SV0, SV1, SV2, SV3 and SV4 and the respective outputs from each of the latter valves, when combined in suitable proportions serve to provide a controlling potential for a Y-Shift valve YSV which by its two opposite phase outputs provides the requisite push-pull Y-Shift waveforms for the cathode ray tube or tubes of the main store. The alternative controlling inputs for the switching valves SV0 to SV4 is provided by the L-Staticisor circuit LST already referred to and which will be described in detail later. This circuit serves to select under the control of the 1st to 5th digits of an instruction word signalled to the L-Staticisor, such combination of switching valves SV0 to SV4 for their operation during an action beat period of the Y-Shift waveform as will set such Y-Shift in the cathode ray tube of the Main Store at the required level to deal with the chosen line of the raster containing the required number or instruction word. In spite of this change during any action beat, the next following scan beat automatically continues regeneration of the raster line immediately following that which was regenerated in the previous scan beat so that although the raster line circuit during successive action beats may shift from one to the other of any of the 32 lines of the store tube, regeneration takes place during intervening scan beat periods smoothly and regularly.

A number of other waveforms are involved in the machine but the form and production of these will be dealt with at the time of description of the unit with which they are concerned.

The Main Store MS (FIG. 1*b*) closely resembles in general form that described in the aforesaid paper by F. C. Williams and T. Kilburn and will be described in greater detail later with reference to FIG. 22. Broadly it comprises the cathode ray tube 10 with pick-up plate 11 and a regenerative loop comprising an amplifier 12, reading unit 13 and writing unit 14 whose output is connected to the modulation grid of the tube. The X-deflector plates are supplied from the X-time base generator XWG while the Y-deflector plates are supplied from the Y-Shift generator YSG. For the purpose of sampling only the first portion of each stored charge, whether it be a dot or a dash, the read unit 13 is supplied with the Strobe waveform as described in said paper by F. C. Williams and T. Kilburn. During regeneration of this storage tube in each scan beat a series of dot signals are continuously written into the tube by the write unit 14 under the control of the Dot waveform applied thereto and a dot is accordingly always provided at each digit position unless the presence of a dash signal exists in the input to the write unit whereupon a fresh dash signal, derived from the Dash waveform also supplied to the write unit, is made to extend the dot pulse to cause recording of a dash. Such dash signal input to the write unit can be derived either from an external input from the Inward Transfer Gate ITG or from the signal plate 11 by way of the regenerative loop of amplifier 12 and read unit 13. By such arrangement it is clearly possible to erase any existing dash pulse signal in the storage tube by the simple process of breaking the regenerative loop during the period of such signal whereupon a dot is automatically written in its place. This erasure can be effected by applying over lead 15 a suitable waveform for inhibiting or blocking the operation of the read unit 13 at the appropriate time instants. The output signal from the pick-up plate 11, as existing in the storage tube 10 at any particular instant, can be read out from the unit 13 and made available to the rest of the machine through the Outward Transfer Gate OTG.

The arithmetical organ or Accumulator A (FIG. 1*a*) comprises a storage device of the kind described in the aforesaid paper by F. C. Williams and T. Kilburn and also dealt with later in connection with FIG. 22. It includes a cathode ray tube 16 with pick-up plate 17, amplifier 18, read unit 19 and write unit 20 whose output is connected to the modulation grid of the cathode ray tube. This particular tube, being concerned with only single line storage is not provided with any form of Y-Shift but is, of course, applied with the XTB waveform from the X-time base generator circuit XWG. The write unit 20 is supplied with both Dot and Dash waveforms for operation in the manner as already described in connection with the main store and the read unit 19 is similarly supplied with the Strobe pulse waveform for the requisite sampling control. This Accumulator A, however, is provided with an additional arithmetical element comprising a subtracting unit 21 located between the read unit 19 and write unit 20 and external writing input to the Accumulator A is fed as a second input to this subtracting circuit. The operation of this circuit is such that the additional write input to the subtracting unit 21 may be subtracted from the number content already in the Accumulator and the result re-written into the storage tube 16 and provided simultaneously as an external read output if required. Alternatively, it may be arranged that, by applying an appropriate erasing wave to the read unit 19, e.g. to the suppressor grid of a gate valve, such as that of valve V110, FIG. 22, which selects the transient signals from the amplifier 18, so as to break the regenerative loop, then the external write input to the subtracting unit 21 will in effect, be subtracted from zero since there is no stored number present within the tube 16 and the result will be a number which is minus the number represented by the original write input to the subtractor unit 21. This minus number or complement is written into the tube 16 of Accumulator A. Such subtracting arrangements are already very well known in the computer art and have been described and discussed in the literature such as, for example, the various "Progress Reports" upon the EDVAC machine made by the Moore School of Electrical Engineering, University of Pennsylvania.

The required inhibition of the reading unit 19 is effected by the application, when required, of suitable potentials to a controlling gate circuit. The provision of these potentials necessary to alter the normal subtracting operation of the Accumulator unit A from one which deals with the existing word or number already in store to one which subtracts from zero to provide a complement, is effected by the F-Staticisor FST which will be described later.

The control unit CL (FIG. 1*a*) is effectively a combination of a control register and a current instruction store and comprises a single cathode ray storage tube 25 provided with a pick-up plate 26 and a regenerative loop consisting of amplifier 27, read unit 28, write unit 29 feeding the modulation grid of the tube 25 with its output. This tube has its X-deflector plates supplied from the X-time base generator XWG and has its Y-deflector plates supplied from the unit GYWG. In this circuit is included an additional adding unit 30 to which an external writing input may be fed and, for an action analogous to that of the subtraction within the Accumulator A, such external writing input may either be added arithmetically to the number already existing within the store, or, alternatively, by applying a suitable erasing control to the read unit 28, may be written into the storage tube 25 in place of the number already existing on the particular line of the two lines available which is being scanned. The form and organisation of adding circuits are already very well known in the computer art and have been widely discussed in the literature, see for example, the various "Progress Reports" upon the EDVAC machine made by the Moore School of Electrical Engineering, University of Pennsylvania, Proc. I.R.E., December 1948, pages 1452–60; "A Digital Computer for Scientific Applications," by West and Deturk; and U.S.A. patent specification No. 2,429,227, filed June 11, 1945, by P. J. Herbst.

Figure 6:
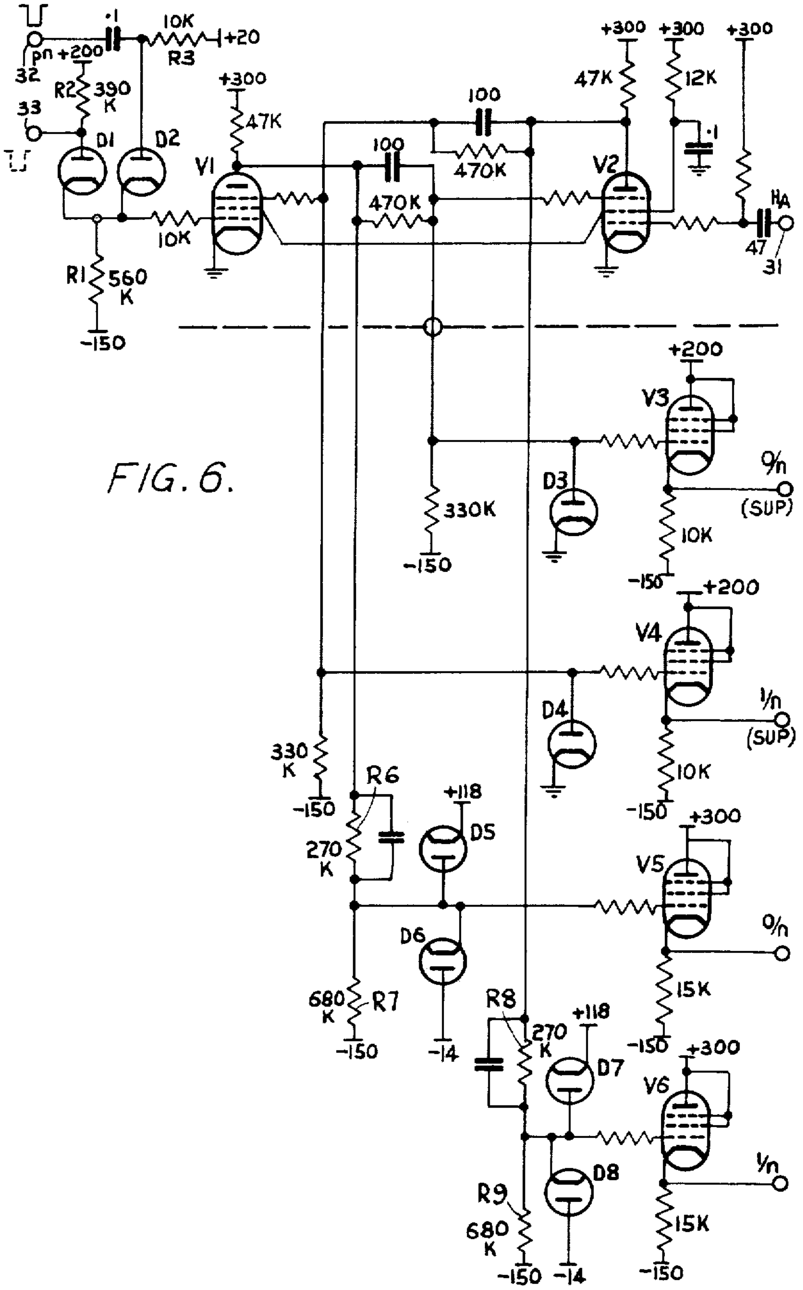
FIG. 6 is a detailed circuit diagram of one section out of several similar sections of the L and F Staticisor units of FIG. 1*b*.

The F-Staticisor (FIG. 1*b*) comprises a plurality, in the present case three, identical sections one for each of the function-determining digits of the instruction word which is to be staticised thereby. FIG. 6 shows the circuit arrangement of one staticisor section *n* corresponding to the $(n+1)$th digit of the word. This element comprises a two-state trigger circuit of valves V1, V2 provided with anode-to-suppressor-grid cross coupling. The quiescent condition of the trigger circuit is that in which V1 is conducting to its anode and this state is maintained or the element is reset to it at the commencing of every scan beat by negative pulses derived by differentiation of the Halver-A waveform which are supplied to the control grid of valve V2 by way of terminal 31. The positive-going differentiated pulses which occur at the commencement of each action beat period of the Halver-A waveform are ineffective owing to the positive bias supply for the control grid of valve V2.

A gate circuit of the multiple diode type controls the triggering input to valve V1 and comprises diodes D1 and D2 with a common cathode resistor R1 returned to a source of negative potential and whose anodes are returned respectively to positive potential sources by way of resistors R2, R3. The anode of diode D2 has applied thereto by way of terminal 32 the particular *p*-pulse waveform applicable to the digit concerned, i.e. either the *p*13, the *p*14 or the *p*15 waveform in the present machine while the dynamic instruction word or other input controlling voltage is applied to the anode of the other diode D1 through terminal 33. This latter voltage is supplied through the related manual setting switch S13, S14 or S15 shown in FIG. 1*b*. Both input voltage pulses are negative-going but neither will be effective to depress the potential of the control grid of valve V1 unless they occur simultaneously for the reason that only when both diodes are cut off will the common cathode point move negatively. When this occurs, i.e. when a Dash pulse exists in the dynamic instruction word coincidental with the particular digit position of the staticisor section concerned, valve V1 is cut off at its suppressor grid and the circuit is triggered.

Four alternative outputs are made available from this staticisor element to provide controlling voltage levels which, by appropriate selection, can have desired values for application to the various gate and other circuits throughout the machine which determine the path of transfer of any signal and also the particular form of operation which is performed by the machine during any one bar of operation. These four alternative outputs are derived across the cathode load resistances of cathode follower valves V3, V4, V5 and V6. Valve V3 derives its controlling input from the suppressor grid of valve V2 while valve V4 similarly derives its controlling input from the suppressor grid of valve V1 so that in the quiescent ("0") condition of the staticisor element when valve V1 is conducting to its anode the potential at the output terminal 0/*n* (sup) of valve V3 is —60 volts whereas the potential at the corresponding terminal 1/*n* (sup) of valve V4 is 0 volts. The diodes D3 and D4 are provided to fix the zero voltage levels obtained at these output terminals. When the staticisor element is triggered to the opposite or "1" condition by the input of a dash or equivalent potential to the anode of diode D1 in coincidence with the occurrence of a suitable negative voltage, e.g. the particular *p* pulse for the element at the anode of diode D2, then the potential distributions are reversed and the 1/*n* (sup) terminal falls to —60 volts and the 0/*n* (sup) terminal rises to zero volts. The other output terminals 0/*n* and 1/*n* are similarly fed through the cathode follower valves V5 and V6 from tapping points on potential divider networks of resistors R6, R7 and R8, R9 connected between a source of negative potential and the anodes of valves V1 and V2 respectively. Diodes D5, D7 with their cathodes connected to a source of positive potential (+118 volts) and diodes D6, D8 with their anodes returned to a source of negative potential (—14 volts) limit the excursions of the grids of valves V5 and V6 with the result that in the quiescent or "0" condition of the staticisor element the 0/*n* terminal is at —10 volts and the 1/*n* terminal at +120 volts. These conditions are similarly reversed when the element is triggered to the "1" condition.

The L-Staticisor LST (FIG. 1*b*) comprises a plurality of sections in similar manner to the F-Staticisor and the circuit arrangement of each section is substantially identical with that of FIGURE 6 except that the four output cathode follower valves V3, V4, V5 and V6 with their associated diode circuits shown below the dotted line are omitted and a single output is taken from the suppressor grid of valve V2 to the associated switching valve of the Y-Shift generator YSG. Such output from each staticisor section is taken to the switching valve of the Y-scan generator by way of a gate circuit, G5 . . . G9, FIG. 1*b*, which is itself controlled by the Halver-A waveform so as to be open only during action beats. In this way the staticisor can be set up during a scan beat while the normal sequential scanning raster is being provided by the Y-scan generator and then rendered instantly effective upon the latter at the beginning of the following action beat. There are five such elements in the L-Staticisor with the respective inputs to the anodes of their diodes D2 comprised of the *p*0, the *p*1, the *p*2, the *p*3 and the *p*4 *p*-pulse waveforms so as to select the chosen address defining digits of the dynamic instruction word. The inputs to their respective diodes D1 are supplied in common with those of the F-Staticisor from the Staticisor Switch SS through manual switches S0 to S4 like the F-Staticisor, the presence of "1" dashes at any digit position can be simulated in the manual operation condition by the closure of the appropriate one of said manual switches.

The switches S0–S4 and S13–S15 are provided so that when the Staticisor Switch $$\frac{SS}{2}$$

is in the manual position and the instruction word normally supplied from the control unit CL is replaced by the Halver-A wave the presence of "1" digits is simulated in all elements wherever the manual switch happens to be closed so that opening of any manual switch simulates the presence of an "0" at the corresponding digit position with the consequent facility of setting up either staticisor manually in any one of its various states so as to provide any one of the corresponding function or address selecting controls.

The unit GYWG (FIG. 1*a*) which provides the necessary waveform to control the Instruction Gate IG and also the waveform to shift the beam of the storage tube 25 of the control unit CL between one or the other of its two alternative scanning levels to deal respectively with the CI and PI words is shown in schematic form in FIG. 7. The portion of this circuit which generates the Y-Shift waveform for the cathode ray tube 25 comprises two cascade connected trigger circuits 35 and 36 each comprising flip-flop type arrangement triggered in one direction by one input and reset by a second separate input. The trigger circuit 35 is set by each prepulse, i.e. the pulse signal which initiates the operation bar of the machine and shown in diagram (*xvii*) of FIG. 4 which is again further reduced in its horizontal time scale as compared with FIG. 3 in order to show several complete bar periods. The circuit 35 is reset by negative-going pulses shown in diagram (*xix*) of FIG. 4 obtained by differentiating the Halver-S which is also redrawn in FIG. 4 in diagram (*xviii*). The trigger circuit 35 provides two output waveforms which are respectively positive and negative-going during the S1 beat immediately following a prepulse. These waves are indicated at diagrams (*xx*) and (*xxvi*) of FIG. 4 and are hereinafter referred to as the S1 and the Para-S1 waveforms. The S1 waveform is differentiated and the negative-going pulse selected as shown in diagram (*xxi*) of FIG. 4. This pulse is then used as a triggering input to the second trigger circuit 36 which is again reset by differentiated Halver-S waveform of diagram (*xix*). This resetting action is arranged to occur at the end of Scan 2 beat by making the differentiation of the S1 waveform with a slower time constant. The resultant waveform provided from one side of the trigger circuit is as indicated in diagram (*xxii*) of FIG. 4 and will hereinafter be referred to as the CL Y-Plate waveform.

A waveform as indicated in diagram (*xxix*) of FIG. 4 and hereinafter referred to as the Instruction Gate waveform is produced in a gate circuit 37 by feeding thereto the Halver-A wave redrawn in diagram (*xxv*) of FIG. 4 and the combination of the paraphased S1 waveform, diagram (*xxvi*) from the trigger circuit 35 and the inverse form of the CL Y-Plate waveform available at the output point 38 of trigger circuit 36 and shown in diagram (*xxvii*) FIG. 4. The combined wave fed to the input point 39 of the gate 37 will be of the form indicated in diagram (*xxviii*) of FIG. 4 so that the output wave from this gate, conditioned by the Halver-A waveform will be as indicated in diagram (*xxix*) of FIG. 4, falling from the quiescent level of zero to −60 volts during the S1 and S2 beat periods. This waveform is used for application to the Instruction Gate IG so as to open the latter during such scan beats.

FIG. 7 also includes the action waveform generator AWG used to provide waveforms, hereinafter referred to as the Action waveform and the Para-Action waveform for cutting off the beam current in the cathode ray tubes of the Accumulator A and control CL and also for conditioning the Outward Transfer Gate OTG of the Main Store MS.

Referring still to FIG. 7 the control Y-Plate waveform available from the flip-flop circuit 36 is differentiated and the resultant negative-going pulses corresponding to the negative-going edges of the wave of diagram (*xxii*) of FIG. 4 are fed to form one triggering input of a third flip-flop circuit 40 while the inverted form of this wave derived from the opposite side of the circuit 36 is similarly differentiated and the resultant negative-going pulses selected and fed by way of the Staticisor Switch $$\frac{SS}{2}$$

also to the same triggering input of the circuit 40. When the Staticisor Switch is closed, i.e. in its auto-position there will, as shown in diagram (*xxiii*) of FIG. 4, be negative pulses coincident with the commencements of both the Action 1 and Action 2 beats whereas when such switch is open in its manual condition there will be a negative pulse only at the commencement of the Action 2 beat. The other triggering input to the circuit 40 comprises a differentiated version of the Halver-A waveform which is illustrated in diagram (*xxv*) of FIG. 4 and acts to reset such trigger circuit by its negative-going pulses. The resultant Action waveform output from the circuit 40 is shown in diagram (*xxx*) of FIG. 4 for the automatic operating condition and in diagram (*xxxi*) for the manual operating condition. The inverse or para-phased Action waveform also available from the opposite side of the circuit 40 is illustrated in diagram (*xxxii*) for the auto-condition. In the manual operating condition the first or Action 1 beat portion is absent as shown in dotted lines. The inhibition of this portion of the Action and Para-Action waveforms during the Scan 1 beat is necessary so that instructions set up manually in the staticisors may be utilised and be obeyed once only by causing the machine to perform a single operation. If this provision were not made any instruction word set up manually on the staticisors would be effective twice within a single bar. It will also be observed that the presence of any Action or Para-Action wave portions is dependent upon there being a prepulse at the beginning of the bar.

The Action waveform is fed to the writing units of the Accumulator and control regenerative loops which are so arranged that their respective cathode ray tubes are normally bright, i.e. operative, during all beats both scan and action except those Action 1 and Action 2 beats in which the Action wave departs from its quiescent level. The Action waveform is not however applied directly to the brightness control of the cathode ray tubes but is applied in each case through a multiple diode gate or similar circuit which is controlled by potentials developed in the F-Staticisor as a result of the setting of the latter in consequence of the particular value of the instruction word digits allotted thereto. Thus by arranging that the Action wave fed to the Accumulator A is inhibited when the F digits 14 and 15 are "1" and that the Action wave fed to the control CL is inhibited when the same digits are both "0," certain required dark and bright conditions of the Accumulator and control cathode ray tubes during beats Action 1 and Action 2 may be realised as referred to in detail later.

The Para-Action waveform fed to the Outward Transfer Gate OTG ensures that the gate is closed at all times except when the Action waveform departs from the quiescent level during Action 1 or Action 2 beats. In order to comply with the requirements of certain instruction digit combinations the outward transfer gate circuit is also arranged to be capable of being inhibited by the staticised F digits 14 and 15 of an instruction word whenever the latter are both "1", the Outward Transfer Gate OTG thus being opened only upon coincidence of the paraphased Action waveform and the staticised "0" digits in positions 14 and 15.

Figure 8:
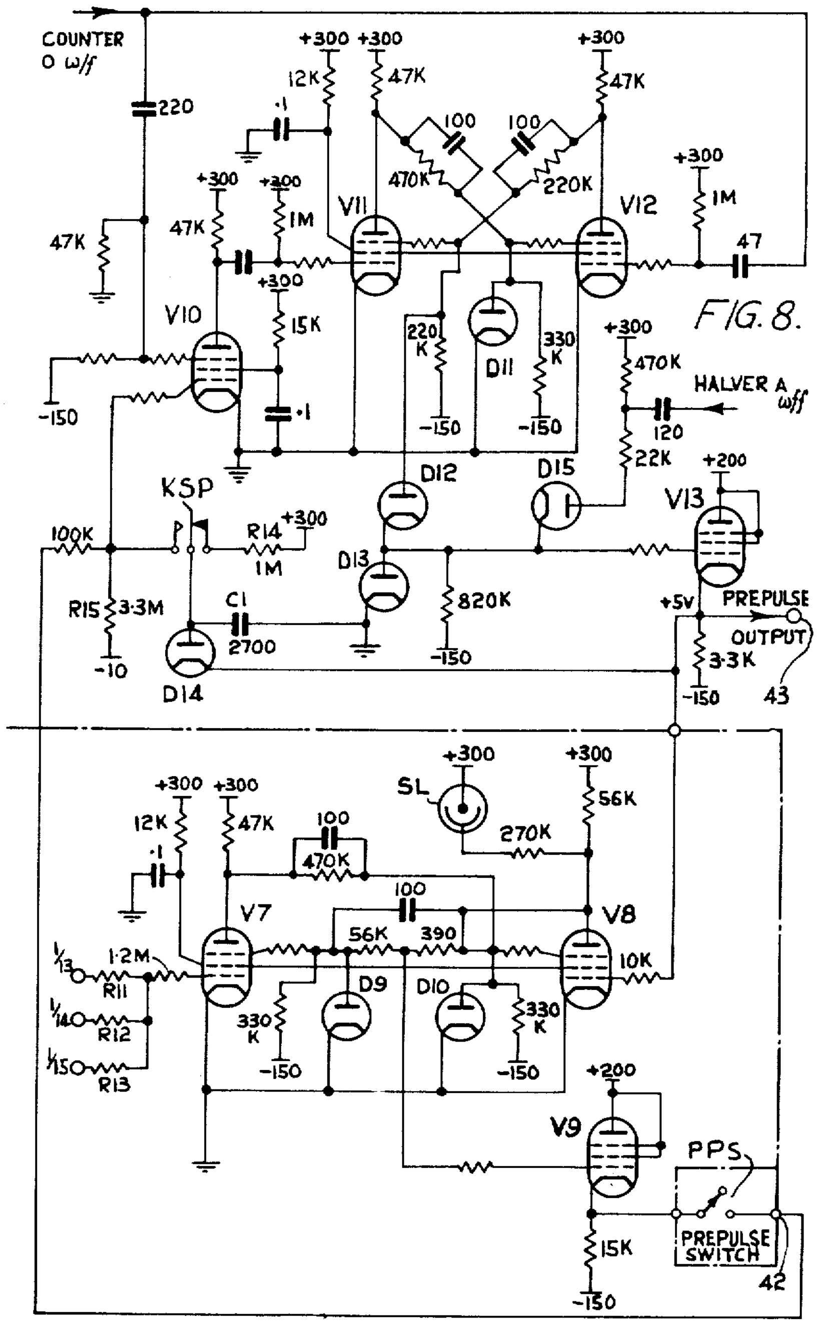
FIG. 8 is a detailed circuit diagram of the stop and prepulse units of FIG. 1*a*.

Reference will now be made to FIG. 8 of the drawings which shows the circuit arrangements of the Stop and of the Prepulse Units of FIG. 1*a*. For the purpose of initial explanation of the stop circuit which is shown at the bottom part of FIG. 8, the prepulse circuit comprising valves V10 to V13 and the associated diodes D11 to D15 will be considered as a device which will continue to generate pulses, one at the commencement of each four beat interval so long as the controlling input terminal 42 of the prepulse switch PS is maintained at or above earth potential. During normal automatic operation with the prepulse switch in the on or closed position the cathode of the cathode follower valve V9 of the stop circuit is maintained at a positive potential so that a continuous train of prepulses is produced.

The Stop Unit itself consists of a trigger circuit arrangement of valves V7 and V8 and associated diodes D9 and D10 which is normally maintained in the condition in which valve V7 is conducting by the negative prepulses derived from valve V13 of the prepulse unit later to be described. These negative-going prepulses are applied to the grid of valve V8 at the instants of the beginning of each Scan 1 beat. The control grid of valve V7 is returned through suitable leak resistors R11, R12, R13 to output points of the F-Staticisor so selected that when the particular F digit combination appropriate to the signal to stop (actually 1, 1, 1 at the 13th, 14th and 15th digit positions as explained later) is set up during a Scan 2 beat the trigger circuit of valves V7 and V8 is caused to reverse so that valve V8 conducts and the potential at the cathode of valve V9 falls below earth, thereby inhibiting the operation of the Prepulse Unit. The succeeding prepulse which would normally ensure that the stop circuit was retriggered to the condition where valve V8 is again cut off is thus not available and the stop circuit remains in this stop condition indefinitely until a single prepulse is caused to issue manually by operation of the key KSP and thus causing the circuit to be retriggered. The Stop Lamp SU is associated with the anode circuit of valve V8 as indicated so that when the stop instruction is obeyed and valve V8 is conducting, the lamp is illuminated.

The circuit of the Prepulse Unit has to perform the functions of releasing a continuous train of prepulses when the prepulse switch PS is in the on or closed position and, whenever the switch is in the off or open position, of releasing a single prepulse only whenever the key KSP is operated. The waveforms related to the understanding of this prepulse circuit are shown in FIG. 4. The Halver-A wave, FIG. 4 diagram (*xxv*), which is negative-going during scan beats is differentiated to produce the negative-going pulse wave of diagram (*xxxiii*), FIG. 4, at the anode of diode D15. The positive pulses resulting from the differentiation are removed by the conduction of diodes D13 and D15. Any one of these negative pulses at the anode of diode D15 could be employed as a prepulse since they are of the correct timing, occurring at the beginning of every scan beat. They are however normally prevented from reaching the output terminal 43 which is fed by way of the cathode follower valve V13, by reason of the fact that the diode D15 forms a part of a diode gate circuit including diodes D12 and D13 and that diode D12 is held conducting by the standing potential of the suppressor grid of valve V11.

Valves V11 and V12 and their associated diodes D11, D12 and D13 form a trigger circuit which is normally held in the condition in which valve V11 is conducting by the application to the control grid of valve V12 of the negative pulses, shown in diagram (*xxxvi*) of FIG. 4, obtained by the differentiation of the Counter 0 waveform illustrated in FIG. 4 (*xxxiv*) and derived from that portion of the Y-Shift generator YSG. The positive pulses of the differentiated wave are ineffective since the grid of valve V12 is already at zero potential. The valve V10 which is conducting to its screen when the prepulse switch PS is in the closed or ON position, has the differentiated Counter 0 waveform of diagram (*xxxiv*), FIG. 4, applied to its suppressor grid but only the positive pulses are effective owing to the negative bias applied to the suppressor grid. The anode waveform of valve V10 in this condition is shown in diagram (*xxxvii*) of FIG. 4 and these negative pulses, which are fed to the control grid of valve V11 produce triggering of the circuit of valves V11, V12 at the commencement of alternate Action beats so that the waveform at the suppressor grid of valve V11 is that shown in diagram (*xxxviii*) of FIG. 4, the circuit being retriggered by the negative pulses of the differentiated Counter 0 waveform as previously explained. The negative-going square wave at the suppressor grid of valve V11 effectively forms a gating waveform which operates to open the diode gate of D12 and D15 so that the differentiated Halver-A waveform pulses which occur within the gate intervals are passed by way of the cathode follower valve V13 to the output terminal 43 as prepulses.

When the prepulse switch PS is in the OFF or open position the valve V10 and the diode D14 and the resistors R14, R15 and the capacitor C1 form a single pulse circuit which permits the circuit of valves V11 and V12 to be triggered once only for each operation of the single prepulse key KSP irrespective of any bounce in the contacts of that key. It will be appreciated that as the time intervals between successive pulses of the waveform of diagram (*xxxiii*) of FIG. 4 is of the order of 0.5 millisecond bounce of the contacts of key KSP, simulating repeated operation might cause several prepulses to be released. The negative bias potential provided by way of resistor R15 serves to maintain the valve V10 cut off while the potential at the anode of diode D14 is held just above earth, the diode conducting by virtue of the connection of its anode through the normally closed contact of key KSP and resistor R14 to a positive potential source and its cathode being held approximately 5 volts positive by the connection thereof to the cathode of the output cathode follower valve V13.

When the key KSP is operated it may be assumed to bounce so that the closed periods of the normally open contacts are, for instance, as indicated in diagram (*xxxix*) of FIG. 4. When the key KSP is operated the positive potential supply by way of resistor R14 is disconnected and the potential across the capacitor C1 falls to earth as soon as the normally open contacts close as indicated in diagram (*xl*) of FIG. 4 (thereby cutting off the diode D14) and thereafter falls at a slower rate towards −10 volts as the capacitor discharges through resistor R15. The time constant of resistor R15 and capacitor C1 is made long compared with the time intervals involved and the potential at the anode of diode D14 may consequently be considered to be steady at zero. During each interval while the normally open contacts of key KSP are making, the grid of the valve V10 is thus raised to earth potential as indicated in diagram (*xli*) of FIG. 4 and if one of these intervals embraces one of the positive pulses applied to the suppressor grid of valve V10, see diagram (*xxxv*), FIG. 4, the circuit of valves V11 and V12 will be triggered by the resulting negative pulse diagram (*xlii*) of FIG. 4 produced at the anode of valve V10.

This circuit must operate so that a prepulse of less than standard size is not emitted. The negative pulse at the anode of valve V10 may be of any size from zero to full amplitude depending upon the relative timing of the bounce of key KSP and the Counter 0 waveform and accordingly will either trigger the circuit of valves V11 and V12 or will not trigger it. If the pulse is sufficiently large to trigger the circuit, as is indicated for the third bounce of key KSP in diagram (*xlii*) of FIG. 4, the next "possible prepulse" is emitted at full size. If the pulse is insufficient to trigger the circuit as is indicated for the second bounce of key KSP in the same diagram, the disturbance produced at the suppressor grid of valve V11 as indicated in diagram (*xliii*) of FIG. 4 has passed before the next "possible prepulse" which is thus completely suppressed. The production of an adequate pulse at the anode of valve V10 is bound to occur sooner or later whatever the particular timing of the bounces of key KSP. The waveform produced at the suppressor grid of valve V11 indicated in diagram (*xliii*) of FIG. 4 shows that the single long negative pulse produced is able to open the diode gate of diodes D12 and D15 and allow the single prepulse shown at *x* in diagram (*xvii*) of FIG. 4 to be released. This single negative-going pulse of approximately 20 volts amplitude occurring at the cathode of valve V13 makes the diode D14 conduct so that the potential at the anode of diode D14 is immediately lowered with the result that the valve V10 is held cut off as indicated in diagram (*xli*) of FIG. 4 and no further prepulses may thereafter be released.

The circuit arrangement of the Test Unit TU (FIG. 1*a*) is also illustrated in schematic form in FIG. 7. A test trigger circuit 50 has applied to one triggering input the Action Trigger waveform of FIG. 4 (*xxiii*) or (*xxiv*), which is employed to set the trigger circuit 40 which generates the Action waveform. The trigger pulses of this waveform occur at the commencement of action beats and maintain the test trigger circuit in the reset condition. A gate circuit 51 is fed with the read output of the Accumulator A and is controlled by the $p^{39}$-pulse waveform and also by the appropriate voltage levels from the F-Staticisor FST corresponding to the function digit combination 0, 1, 1, which, as described later, defines the Test instruction. If therefore during the Action 2 beat following the particular Scan 2 beat during which the Test instruction has controlled the F-Staticisor, a "1" digit exists in the 40th digit position in the Accumulator (indicative, as described later, of negative sign) the corresponding digit pulse will be selected by the gate 51 and will pass therethrough to set the trigger circuit 50 into a condition which will be held until the end of the first beat of the next bar, i.e. the end of the succeeding Scan 1 beat, in automatic operation. The two output voltage levels obtained from the trigger circuit 50 respectively control two gate circuits 52 and 53 and the normal (reset) condition of 50 is such that gate 52 is inhibited while gate 53 is open. Gate 52 is fed with the $p^1$-pulse waveform and gate 53 with a $p^0$-pulse and both gates are also conditioned by the Para S1 waveform, FIG. 4 (*xxvi*), derived from the trigger circuit 35 so that normally a $p^0$-pulse is released during every Scan 1 beat following a prepulse and provides the +1 write input during that beat to the adding unit 30 associated with control unit CL. If however, the test is performed and the 40th digit in the number in the Accumulator A is a "1" (indicating that the number is negative) then gate 52 is opened instead of gate 53 and a $p^1$-pulse is released to the adding unit 30 to provide the +2 write input to cause selection of the next but one instruction in the sequence stored in the Main Store MS as is required by the result of the test and the nature of the programme upon which the machine is operating.

The presence of a "1" digit in the $p^{39}$ or most significant digit position of a number as an indication of negative sign arises by reason of the use of a complement to indicate negative or minus numbers. Assuming, as in the present case, the maximum digit capacity of any one number line to be 40 digits. If the last or 40th digit be excluded from normal arithmetical use as signifying the existence or otherwise of $2^{39}$, then for any positive number it may be "0." If now a positive number be subtracted either from zero or from another number of lesser magnitude, then the normal "carry" procedure will automatically result in such 40th digit becoming "1." For example:

| | |
|---|---|
| from—0000 | 0000 |
| subtract—1010 | 1100 |
| answer—1101 | 0011 |

By gating out such 40th digit in the manner described above in connection with the Test Unit TU, the presence of a negative number is immediately notified.

Stimulation of the various elements of the machine of FIGS. 1*a* and 1*b* by the staticised function digits is obtained by connecting the appropriate points in these elements (generally the controlling terminals of decoding valves such as that referred to in connection with valve V114 of FIG. 22 or the anodes or multiple diode gate circuits such as those of diodes D1, D2 of FIG. 6) to the appropriate output terminals 0/13 etc., of the F-Staticisor. By providing the required number of diodes and connecting them to the correct selection of staticisor output points the gate may be caused to open for any desired combination of function digits. The function digit combinations required to simulate the various elements of the machine are indicated in FIGS. 1*a* and 1*b* by numbered input connections (e.g. 1/13 or 0/13) on those elements.

The S erase waveform SEG for the Main Store MS comprises a suitable multiple gate circuit, for example a multiple diode gate supplied as its controlled input and output with the Para-Action waveform of diagram (*xxxii*) FIG. 4. The passage of such waveform through the gate is inhibited however at all times except when appropriate voltages are applied to each of the controlling input terminals from the F-Staticisor FST in accordance with the markings thereon (1/13, 1/14, 1/15), namely whenever the digit "1" occurs in the function portion of the instruction word setting up the *p*13 and *p*14 sections thereof and the digit "0" occurs to set up the *p*15 section. Such Para-Action waveform is accordingly only available when the digits 110 are supplied to the F-Staticisor FST. When supplied such waveform comprises negative-going operative portions during both Action 1 and Action 2 beats of automatic operation and Action beats only during manual operation. When applied to the read unit 13 of the main store it serves to break the regenerative loop of the latter, e.g. by application to the suppressor grid of a valve therein, and thus to inhibit the re-writing in the tube 10 of any Dash signals arriving from the pick-up plate 11; in consequence such Dash (or "1") digits are automatically replaced by Dot (or "0") digits so that the line being scanned becomes composed entirely of Dot or "0" digits. In this connection it must be remembered that in the dynamic form of each number or instruction word only the "1" digits are present in the form of dash pulses, the absence of a pulse signifying "0." The A and CL erase waveform generator ACEG serving the Accumulator A and the control unit CL is substantially similar to the unit SEG described above, but, by appropriate arrangement and connection of its gate control terminals to the F-Staticisor as marked (0/13, 0/15), provides the Para-Action waveform as its output only whenever the function portion of the instruction word is "0" at both the *p*13 and *p*15 positions. It will therefore be operated only by the function digit combinations of 000 and 010.

The Instruction Gate IG (FIG. 1*a*) comprises, again any convenient and suitable form of gate circuit, e.g. a diode type coincidence gate as described in connection with diodes D1, D2 of FIG. 6 but needs only the application of the Instruction Gate waveform of diagram (*xxix*) FIG. 4 to open it. It is therefore open during the Scan 1 and Scan 2 beats immediately following each prepulse.

The Inward Transfer Gate ITG (FIG. 1*b*) which controls the supply of external signals to the Main Store MS again comprises a gate circuit, e.g. similar to those already referred to. This gate is normally controlled by the erase or Para-Action waveform supplied through the S erase generator SEG. It is accordingly usually opened only when the function digits 110 are supplied to the F-Staticisor and then only during Action 1 and Action 2 beats. It can, however, be supplied under certain special circumstances with other operating or stimulating voltages as described later.

The Outward Transfer Gate OTG is generally similar to the other gating arrangements but requires as its stimulating or opening control, the simultaneous provision of the negative-going portions of the Para-Action waveform and of a voltage derived from either (or both) of the *p*13 and *p*15 sections of the F-Staticisor. In consequence this gate will be opened only during Action 1 and Action 2 beats for each function digit combination except 011 and 111.

The Main Store MS (FIG. 1*b*) has its cathode ray tube beam bright or operative during all beats and under all function conditions but the beams of the cathode ray tubes of the Accumulator A and the control unit CL, while bright during all scan beats, require to be darkened or made inoperative during certain action beats under certain function conditions. The requisite control is effected by supplying the Action waveform of diagrams (*xxx*) or (*xxxi*) FIG. 4 as a beam suppressing medium to the respective write units 20 and 29 through gate circuits which are normally open but which are closed by voltages derived from the F-Staticisor FST. In the case of the Accumulator A, the operation of either of the *p*14 or *p*15 sections of the F-Staticisor by a digit "1" is sufficient to close the gate and prevent darkening of the tube beam so that this Accumulator is operative for all F digit combinations except 000 and 100. The control unit CL requires the existence of a "0" digit at both the p14 and p15 sections of the F-Staticisor before brightening of the beam takes place and in consequence the control unit will be inoperative for all digit combinations except 000 and 100.

The remaining elements of the machine of FIGS. 1*a* and 1*b* not so far described in detail will be apparent when detailed consideration is given later to the manner of operation under various function conditions.

In order to understand in detail how the machine operates when carrying out the various types of operation of which it is capable, it is desirable to re-examine the fundamental 4-beat rhythm of operation and the manner in which this determines the cyclic alternation between the C.I. and P.I. lines of the control unit CL. The events occurring during the two scan ($S_1$ and $S_2$) and the two action ($A_{13}$ and $A_2$) beats of a normal bar are indicated below while the nature of the transverse (Y) deflection wave which must be applied to the control tube is shown in diagram (*xxii*), FIG. 3. The timing of the prepulse is also indicated in diagram (*xvii*) of the same figure as are the blackout or flyback intervals (b.o.) which occur during the first portion of each beat.

In beat $S_1$—C.I. line is operative.
In beat $A_1$—P.I. line is operative for writing.
In beat $S_2$—P.I. line is operative for reading.
In beat $A_2$—C.I. line is operative if it is necessary to write any new information into that line for control transfer.

It is assumed that the machine has just completed obeying the instruction which is in address *n* of the Main Store MS and that the number *n* is therefore held on the C.I. line of control unit CL. (Note: the 1st to 5th digits of each instruction word which select an address in MS, being arranged at one end of the 40 digit word define the binary-digital number in the raster sequence, of the line in MS forming the address.) At the beginning of the first beat ($S_1$) the prepulse is given and causes the +1 or +2 signal to be released and passed to the adding unit 30 in the regenerative loop of the control unit CL so that 1 or 2 is added to the control instruction (*n*) on the C.I. line of the tube 25 and the number $n+1$ or $n+2$ is made available immediately at a read output from the control unit and is fed by way of the Instruction Gate IG to the L and F-Staticisors. (Note: The 14th to 16th digits of the control instruction on line C.I. of the tube 25 selected by the F-Staticisor will all be "0"s). During the next beat ($A_1$) the instruction held in address $n+1$ or $n+2$ of the Main Store MS is read out and transferred to the P.I. line of the control unit CL, being written over any word existing in that location. During the third beat ($S_2$) the present instruction held on the P.I. line is read out and fed to the L and F-Staticisors. During the fourth beat ($A_2$) the present instruction $n+1$ or $n+2$ is obeyed, a word or number transfer into or out of the selected address in the Main Store MS as defined by the setting of the L-Staticisor occurring, and the type of operation performed with the transferred word being as defined by the digits set up on the F-Staticisor. During the $S_1$ and $S_2$ beats of the above sequence regeneration will be occurring in the Main Store MS and also in the Accumulator Store in the normal manner. The word transfer occurring during beat $A_2$ may be between MS and the Accumulator A or, if a transfer of control is being effected, from MS to control unit CL.

It will be seen by reference to FIGS. 1*a* and 1*b* that the read output from Main Store MS is fed via the Outward Transfer Gate OTG to the writing inputs of both Accumulator A and control unit CL while the writing input to MS via the Inward Transfer Gate ITG can come only from A or the typewriter TPR. The writing input of control unit CL is provided only by the read output from Main Store MS or the +1 or +2 signal from Test Unit TU while the read output of the control unit CL via the Instruction Gate IG is required to go only to the staticisors LST and FST. In order to obtain the desired word transfers from any particular instruction the undesired routes which might be followed by a word may be inhibited either by closing a transfer gate in the path or by arranging that the beam of an undesired cathode ray tube store which is receiving the word is blacked out. Similarly, an undesired read output from a store may be suppressed by closing an outward transfer gate or blacking out the cathode ray tube, or by inhibiting the regenerative loop of the store by application of an appropriate erase waveform e.g. to the suppressor grid of the first valve in the gate circuit of the regenerative loop (the reading unit) if it is required to do this for other reasons. In the same manner, when a word is fed as a writing input to a store it may replace any existing content of the active address in the store if an erasing wave is simultaneously fed to the store regenerative loop, while if the erasing action is not caused to take place and an arithmetical circuit is included in the regenerative loop, then the word written into the store will be the result of an arithmetic operation between the number fed to the store and the number pre-existing in the store.

Before proceeding to an understanding of the further controlling operations occurring within the machine which are concerned with the distinctions between differing types of instructions, it is necessary to consider the instructions which the machine is designed to handle. The relatively simple machine as described, embodying a single computing circuit (subtractor) in the arithmetic organ or Accumulator A is arranged to perform seven different operations and these are denoted in symbolic form by indicating the source of the transferred word and its destination together with any arithmetic sign necessary to imply any arithmetic process which may simultaneously occur. Thus the contents of any particular address which forms the words being transferred is indicated by a small letter while the actual addresses are indicated by capital letters, e.g. *s*, *a*, *c* represent words derived from a specific address in the Main Store MS or from the Accumulator A or control C.

The seven instructions, which for convenience are numbered 0, 1, 2, 3, 4, 6 and 7 as these are the numbers which are represented in binary notation by the combinations of three (14th, 15th and 16th) function digits selected to specify them, are as follows:

*Instruction 0 (signalled by function number 000): s, C*

The content of a selected line in the Main Store MS is to be written into the operative (C.I. or P.I.) line of the control unit CL, replacing any existing word on that line.

To perform this instruction the tube 25 of the control unit CL must be bright, the tube 16 of the Accumulator A (which is fed in parallel with the control unit) must be dark, the Outward Transfer Gate OTG must be open, the A and CL erase waveform generator ACEG must be operative to suspend the regenerative loop in the read unit 28 of the control unit CL and the S erase waveform SEG must not be operative while the gate ITG must be closed.

*Instruction 1 (signalled by function number 100): $c+s$, C*

The content of a selected line in the Main Store MS is to be added to the contents of the C.I. line of control unit CL, the sum $c+s$ being written into such C.I. line.

To perform this instruction the tube 25 of control unit CL must be bright, that of the Accumulator A must be dark, the gate OTG must be open, gate ITG must be closed and neither of the erase waveform generators ACEG or SEG must be operative.

*Instruction 2 (signalled by function number 010): s, A*

The representation of minus the content of a selected line in the Main Store MS is to be written into the Accumulator A, replacing any existing word in A. The minus significance (represented by the complement of the number) arises as previously explained from the operation of the subtractor circuit 21. Arrangements could be made, by providing an alternative writing input to the regenerative loop at the output end of the subtractor circuit, so that positive numbers could be written into the accumulator store. The added complexity is not justified however as with the simple subtractor both addition and subtraction and also the conversion to positive numbers may be obtained with simple programme arrangements. All these facilities could not be so simply obtained if an adding circuit was employed in place of the subtractor.

To perform this instruction, the tube 25 of the control unit CL must be dark, that of Accumulator A must be bright, gate OTG must be open, erase waveform generator ACEG must be operative, generator SEG inoperative and gate ITG closed.

*Instruction 3 (signalled by function number 110): a, S*

The content of the Accumulator A is to be written into a selected line in the Main Store MS, replacing any word which may exist in such selected address.

To perform this instruction the control unit tube 25 must be dark, the Accumulator tube 16 must be bright, gate OTG may be open, the erase waveform generator ACEG must be inoperative, the generator SEG must be operative and the gate ITG must be open.

*Instruction 4 (signalled by function number 001): a—s, A*

The content of the selected line in the Main Store MS is to be fed to the subtracting circuit 21 of the Accumulator A where it is to be subtracted from the number existing in the Accumulator and the difference, *a—s*, is to be written into the Accumulator in place of *a*.

To perform this instruction the tube 25 of control unit CL must be dark, that of Accumulator A must be bright, neither erase waveform generator must be operative, the gate OTG must be open and the gate ITG must be closed.

*Instruction 6 (signalled by function number 011): Test*

In this machine the test instruction must cause the number existing in the Accumulator A to be tested for sign to determine, for example, whether or not a transfer of control is required. As already explained the digit of highest significance ($p39$) is always "0" for positive numbers and "1" for negative numbers. The test instruction thus requires the content of Accumulator A to be read out and the 40th digit selected by pulse $p_{39}$ in the Test Unit TU where the existence of a "1" digit in such 40th place must cause substitution of the +2 signal for the normal +1 signal at the start of the next bar.

To perform this instruction the tube 25 of the control unit CL must be dark, that of Accumulator A bright, the gates OTG and ITG must be closed and neither erase waveform generator ACEG or SEG must be operative.

*Instruction 7 (signalled by function number 111): Stop*

This instruction causes the Stop Unit SU to be stimulated to prevent the emission of further prepulse signals by unit PPU and thus to stop the operation of the machine. No word transference occurs as a result of this instruction.

To perform this instruction tube 25 of the control unit CL must be dark, that of Accumulator A bright, gates OTG and ITG must be closed and neither erase waveform generator ACEG or SEG must be operative.

It should be noted that the various conditions described above apply to action beats only and that furthermore during Action 1 beats the function digits of the operative instruction are always 000, i.e. instruction 0 or *s*, C which results in the selected present instruction word being transferred from the Main Store MS to the P.I. line of control unit CL. During all scan beats the contents of Main Store MS must be regenerated without a writing input being provided or a read output being fed to the remainder of the machine and similarly during such scan beats the contents of Accumulator A must be regenerated without interference by a writing input and without causing a read output to interfere with the machine. During all four beats one or other line of the control unit CL is active but a read output must only be taken via the Instruction Gate IG during the scan beats.

The manner in which the various voltages provided by the F-Staticisor FST set up the required routes and operational controls will be apparent by inspection of the various marked stimulating terminals on the various elements of FIGS. 1*a* and 1*b*.

Cleaning the Main Store MS and the Accumulator A of all recorded data when required is effected by keys KSC (FIG. 1*b*) and KCC (FIG. 1*a*) respectively which, when operated, connect the erase input terminals of the reading units 13 and 19 of the MS and A regenerative loops to a source of negative bias (—150 volts). The keys in the non-operated position connect the erase inputs to the corresponding erase waveform generators.

The method whereby information is initially written into the Main Store MS, the operation of the mechanism which enables selected portions of information recorded in the Main Store MS to be erased at will and the manner in which an instruction may be set-up and obeyed manually, will now be described. Fundamentally, manual writing in the main store takes place by releasing to the write input of the store regenerative loop appropriate *p*-pulses while the desired address line in the store is being scanned by the cathode ray tube beam. It is therefore necessary to feed the *p*-pulses during action beats when the desired address line can be made active. During the intervening scan beats the store will be regenerating in the normal manner. Another point of importance in the process of manual writing is that the process is very slow compared with the speed of operation of the store, being limited by the manual dexterity with which writing switches or keys may be operated, and that therefore the time occupied in writing a word into a given address line may occupy a very large number of action beats.

In order to write a word into a particular address line of the main store MS, the Staticisor Switch $$\frac{SS}{2}$$

of FIGS. 1*a* and 1*b* is moved to the Manual position which results in the digital pulses inputs to the gate circuits of the L-Staticisor LST, via switches $S_0$–$S_4$, being replaced by the Halver-A waveform (0 volts during action beats and —60 volts during scan beats) and also results in the modification to the Action waveform, previously explained which prevents the Action waveforms, the Instruction Gate waveforms or the erase waveform from departing from their resting levels during $A_1$ beats. The machine is thus quiescent during $A_1$ beats in Manual operation and this provision is made as the $S_1$ and $A_1$ beats, in normal operation, are consumed in the utilisation or obeying of the control instruction and in Manual operation this function does not exist. By selective closure of switches $S_0$–$S_4$, in a manner representing in binary notation the number of the selected address line in S, the Halver-A waveform fed to the selected staticisor gates has the same effect as "1" digit pulses in the automatic mode of operation and the desired line of the Main Store MS is made active during all action beats while the switches remain in the positions set. The typewriter comprises keys $K_0$–$K_{39}$ (FIG. 1*a*) each of which is connected to the corresponding *p*-pulse source so that in the common output channel from such switches is obtained during every beat a train of *p*-pulses containing only those pulses selected by closure of switches. If no buffer devices are provided on the outputs from the *p*-pulse sources only one typewriter key may be operated at a time and trains of individual *p*-pulses will occur in the output channel for the operated intervals of the corresponding keys. The selected *p*-pulses are fed to the Inward Transfer Gate ITG during all beats, but as writing into the Main Store MS from the typewriter or the Accumulator (the only other possible source with this machine) must only occur when the erase input of the MS regenerative loop is stimulated it is convenient to arrange that the S Inward Transfer Gate can be opened only by the waveform which is fed to the erasing input terminal of the MS regenerative loop and is inhibited at all other times. The controlling input for the transfer gate is thus provided by a connection to the S erase waveform generator via normally closed contacts of a key KLC and a Write/Erase switch W/E which is closed in the Write position. To provide the facility of manual erasing and writing in of individual digits on the selected address line, the *p*-pulses obtained from the typewriter are amplified at 55 and fed, via a gate 56 which is opened during action beats only by the Halver-A waveform to the erase input of the regenerative loop where they provide an erasing wave additional to any provided by the S erase waveform generator. When therefore the switch W/E is placed in the Erase position the Inward Transfer Gate is not opened and the amplified *p*-pulses inhibit the regenerative loop and erase any "1" digits in the corresponding positions on the line. The function of the gate 56 controlled by the Halver-A waveform is to ensure that only digits on the action line are erased. In order to clear the whole of one selected line the key $$\frac{\text{KLC}}{2}$$

is provided with a pair of normally open contacts through which the Halver-A waveform is supplied so that when key $$\frac{\text{KLC}}{2}$$

is thrown the Inward Transfer Gate ITG remains inhibited for all action beats while the erase input to the write unit 14 is stimulated for the entire duration of each action beat. In order to clear the whole store, irrespective of line selection, the key KSC is provided which when thrown connects the erase input to a D.C. source of −150 volts which inhibits the regenerative loop of the Main Store MS during all beats.

The manner in which the machine may be caused to obey single instructions set up manually will now be apparent. With the Staticisor Switch $$\frac{\text{SS}}{2}$$

in the Manual position no data can be fed to either of staticisors LST or FST from the control unit CL and such staticisors may both be set by operation of their manual control switches $S_0$–$S_4$ and $S_{13}$–$S_{15}$ to select a desired address in the Main Store MS and also to record the F digit combination which corresponds to the instruction which it is desired to carry out. A single prepulse may then be released to the machine by operation of the key KSP associated with the Prepulse Unit PPU and the machine will then execute a single bar within which the instruction which was manually set in is obeyed.

The machine described is provided with only one arithmetic circuit, a subtractor. As has already been indicated, by suitable programming, i.e. arrangement of sequences of instructions, this arithmetic device may be employed to perform any other required arithmetic operations. For example to add together two numbers the following sequence of instruction (using the symbolic notation previously explained) may be carried out to obtain in an address in the Main Store MS the sum $x+y$ of two numbers $x$ and $y$ which are separately held in other addresses in the Main Store. The numbers in the right hand column represent the actual number existing in the address when the instruction has been completed:

| | |
|---|---|
| $-x$, A | $-x$ |
| $a-y$, A | $-(x+y)$ |
| $a$, S | $-(x+y)$ |
| $-$, A | $x+y$ |
| $a$, S | $x+y$ |

Thus any of the more complex operations which can be broken down into repeated additions or subtractions can be performed. However in other and more elaborate embodiments of the invention alternative arithmetic circuits may be provided to give facilities such, for example, as multiplication. The selection of these circuits may be performed in obvious fashion by the employment of additional F digits in the instruction words in conjunction with suitably modified construction of F-Staticisor and gauging and inhibition devices.

Numerous modifications and elaborations of the particular arrangements described may clearly be made. For instance, the Main Store MS will normally comprise more than one cathode-ray tube storage device all of which will be supplied in parallel with both X and Y deflection waveforms but only a selected one of which will have its beam brightened while the rest remain dark under the control of the L-Staticisor, if necessary, with the use of one or more additional (*t*) or tube-selecting digits in the address selecting portion of each instruction word as described later with reference to FIG. 22. Similarly an adding or multiplying or dividing circuit may be incorporated in the arithmetic unit or Accumulator A or means such as gate circuits provided for selecting any one of a number of such circuits at will under the control of the F-Staticisor. Some forms of such alternative devices, for instance, a multiplying circuit, may require more than the Action 2 beat to complete its operation and in such event, arrangements may be made for the bar to be extended to include an additional beat after such Action 2 beat before the next prepulse is given. In such case the Action waveform, the CL–Y Plate waveform and others retain the level at which they exist during the Action 2 beat.

As already indicated each of the instruction words which define the address within a store from or to which a number is to be transferred and which also define the operation to be performed with or upon such number need only relatively few digits compared with the numbers themselves. In the simple machine just described it has been assumed that the storage capacity required is such that addresses therein may be defined by only five digits while three digits is sufficient to define the function required.

Even with more complex universal machines it is unlikely that more than 13 digits will be required for the address selection and about 7 digits for the function control so that a word of 20 significant digits will be sufficient to express any instruction. The use of one unique address or line of a store which is itself capable of holding, at each address, 40 significant digits for the retention of only one instruction word therefore results in substantial wastage of the available storage capacity. The wastage may be reduced or avoided by utilising each storage address to contain two or even more instruction words.

FIGURES 10, 11 and 12*a*, 12*b* of the drawings illustrate the form of modification to the machine previously described in order to provide this facility.

In the operation of the computing machine previously described with reference to FIGS. 1*a* and 1*b* all instructions to be obeyed are held in the Main Store MS and are extracted as required to provide present instructions under the control of a control instruction number held in the control unit CL. The control instruction number has only to specify the address in the Main Store of the corresponding present instruction and it therefore follows that the control instruction number is the same as the number of the line in the Main Store forming such address of the present instruction.

Consider now the case in which each line, 0, 1, 2, 3 of the raster on a cathode ray tube stores two instructions, the instructions being numbered sequentially, as indicated in FIGURE 10. It will be obvious that if the numbers of the instructions are represented in binary notation then the digit of least significance, "C" will define in which column the instruction word is located. Instruction words located in the left hand column have $C=0$ while right hand instructions have $C=1$. It will also be apparent that the digits of the number of the instructions, other than such least significant or C digits, will define the lines upon which the instruction words are located. Thus (using the previous reading method of from left to right) instructions 0 and 1 (000000 and 100000) are both on line 0 (00000) while instructions 8 and 9 (000100 and 100100) are both on line 4 (00100). If more than two instruction words are stored upon each line, then more than one digit will be required to define the column, and if the number of columns is arranged to be an integral power of 2 then the remaining digits in the number of the instruction will still define the line as explained above.

The action of a four-beat computing machine in which two instructions are recorded per line in the Main Store will thus be as already described in connection with FIGS. 1*a* and 1*b*. The sequence of operations during one bar of operation and various relevant timing waveforms are indicated schematically in FIGURE 11. During the second beat (A1) of the bar the content of the chosen line in the Main Store MS (i.e. two complete instruction words), as selected by the control instruction word, is read out and is written into the present instruction ($P^I$) line of control unit CL. During the third beat ($S_2$) however only that portion of the multiple information recorded on the P.I. line which corresponds to the required instruction word must be permitted to control the staticisors LST and FST when the P.I. line is scanned so that such staticisors are set up by the desired instruction word only, which is then obeyed during the succeeding ($A_2$) beat. The determination whether the machine is to obey the first or the second half of the multiple instruction is made by the first digit of the control instruction word which was fed to the same staticisors during the first beat ($S_1$) and to do this the information that this particular digit is a "0" or a "1" must be stored until the end of the third beat ($S_2$) upon a special trigger circuit or staticisor element referred to hereinafter as the $F_0$ staticisor. The circuit arrangement of such $F_0$ staticisor and other elements concerned with the double instruction operation are indicated in FIGS. 12*a* and 12*b*. This $F_0$ staticisor FOST comprises the trigger circuit of valves V17, V18 with their associated cathode follower output valves V19, V20 and limiting diodes and an "and" or coincidence gate constituted by diodes D17, D18 and D19. The trigger circuit V17, V18 is normally, i.e. when quiescent, in the condition with valve V17 conducting to its anode and is triggered to its opposite state only by the presence of a "1" pulse in the first digit position of the C.I. word read out from the C.I. line of control unit CL during beat $S_1$ and for this purpose the C.I. word is fed to the diode D17 of the gate circuit where the first digit of such C.I. word is selected by the simultaneous application of a $p0$-pulse to diode D18 and the Para-S1 waveform (FIG. 4—*xxvi*) to diode D19. As already explained the four-beat operation requires the scanning of the two lines of the control unit tube C.I. and P.I. to alternate and this is effected by the CL Y-Plate waveform of FIG. 4 (*xxii*) which is shown inverted at FIG. 11 (*li*), and it is to ensure that the digit selected by the gate and fed to the $F_0$ staticisor is obtained from the C.I. word that the gate is controlled also by Para-S1 waveform which accordingly allows the gate to open during $S_1$ beats only. The $F_0$ staticisor, if it has been triggered at all, is reset at the end of beat $S_2$ of each bar by a pulse applied to valve V18 and obtained by differentiating the negative-going edge of a suitable rectangular wave such as that indicated in FIG. 11 (*liii*) and referred to as Inverse Counter 0 (see FIG. 4, *xxxiv*). The voltage at the suppressor grid of valve V17 is cathode followed by valve V19 to provide an output controlling voltage, hereinafter called the $F_0$ waveform, as indicated in FIG. 11 (*liv*) while the inverted version of this waveform, called Inverse $F_0$ waveform, is provided by cathode follower valve V20 and is shown in diagram (*lv*) FIG. 11.

The selection of the desired half of the double instruction stored upon the P.I. line of control unit CL is effected by gating the read output of this unit during beat $S_2$ by means of the Instruction Gate IG which comprises in this instance, diodes D20, D21, D22 and cathode follower valve V21 so that only the desired instruction word is fed to the staticisors from the cathode output of the latter valve. The Instruction Gate waveform which is fed to open or close this instruction gate is therefore not that derived from the unit GYWG as in FIG. 1 but must instead be of such a form, indicated in FIG. 11 (*lvi*) or 11 (*lvii*) that the instruction gate is open during beat $S_2$ from the instant of $p_0$ to the back edge of $p_{19}$ (for $C=0$) or from the front edge of $p_{20}$ to the end of the beat (for $C=1$). The control instruction word, which when read out of the C.I. line of control unit CL, has also to pass through the Instruction Gate IG during beat $S_1$ has a length in a typical machine as previously described of only 17 significant digits including one for defining the column C, say 5 for defining the line (for a 32 line raster) on the cathode ray tube of store MS and 8 or so for defining the particular tube (for a Main Store having 256 alternative tubes). No further subsequent digits must reach the staticisors for the Main Store during the $S_1$ beat and so it is convenient to arrange that the Instruction Gate waveform, as indicated in FIG. 11 (*lvi*) or (*lvii*) selects the first 17 digits only during each $S_1$ beat.

Such Instruction Gate waveform of FIG. 11 (*lvi*) or (*lvii*) is generated by a two-state trigger circuit comprising the valves $V_{22}$, $V_{23}$, FIG. 12*b* and is derived from the suppressor grid of valve $V_{22}$ through cathode follower valve $V_{24}$ to provide the Instruction Gate waveform which is fed to the diode $D_{21}$ of the Instruction Gate IG. The diode $D_{22}$ in the Instruction Gate IG is also fed with negative-going pulses which persist for the dot or time base pause intervals so that the gate is inhibited during those initial periods of the digit intervals when some uncertainty as to the correct significance of a digit may exist.

This trigger circuit of valves $V_{22}$, $V_{23}$, in which the quiescent state is such that valve $V_{22}$ is conducting to its anode, is triggered at the commencement of beat $S_1$ and also whenever the column digit $C=0$, at the commencement of beat $S_2$ by the coincidence in an "and" gate of diodes $D_{23}$, $D_{24}$, $D_{25}$ and valve $V_{25}$, of the Inverse $F_0$, the $p0$-pulse and the negative-going edge of the Halver-A waveforms. When the column digit $C=1$ the circuit is triggered at the front edge of $p_{20}$ by coincidence in the "and" gate of diodes $D_{26}$–$D_{29}$ and the valve $V_{26}$, of the F0 waveform, the $p_{20}$-pulse, the negative edge of Halver-A and the CL Y-Shift waveforms. The outputs from the two "and" gates are combined in a buffer circuit of diodes $D_{30}$, $D_{31}$ and then fed to the control grid of valve $V_{22}$. Resetting of the trigger circuit at the back edge of $p_{17}$ during the beat $S_1$ is provided by coincidence in a further "and" gate consisting of diode $D_{32}$, $D_{33}$ and valve $V_{28}$ of a $p_{17}$-pulse (which is first differentiated and inverted in valve $V_{27}$) and the Para S1 waveform (FIG. 11—*lii*) of suitable polarity. Resetting of the circuit at the back edge of $p_{19}$-pulse when required (i.e. when $C=0$) is provided by the differentiated and inverted $p_{19}$-pulse provided by valve $V_{29}$. The outputs from valves $V_{28}$ and $V_{29}$ are combined in a buffer circuit (also known as an "or" gate) of diodes $D_{34}$, $D_{35}$ and $D_{36}$ which latter is fed with the Halver-S waveform which resets the circuit when required at the end of beat $S_2$ and normally maintains the circuit in the quiescent condition.

The remaining modifications which have to be made to the machine described in FIGS. 1*a* and 1*b* to enable it to operate with two instructions recorded per line of the main store, relate to the staticisors LST and FST. Since the first digit of each control instruction word is now used to control the selection of the right-hand or left hand instruction on a line in the store the line selection itself is now performed by the second and subsequent digits of each control instruction word and those portions of the staticisors LST, FST and Y-scan generator YSG which were previously controlled by the digits of order 0, 1, 2, 3 . . . respectively must now be controlled by the digits of order 1, 2, 3, 4 . . . respectively. This change is easily effected by using the appropriate *p*-pulses to control the gate circuits forming part of such staticisors. Thus the gate previously controlled by the *p*0-pulse is now controlled by the *p*1-pulse and so on. As the present instruction words must control the same address selecting mechanism as the control instruction words it follows that the first digits of the P.I. words are no longer usable for line selection. These digits which are not used for line selection may however be used for other purposes within the machine and are referred to as "*b*" digits. Therefore the second and certain subsequent digits of the P.I. words must control the staticisors and Y-scan generator in the same manner irrespective of whether the P.I. word occupies the left or right-hand portion of the P.I. line of control. This facility is readily provided by modifying the staticisor connections so that a digit in position $n$ or position $20+n$ will trigger the same $n$th staticisor element. The modification consists in arranging that each staticisor gate circuit (e.g. the diode D2 in FIG. 6) is controlled by either of two *p*-pulses $pn$ and $pn+20$. The fact that each staticisor element may be set by either of two digits which may occur during a single beat of the machine does not interfere with the correct operation as during those beats when words are fed to the staticisors the Instruction Gate IG is opened for only one-half (or less than one-half) of the beat and only one of the possible digits can reach each staticisor element.

In the forms of machine described above, a minimum of four beats (S1, A1, S2 and A2) are required in every bar in order to complete each operative cycle or step in the calculation. By providing a separate store for the instruction words required for use in the operation it is, however, possible to interleave or have overlapping of the initial beat of a subsequent bar with the later beat of the bar immediately preceding it whereby the machine effectively operates with a rhythm of two beats to a bar with consequent material saving of time.

Figure 9:
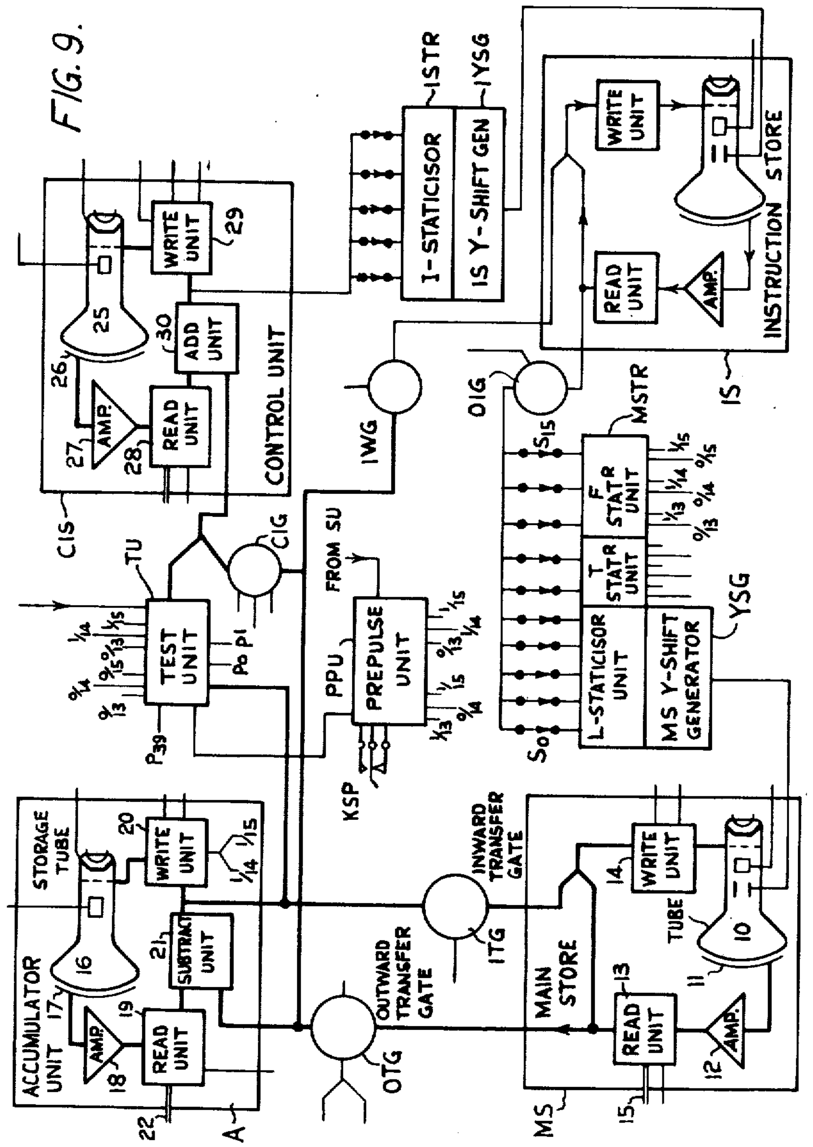
FIG. 9 is a block schematic diagram similar to FIG. 1 but of somewhat simplified character illustrating a modified machine arrangement.

FIG. 9 illustrates in block schematic form the nature of the modifications required in a machine of the type already described with reference to FIGS. 1–8 in order to provide such two beat-to-the-bar operation. In this figure many of the components are substantially similar to those of FIG. 1 and have accordingly been given corresponding references.

The machine in this modification comprises a Main Store MS which, as in the previous embodiment, includes one or more cathode-ray-tube storage units 10 of the type referred to, and the necessary circuit arrangements for the regeneration of stored information during scan beats and for the writing into or reading out from a selected address during any action beat. Inward and Outward Transfer Gates ITG and OTG are provided as before for feeding "words" to or from this store. Staticisor MSTR is provided which, when fed during a scan beat of the store MS with an instruction word in dynamic form sets up the store address selection mechanism including the Y-shift generator YSG which makes the selected store address active during the succeeding action beat, as previously explained. This staticisor may be considered to comprise three units, a first or L unit which corresponds to the L-Staticisor of FIG. 1 and which is controlled by the *l* or 1st to 5th digits in the instruction and which define the line of the tube raster corresponding to the required address, a second or T-unit controlled by the *t* digits which define which cathode ray tube (when more than one exists in the store) contains the desired address, and a third or F-unit which corresponds to the F-Staticisor of FIG. 1 and which is controlled by the *f* or 14th to 16th digits of the instruction word, which define the function to be performed.

The subsidiary instruction store IS is also of the cathode-ray-tube type and is generally similar to the Main Store MS but will in general have a considerably smaller storage capacity. It has facilities for regeneration and is provided with an inward writing gate IWG which enables a group of instructions to be fed in, and an output instruction gate OIG, controlled by a suitably applied wave-form, which enables the read output to be passed out to the Main Store staticisor MSTR when required. This store is provided with a staticisor ISTR which operates in the same manner as the staticisor MSTR except that there is no function portion, and serves to select during each scan beat of the instruction store IS, with the aid of a suitable Y-shift generator IYSG the address in such store of the instruction which is to become the present instruction during the next (action) beat of the store IS. Control of the I-staticisor IS is effected by a number delivered from a control instruction store CIS during the scan beat of the instruction store IS, the number being in effect the address in the instruction store of the current instruction. The control instruction store CIS is substantially similar to the control unit CL of FIG. 1 and comprises a cathode-ray-tube storage unit employing a single tube which is, however, arranged to store on a single line only, a number defining the address in IS of the present instruction. The store CIS is provided with a regenerative loop in the normal manner, to permit regeneration of the stored number as it is read out, and included in the regenerative loop is an add unit 30 which operates as already described to add to the number already existing in the store any number fed in binary-digital form to an appropriate input of the add unit so that the sum number is concurrently written into the store in place of the original content. The number to be added may be derived from the main store MS by way of the Outward Transfer Gate OTG and gate CIG when the number is required to be some arbitrary value involved in a transfer of control but generally the number will be either $+1$ or $+2$ derived from the Test Unit TU which is similar to that already described and is, as before, controlled by prepulses which are, however, in this case generated at the end of every 2-beat bar (i.e. at the end of each action beat of the store MS) by the Prepulse Unit PPU. For this purpose the circuit of FIG. 8 may be supplied with the Halver-S waveform instead of the Counter 0 waveform as previously.

Following the receipt of a prepulse the unit TU feeds signals to the add unit 30 which cause one unit or two units to be added to the content of store CIS. The selection of $+1$ or $+2$ for addition to the content of the store CIS is determined as in the previous embodiment by whether or not a conditional transfer of control is to be produced in dependence upon the result of a test operation also performed by the Test Unit TU. Normally, as the sequence of instructions in store IS is being worked through, the unit TU will be conditioned to cause a $p0$ pulse to be fed to the add unit 30 following each prepulse.

A single arithmetic organ or Accumulator A is again provided as in FIG. 1 and comprises a storage unit of the cathode-ray-tube type and circuit arrangements which permit a simple operation such as addition or multiplication or as actually shown and described previously, subtraction, to be carried out between numbers fed to the accumulator as a result of separate instructions.

The routine of the operation of the machine when loaded with numbers and a sequence of instructions is as follows, assuming that an instruction in address $n$ in the store IS has been reached:

(1) When the instruction $n$ has been obeyed a prepulse is released by unit PPU and "1" is added to the control instruction number $n$ in the store CIS, the number $n+1$ becoming immediately available as a read output from this store. This number $n+1$ in dynamic form is fed to the I staticisor ISTR.

(2) The present instruction in the selected address $n+1$ of store IS then read out and fed by way of the outward instruction gate OIG to the Main Store staticisor MSTR which is thus set up to select a desired address in the store MS and, at the same time, to condition any necessary function circuits in precisely similar manner to before.

(3) The present instruction is obeyed, a number being read out of or written into the selected address in the Main Store MS.

It will be apparent that, as during items (1) and (2) "words" are being fed to staticisors which are set up thereby, these items must occur during the scan beats of stores IS and MS as their staticisors must be set up prior to a selected address being activated, as already explained. However, in accordance with this present modification the scan-action cycles of stores IS and MS are interleaved so that the scan beats of store MS correspond with the action beats of store IS and item (1) is therefore carried out during a scan beat of store IS (which is an action beat of store MS) and item (2) is carried out during the next beat, an action of store IS (which is a scan beat of store MS). Item (3) occurs during the next or action beat of store MS and which corresponds to the following scan beat of store IS.

The normal operating sequence is as follows: Referring to successive bars as Bar 0, Bar 1 and so on and to the respective beats in each bar as A in the Main Store and $S^1$ in the instruction store for the first beat and as S in the Main Store and $A^1$ in the instruction store for the second, the prepulse which is given at the commencement of Bar 0 results in $+1$ being added to the number in CIS so that the resultant number is fed out to the I staticisor ISTR during the first beat, $S^1$ of store IS. Operating of store MS during this beat is ignored for the time being. During the next beat, S of MS and $A^1$ of IS, the present instruction selected by the I-Staticisor ISTR is read out from store IS and fed to the main Store staticisor MSTR. The next prepulse which marks the termination of Bar 0 and the commencement of Bar 1 causes the I-Staticisor to be reset. During the first beat, A of MS and $S^1$ of IS, of the succeeding Bar 1 the present instruction set up on the staticisor MSTR is obeyed, this instruction involving a number transfer into or out of the selected address in the main store MS. Simultaneously $+1$ is again added to the number in CIS and the cycle of events repeated. At the end of this beat, A of MS or $S^1$ of IS, the staticisor MSTR is reset. It is thus apparent that each instruction is obeyed during the first beat of every bar, the necessary preparation leading up to the obeying of the instruction, being performed during the two beats of the preceding bar.

The sequence of events and the formation of the two-beat bar described above holds for those simple forms of instruction as already outlined in connection with the first embodiment in which number transference between Main Store and Accumulator occurs and which are completed within a single beat, namely instructions Nos. 2, 3 and 4.

The "Stop" instruction, which as already described, is used to signal that a problem has been completed or has reached a stage requiring intervention by a human operator can also be dealt with in a two-beat bar.

A form of instruction which may occur during the normal operation of the machine and which cannot be completed within the two-beat bar is that instruction which requires multiplication to occur between a number fed from the Main Store MS and a number existing in the Accumulator A. Such a number transference from address $s$ of the Main Store to the Accumulator and the resulting multiplication is ordered by an instruction which may be denoted as $s$, A(X). The function digits of this instruction are arranged to operate in a manner analogous to that already described for other function control purposes in FIG. 1 and via the staticisor MSTR, a circuit which inhibits the release of all prepulses, occurring after the end of the beat S, within which the instruction was fed to the staticisor MSTR, until the multiplier circuit of the computer itself releases a prepulse at the beginning of the first $S^1$ beat after multiplication is complete. For the purposes of FIG. 9 it is assumed that the $f$ digits of instruction $s$, A(X) are 1.0.1. A multiplication circuit such as that envisaged in this connection is disclosed in U.S.A. patent specification No. 2,776,794.

The last type of instruction which the machine may be required to perform, and which interferes with the two-beat rhythm, is the test instruction which may result in a modification of the content of the control instruction store CIS in order to perform a transfer of control as previously explained. Such an instruction results in the content of the Accumulator A being tested to discover whether or not it complies with some criterion, in general whether it is greater or smaller than a given value or whether it is positive or negative. The detailed circuit arrangements required for carrying out the test are not indicated in FIG. 9 but their nature will be similar to those of FIG. 1 and will be obvious to those skilled in the art. It will be apparent that the function digits of the "test" instruction must be such that during this A beat the content of the accumulator is read out to the test circuit TU while the read output or the write input of the Main Store MS is suppressed by suitable operation upon the transfer gates OTG and ITG.

The result of the "test" instruction is thus not known until the end (or possibly some intermediate instant) of the A beat and if, for example, the content of Accumulator A is negative and a backward transfer is not required, $+2$ is required to be added to the existing number in store CIS as previously explained. The requirement for the addition of $+1$ or $+2$ is not determined however until the end of beat A, whereas the prepulse which normally causes $+1$ to be added is given before the commencement of such beat. It follows therefore that for the "test" instruction the normal 2-beat rhythm must be interrupted. This inhibition is produced by arranging that the $f$-digit combination (e.g. 011) of the present instruction "test" set up on the staticisor MSTR during the preceding S beat inhibits the release of one prepulse from the Prepulse Unit PPU. The circuit arrangement for producing this inhibition is not shown in FIG. 9 but may be similar to the corresponding circuit, which was previously referred to and which is used to inhibit all prepulses when the present instruction relates to a multiplication. In addition to inhibiting the prepulse the "test" instruction must also inhibit the read output from the instruction store IS during the S beat following the A beat during which the actual test involved in the "test" instruction has been carried out. The inhibition of the read output of IS during this S beat is effected by a suitable waveform, e.g. the Para S1 waveform, fed to the instruction gate OIG which is thus only conditioned to release an instruction during the S beat following a prepulse. Hence no new present instruction is set up on the staticisor MSTR during the bar which commences with the beat A or S[1] during which the address of the "test" instruction controls the I-Staticisor ISTR, and this bar is extended to consist of four beats, being terminated by the first prepulse to occur after the single prepulse inhibited by the "test" instruction.

A type of instruction, such as that of previous instruction No. 1 or 2, denoted as *s*, C which causes the content of store CIS to be modified by the addition (or subtraction) of a number (other than 1 or 2) derived from an address in the Main Store MS, enables the transfers of control by modification of the number in store CIS to be carried out as previously described. This instruction may be executed without interfering with the two-beat rhythm if the +1 (*p*0-pulse) which is normally released by the unit TU at the end of the S beat during which the present instruction, *s*, C, controls the staticisor MSTR, is inhibited. This inhibition is controlled in similar manner to that previously described by the particular *f* digits of the present instruction acting upon a suitable gate circuit associated with the unit TU. For the purposes of the example it is assumed that the *f* digit combination corresponding to the *s*, C instruction is 0, 0, 0. The *f* digits of the *s*, C instruction must also be effective, via suitable gate circuits or storage tube inactivation circuits, to prevent any read output from the Outward Transfer Gate OTG reaching the Accumulator A, and similarly to prevent any Accumulator A read output reaching the Main Store MS, while ensuring that the output from the main store Outward Transfer Gate OTG is fed to the control instruction store add unit 30.

The provision of a separate store for the instruction words as described in the last mentioned embodiment, while advantageous in allowing much of the operation of the machine to take place in a rhythm of two beats to a bar instead of four, may nevertheless give rise to inconvenience in that such instruction store may require to be of very considerable storage capacity comparable with that required for the number data, even if, as is quite feasible, such instruction store is arranged to hold two or more words in each address. Two large capacity stores may thus be required instead of one, the previous Main Store, holding both number and instruction data without distinction. In this connection it should be remembered that a single store equal in capacity to two stores of half its capacity requires only a single staticisor having one element more than each of the two separate staticisors required, one for each of the smaller stores.

FIGS. 13 and 14 illustrate a further modification of the invention, more particularly of the two-beat arrangement of FIG. 9, in which the instructions are stored in such manner than they may be treated within the machine as numbers while avoiding the necessity for providing an instruction store of large capacity.

The machine illustrated in block schematic form in FIG. 13 is basically the same as that already described in conjunction with FIG. 9 and comprises a Main Store MS with its Inward and Outward Transfer Gates ITG and OTG, a staticisor MSTR for such Main Store, an instruction store IS which is similar to the Main Store MS but of smaller capacity, consisting generally of a single cathode ray tube with its inward writing gate IWG and its output instruction gate IGA which allows the read output of such store IS to reach the staticisor MSTR, and an associated staticisor ISTR for the store IS. The read output of the instruction store IS is not fed directly to the Main Store staticisor MSTR as in the previous arrangement of FIG. 9 but is fed instead to the write input of the control instruction store CLS which more closely resembles the unit CL of FIG. 1 than the unit CIS of FIG. 9 in that it is a two line storage device provided with an appropriate Y-Shift waveform, for example, the Halver-S waveform, whereby one line, the C1 line, is scanned during one series of alternate beats and the other line, the P.I. line, during the other series of alternate beats. Although an adding unit 30 is included, as in FIG. 1, in the regenerative loop between the read unit 28 and the write unit 29 of this unit CLS, to permit modification of stored data as required, obviously some other form of arithmetic circuit, e.g. a subtractor, could be employed if suitable modifications were made to the general organisation of the machine.

The read output of the store CLS is effectively the input to the writing unit 29 and is arranged to be fed either by way of gate 60 to the Main Store staticisor MSTR or by way of another gate 61 to the instruction store staticisor ISTR. The external input to the adding unit 30 is derived from any one of a number of possible sources including store IS fed by way of the instruction gate IGA while the first input to the adding unit 30 derived from read unit 28 is inhibited, for instance by applying a suitable potential to the suppressor grid of an appropriate valve of the read unit, for instance, the valve V110 of FIG. 22. A second input to the adding unit 30 may be one derived from the Outward Transfer Gate OTG of the Main Store MS by way of a gate CIG when the number to be added is required to have some arbitrary value involved in a transfer of control. In addition a +1 or a +2 input is available from the Test Unit TU as in the earlier embodiments. This test unit is controlled, as before, by prepulse signals generated at the end of every 2-beat bar (at the end of each action beat of the Main Store MS) by a Prepulse Unit PPU and operates to feed a *p*0-pulse or a *p*1-pulse to the adding unit 30 depending upon whether or not a conditional transfer is required.

A single computer or arithmetic organ comprising an Accumulator A, is illustrated in FIG. 13 and consists of a storage unit similar to that already described and having circuit arrangements which permit simple operations such as addition, subtraction or multiplication to be carried out between numbers fed in binary-digital form thereto as a result of separate instructions.

The portions of the schematic arrangement described so far are essentially the same as those described with reference to FIG. 9 and function in the same manner if a suitable deflection waveform as mentioned previously is applied to the cathode ray tube of the control instruction store or unit CLS, to ensure that the line registering the control instruction number C.I. is scanned during the action beats of the Main Store MS.

The operation of the machine described so far may be summarised as follows, assuming that the Main Store MS is loaded with numerical data, the instruction store IS is loaded with a group of instructions and that the machine is just completing the obeying of the instruction in address of *n* of store IS.

When the instruction *n* has been been obeyed a prepulse is released by unit PPU and "1" in general, is added to the number already existing on the C.I. line of control unit CLS, the number *n*+1 becoming immediately available at the output of the adding unit 30 and being written into the C.I. line and also fed by way of the gate 61 to the IS-Staticisor ISTR. During the next beat (an action beat of IS and a scan beat of MS) the present instruction word in address *n*+1 of IS is read out and fed by way of the gate IGA to the adding unit 30 where it is added to zero, owing to the simultaneous breaking of the regenerative loop. The read output from the adding unit 30, namely the same present instruction is then fed through the gate 60 to the staticisor MSTR. At the end of this beat a further prepulse is released to initiate a new bar (unless inhibited by the function portion of the instruction word just set up on the Main Store staticisor MSTR). During the next beat, the first beat of the next bar, the present instruction is obeyed by a transfer into or out of the address in the Main Store MS selected by the staticisor MSTR and +1, in general, is again added to the number $(n+1)$ existing on the C.I. line of control unit CLS, and the cycle repeats, the instruction staticisor ISTR being set up, by the revised control instruction $(n+2)$, to select the next instruction and so on.

As explained previously with reference to FIG. 9 the sequence of events described above holds for those simple forms of instruction, for instance, instructions Nos. 2, 3 and 4 of the first machine, which result in number transference between Main Store MS and Accumulator A and which are completed within a single beat while, again as already described certain further instructions such as "Stop" which can be effected within one beat can be carried through without modification of the two beat rhythm. Certain other instructions however, such as that calling for multiplication to occur between a number fed from Main Store MS and a number existing in the Accumulator A and the "test" instruction cannot be completed within the 2-beat bar and modification of the rhythm is necessary as already referred to with reference to FIG. 9.

The precise circuit arrangements for producing these various prepulse inhibitions and other changes are not shown in FIG. 13 or described in detail since their nature will be clear from the previous description.

A further instruction, denoted symbolically as $s$, C(+), causes the number in the C.I. line of control units CLS to be modified by the addition (or subtraction) of a number, other than +1 or +2, and which is derived from an address in the Main Store MS, so that a transfer of control may be effected as explained previously. This instruction may be executed without interfering with the 2-beat rhythm if the +1 P0-PULSE normally released by the unit TU in response to a prepulse, which occurs at the end of the beat during which the $s$, C(+) instruction word is set up on the staticisor MSTR, is inhibited. The function digits (indicated arbitrarily as 100) of the $s$, C(+) instruction word are accordingly arranged to produce this inhibition by means of a suitable gate circuit embodied in the unit TU and controlled in similar manner to that already described by the potentials set up upon various elements of the F-Staticisor section of the Main Store staticisor MSTR. These function digits must also, by means of suitable gate circuits or cathode ray tube inactivation circuits, prevent the output from the Main Store Outward Transfer Gate OTG being written into the Accumulator A, and similarly prevent any read output from the Accumulator A being fed to the Main Store MS. These inhibitions can conveniently be provided in similar manner to the machine described in FIGS. 1–8 by arranging that the accumulator storage tube is blacked out by the $s$, C(+) instruction which must also be caused to open the gate CIG.

The remaining type of instruction which the machine illustrated in FIG. 13 is required to perform is that instruction, denoted symbolically as $s$, I, which constitutes the principal purpose of this modification, namely that which causes a word (instruction) in address $s$ of the Main Store MS to be written over any existing content of the address in the instruction store IS which is being scanned during the relevant beat. This type of instruction is one which can obviously be executed within the two beat rhythm of the machine but the construction of a set of such instruction words which will effect the automatic transference of a group of instruction words calls for the co-operation of those portions of the machine illustrated schematically in FIG. 13 which have not yet been described.

For the purpose of carrying out this particular instruction the following further apparatus units are provided. An L number unit LNU is interconnected with the staticisor ISTR of the instruction store IS and serves to provide, in binary code form, an output signal expressing the address line number in store IS which is being currently scanned during any scan beat, a gate circuit 62 appropriately controlled in a manner similar to that already explained for other gate circuits, by which the number output of L-number unit LNU may be supplied to the adding circuit 30 of the control unit CLS, an adding unit 63 supplied with the $p0$-pulse waveform and the output from unit LNU by which the current number signal from the latter may be increased by unity once during each bar, a comparison circuit 64 fed with the output from adding unit 63 and the output from the previously described gate 61 as its two comparison signals, a trigger circuit SITR operated by the output of the comparison circuit 64 and adapted to provide controlling output waveforms in dependence upon whether the two inputs to the circuit 64 are identical or are different from one another and finally another gate 65 by which $p0$-pulses may be applied at certain times as a +1 input to the adding circuit 30 of the control-unit CLS.

In order to understand the manner of operation the principle upon which such transfer of an instruction group is based must first be considered. Consider the case in which the store IS has a capacity of 32 lines and one instruction word is to be recorded upon each line. The problem is then to transfer successively the instruction words from lines $s, s+1 \ldots s+31$ of the Main Store MS to lines, $l, l+1 \ldots l-1$ of the instruction store IS, where $l$ is an arbitrary number and represents the number of the line which is operative in the scan sequence of IS during the particular action beat of MS when the content of the first line $s$ is read out. The instruction $s$, I (a "present" instruction) will make line $s$ of the Main Store MS active during the required beat and the function digits of this instruction may be arranged to provide the necessary facilities (e.g. opening and closing of gate circuits and so on) to enable the content of $s$ to be written into IS. To effect the transference of the next word in address $s+1$ of the Main Store, a new present instruction $s+1$, I is required, and by the present arrangement this is derived automatically from the preceding instruction $s$, I; it will be noted that only the portion of the instruction word defining the address in MS requires modification. This construction of successive present instructions is produced by first writing into the second or P.I. line of control unit CLS, the instruction word $s$, I, when this word is encountered and is fed from the store IS to the staticisor MSTR by way of the adding unit 30 of the control unit CLS, and then, at the beginning of the next beat, when the word in address $s$ of MS is fed to IS, adding +1 to the stored $s$, I instruction word on line P.I. of control unit CLS to modify the address portion and cause the instruction word $s+1$ to be written immediately into such P.I. line and fed to the staticisor MSTR to prepare the main store for the next transfer from address $s+1$. This process will then repeat automatically; each two-beat bar accounting for the transfer of one instruction word from the successive main store addresses $s+2$, $s+3 \ldots s+31$.

The completion of the transfer of the group of instruction words is observed by utilising the fact that the last instruction word in the group will be written into line $l-1$ of store IS owing to the sequential raster scanning action. As each successive scan line number, $l, l+1 \ldots 32, 1, 2 \ldots l-1$, is produced in binary-digital form it has unity added to it. Each such resultant number $l+1 \ldots$ is compared with the number $l$ stored in the C.I. line of control unit CLS and which is made available as a read output from the regenerative loop of the control unit during action beats of the Main Store MS (scan beats of IS), and when equality between the compared numbers occurs the transfer process is automatically terminated at the end of that beat, as such equality indicates that during the beat the transferred instruction word is being fed to line $l+1$ in the instruction store IS and is therefore the 32nd instruction word to be transferred.

In order to terminate the process when the instruction word in the main store address $s+31$ is transferred and also to allow the maintenance in the C.I. line of control unit CLS of a record of the address occupied in store IS by the first instruction word of the group, the number unit LNU is provided which produces in binary-digital form the number of the line which is being currently scanned during the scan beats of the store IS. The number (*l*) denoting the starting line in store IS which is produced when the first instruction word is being written into such line *l* of store IS from line *s* of main store MS, is written into the C.I. line of control unit CLS and is regenerated therewith without change during every subsequent action beat of the Main Store MS during the group transfer process. When the transfer of the whole group of instruction words is completed and the machine is required to proceed to the utilisation of the new group of instructions then held in store IS, the address of the first instruction is thus held ready in the C.I. line of control unit CLS and represents the next control instruction required to enable the machine to recommence the normal 2-beat rhythm previously described.

The sequence of events occurring in the machine of FIG. 13 for the 33 bars (0–32) involved in the transfer of a group of 32 instructions and the operation of the machine while transferring instructions will now be summarised with reference to FIG. 13 and also to the diagrams of FIG. 14, the functioning of those portions of the machine which have not yet been dealt with, being also described.

In FIG. 14 the 33 bars are numbered 0, 1, 2 . . . 31, 32 and each separate bar is shown as containing A and S beats indicating that it is an action or a scan beat of the Main Store MS and also S′ and A′ beats indicating that it is a scan beat or action beat of the instruction store IS. Whenever the machine is operating, the C.I. line of control unit CLS is scanned during the interlaced S (or A′) beats as indicated by the upper level of the Halver-S waveform reproduced in diagram (*lx*). Prepulses are normally released as shown in the diagram (*lxi*) at the beginning of every A (or S′) beat.

At the commencement of Bar 0 a prepulse will be released, the machine either having completed the utilization of an instruction during the preceding bar or being about to do so within the A beat of Bar 0. A +1 or a +2 signal (i.e. a *p*0- or a *p*1-pulse) will accordingly be released by unit TU and fed to the adding unit 30, where it is added to the existing content (C.I.) of the C.I. line in unit CLS so that the number C.I. +1 is written into such C.I. line and simultaneously fed as a read output from the control unit regenerative loop by way of gate 61, which is opened by the Halver-S waveform, to the staticisor ISTR. The instruction word in the store IS selected by the new control instruction number C.I. +1 or C.I. +2 and fed to the staticisor ISTR will, if the replacement of the present contents of store IS by a new group of instruction words is required, be that denoted symbolically as *s*, I and for convenience the function or (*f*) digit combination of this instruction will be referred to as *f*0. During the second beat (S) of Bar 0 the instruction word *s*, I is read out of the instruction store IS and is fed by way of gate IGA to the writing input of the add unit 30 so that it is written into the P.I. line of control unit CLS replacing any existing content of that line owing to breaking of the regenerative loop in read unit 28. The instruction gate waveform controlling gate IGA during normal operation of the machine is the Halver-A waveform which opens the gate during S beats and closes it during A beats; when the *f*0 combination is set up on the Main Store staticisor MSTR this gate controlling waveform is modified so that the gate IGA is closed during all beats. Simultaneously the read output from the add unit 30, which is the instruction word *s*, I, is fed through the gate 60, which is opened during all S (or A′) beats by the Halver-A waveform, to the Main Store staticisor MSTR.

During the first beat (A) of Bar 1 the instruction *s*, I is obeyed, the content of line *s* of the Main Store MS being read out by way of the Outward Transfer Gate OTG and the gate IWG, and fed to the instruction store IS where it is written into the line *l* which is currently being scanned. Gate CIG which would otherwise permit the read output from store MS to be written into the control unit CLS is inhibited during all A beats whenever the function digit combination *f*0 (which has just been provided) is set up on the staticisor MSTR. The gate IWG which is ordinarily closed is similarly caused by the *f*0 digit combination to open during A beats under the influence of Halver-S waveform. The +1 or +2 output from unit TU which would otherwise be written into the control unit CLS during this A beat is also inhibited by the *f*0 function digit combination.

During the next beat (S of Bar 1) the staticisor MSTR must be set up by the instruction *s*+1, I which will select the instruction word in address *s*+1 of the main store and again have the function digit combination *f*0 so as to effect the same routing conditions during Bar 2 as existed during Bar 1. This instruction word *s*+1, I is produced by feeding a +1 pulse (actually a *p*0-pulse and hereinafter referred to as the P.I. +1 pulse) to the adding unit 30 of CLS during beat S of Bar 1 so that the instruction word *s*+1, I is formed simultaneously and written into the P.I. line of control unit CLS and is also fed out by way of the gate 60 (open during all S beats) to the staticisor MSTR.

The *p*0 pulse representing the P.I. +1 pulse is fed to the writing input of the adding unit 30 through the gate 65 which is conditioned to pass the *p*0-pulse during the S beat of Bar 1 and the subsequent bars of the transfer operation by the application of Halver-A waveform under the simultaneous existence of another waveform to be referred to later.

The fact that instruction word *s*, I is being utilised is observed during beat S of Bar 0 when the *f*0 digit combination is set up on the staticisor MSTR and is registered until required to control the release of the P.I. +1 pulse, in a device SITR referred to as the SI trigger. This device is primed at the instant when the *f*0 combination is set up on the staticisor MSTR during beat S of Bar 0 and is triggered at the end of beat A of Bar 1. The circuit remains in the triggered condition until reset at the end of beat A of Bar 32 when completion of the group transfer is observed. The SI trigger circuit conveniently comprises two trigger circuits in cascade, the first triggered under the control of the *f*0 digits and set at the end of the following A beat (in Bar 1) by a suitable Halver waveform, such resetting of the first trigger circuit being caused to trigger the second trigger circuit which provides as one output waveform, the SI Trigger waveform indicated in diagram (*lxii*) of FIG. 14. Additionally the paraphased version of this waveform is made available and will be called the Para-SI Trigger waveform. The latter is used to control the gate 65 so that the P.I. +1 pulse is fed to the adding unit 30 only during the S beat of Bar 1 and subsequent S beats until the SI trigger circuit SITR is reset.

Gate IGA is controlled by the SI Trigger waveform itself in addition to the Halver-A waveform which normally permits the gate to be open during S beats only, so that the read output of the instruction store IS is inhibited from beat S of Bar 1 until Bar 32 so that information available as read output from the store IS during action beats of that store is not fed to the control unit CLS where it would interfere with the operation of that element during the transfer process.

The instruction word *s*+1, I which appears at the read output of the adding unit 30 and is written into the P.I. line of control unit CLS and is simultaneously fed to the staticisor MSTR, causes during the next beat, A of Bar 2, the *s*+1, I instruction to be obeyed in the same manner that the *s*, I instruction was obeyed in the preceding action (A) beat, the content of line *s*+1 of the Main Store MS being written into line *l*+1 of the instruction store IS. During the next beat (S of Bar 2) the P.I. +1 pulse fed through gate 65 converts the instruction word $s+1$, I, stored on the P.I. line of control unit CLS into the instruction word $s+2$, I and the staticisor MSTR is reset to utilise this instruction word to effect the third transfer in the group and so on.

The description of operation so far has ignored the action of the C.I. line of control unit CLS, which is concerned with the recording of the address in the store IS of the first instruction word transferred and the termination of the transfer process when the 32nd instruction word has been transferred. The L number unit LNU which is associated with the staticisor ISTR produces in dynamic form, during each S' beat, a binary-digital number which is the number of the line in the instruction store which is being scanned during that beat. This L number unit, which is shown only schematically in FIG. 13, comprises, if the storage tube in store IS employs 32 lines, five gate circuits which are fed separately with the five $p$-pulses, $p0$–$p4$ and which are also fed separately with the five counter waves $C_0$–$C_4$ derived from the Y-shift generator associated with the staticisor ISTR and which provides the selection of lines in sequential manner during scan beats (S') and in a selected manner during action beats (A') in similar manner to that already described in connection with unit YSG of FIG. 1*b*. The counter waves $C_0$–$C_4$, as already explained earlier are rectangular waves derived from five cascade connected scale-of-two counter circuits the initial one of which is fed with the Halver-S waveform and it will be apparent from a consideration of the operation of said Y-scan generator YSG and the related patent specification No. 93,612 that the five $p$ pulses $p0$–$p4$, when released or inhibited by the appropriate counter waves will provide a train of pulses which represents in binary-digital form the number ($l$) of the particular line in the store IS which is being scanned during each S' beat.

The output from the L number unit LNU is fed into two parallel paths. One path leads through gate 62 to the input of the adding unit 30 associated with control unit CLS. This gate 62 is controlled by the staticised $f0$ digits and by the Halver-S waveform so that the gate is open during the A beat of Bar 1 and the number $l$ is written into the C.I. line of control unit CLS during that beat. The number $l$ is written over any existing content of such C.I. line, the normal regenerative action of the control unit CLS being inhibited by a suitable waveform applied, preferably to the suppressor grid of the first valve in the read unit 28, when the $s$, I instruction is operative during beat A of Bar 1. There is thus recorded upon the C.I. line during the A beat of Bar 1 the address in store IS of the first instruction word transferred and thus the control instruction which will be first required when normal machine operation is resumed after the group instruction transfer is completed. The staticised $f0$ digits and the Halver wave controlling gate 62 would permit the number $l$ in C.I. of store CLS to be replaced successively with the numbers $l+1$, $l+2$ . . . from the L number unit LNU during succeeding A beats, and in order to prevent this the SI waveform of FIG. 14 (*lxii*) from the SI trigger circuit SITR is also fed to control the gate 62 so that it is inhibited after the end of beat A of Bar 1 of a group instruction transfer and only the number $l$ is recorded in control unit CLS. The second output from the L number unit LNU is fed to an adding unit 63, which may be of any simple or convenient type and which is also fed at a suitable input with $p0$-pulses representing unity. There is thus available at the output of unit 63 during every A beat the number $l+1$ or $(l+1)+1$ or $(l+2)+1$ and so on as the case may be. This number in dynamic form is fed during A beats to a comparison circuit 64 which is also fed with the read output from the regenerative loop of Control unit CLS which is the number $l$. When the two numbers fed to the comparison circuit 64 are equal an output is obtained which resets the SI trigger circuit SITR. Equality of the two numbers occurs, as previously explained, when the 32nd instruction is being transferred and the $l-1$ line of the instruction store IS is being scanned. The comparison circuit may take any suitable form obvious to those skilled in the art. For example, a series of gates may be provided each of which is fed with the corresponding digit pulses of the two numbers to be compared, so that equivalence of the digits causes a suitable voltage level to be set up, say by operation of a trigger circuit associated with each gate; operation of each trigger circuit (one for each digit position in the numbers) produces a condition at the end of the beat which results in an output wave which serves to reset the SI trigger circuit SITR. As shown in FIG. 14, diagram (*lxiii*) the output of the comparison circuit 64 for equality of the numbers being compared, may be regarded as a rectangular pulse which commences with the first digit position during beat A of Bar 32 and continues until the end of that beat, the back edge of the pulse being employed to reset the SI trigger circuit. It should be noted that during normal operation of the machine (i.e. during nontransfer operation) the comparison circuit 64 will be functioning as well as the units LNU, 63 and 64 and also the control unit CLS and that fortuitous equality may be registered between the inputs to the comparison circuit. Such registration of equality will be ineffective however as during non-transfer operation of SI trigger circuit SITR will already be its quiescent or retriggered condition.

The events occurring during beat A of Bar 32 may therefore be summarised as follows: The instruction word $s+31$, I set up on the Main Store staticisor MSTR during the preceding beat is obeyed, i.e. the instruction word in address $s+31$ of the Main Store MS is written into line $l-1$ of the instruction store IS through the gate IWG which is opened by the $f0$ digit combination. At the same time the $+1$ and $+2$ output from the unit TU, and the output from the Main Store Outward Transfer Gate OTG by way of the gate CIG are inhibited by the $f0$ function digit combination set up on the staticisor MSTR. The contents of the C.I. line of control unit CLS (which is the number $l$) is regenerated without change as the only other possible input to the adding unit 30 during an A beat is the output from the L number unit LNU and this is prevented by the gate 62 which is inhibited by the SI Trigger waveform. The number $l$, which is available dynamically as a read output from the regenerative loop of the control unit CLS during the A beats, sets the staticisor ISTR to select line $l$ during the next beat (A' of Bar 32). The number available in dynamic form from the L number unit LNU is $l-1$ and therefore the output fed from the adding circuit 63 to the comparison circuit 64 is $l$, which is equal to the read output from C.I. line of control unit CLS which is simultaneously fed to the comparison circuit 64 by way of gate 61. Equality is therefore registered and the SI trigger circuit SITR is reset at the end of the A beat.

During the second (S) beat of Bar 32 the read output of the line $l$ in the instruction store IS is fed to the staticisor MSTR as the read output is released by virtue of the change in the $s$, I waveform fed to gate 7. The content of the line $l$ is fed to the staticisor MSTR without change, as the P.I. $+1$ pulse which would otherwise be applied to the adding unit 30 at the commencement of the S beat is inhibited by the Para SI Trigger waveform fed to the gate 65. During the S or (A') beat of Bar 32 therefore the machine is prepared, by the setting up of the staticisor MSTR with the first instruction word in the group which has just been transferred, to proceed in the first beat of the next bar (33) to the obeying of the first instruction, and therefore from the commencement of beat S of Bar 32 the machine is following the normal routine of operation as previously described.

The number of digit positions in each number "word" which can be stored at one unique address is determined during design and in accordance with the degree of precision required. In the present machines being described it consists of 40 digit positions. For many purposes however, particularly when multiplication of numbers is effected, the use of more digits becomes necessary or desirable for instance, words of 80, 120 or even 160 digits. The handling of such extended digits is facilitated by the arrangement of the arithmetical unit or Accumulator A with a storage capacity of two lines as will now be described with reference to FIG. 15, which shows the modifications necessary to the arrangement of FIG. 1, and FIG. 16 which shows certain related waveforms.

In the operation of such a two-line accumulator the second line, which may be scanned, under the control of a suitable Y-Shift waveform, in the beat following the beat ($A_2$), during which writing into the Accumulator normally occurs in a machine such as that already described with reference to FIGS. 1–8, provides a repository for digits which may be carried over from a computation proceeding during such previous $A_2$ beat. It will be seen that if the normal word comprises, say, 40 digits all operations upon normal length number words within the machine may be carried out in accordance with the present invention as if the words all comprised 80 digits, irrespective of whether the numbers are true positive numbers or are complements and represent negative numbers as already explained. This implies that the circuits associated with the Accumulator have to operate not only during the action beat (beat $A_2$) in the case of a 4-beat machine but also during the following beat which is the scan beat ($S_1$) of the following bar. This beat is sometimes referred to as $S_3$ and it is obvious that this mode of operation is permissible as during this scan beat (irrespective of whether the machine is of the 2 or 4-beat type) the Accumulator is not required to perform any other operation and the end beat of one bar may be allowed to overlap the first beat of the next bar. It will become apparent as the explanation proceeds that by use of the two-line Accumulator computations upon numbers comprising numbers of digits which are any desired multiple of the number of digits in normal words (the capacity of one accumulator line) may be carried out.

A positive 40-digit number is converted to an 80-digit number merely by placing 40 zero digits to extend the number in the direction of greatest significance. In the dynamic case in which "1" is represented by a pulse and "0" by the absence of a pulse in a given temporal position, the extension process thus involves no actual operation at all. A 40-digit complement, representing minus a given number, may be derived by subtracting the given number from $2^{40}$. That is, the complement of X is $2^{40}-X$. The 80 digit complement of the same number is $2^{80}-X$ so that the difference between the two complements is $2^{80}-2^{40}$ which equals $2^{40}(2^{40}-1)$ which comprises only "1" digits in the most significant half of the number. Thus to convert a 40-digit complement to an 80-digit complement, it is necessary to place 40 "1" digits beyond the most significant digit of the 40-digit complement. If a computing machine is to handle both ordinary numbers and complements the digit of most significance in ordinary numbers is arranged to be always "0" so that the corresponding digit of a complement is always "1". This digit is thus an indication of the nature of the number. Thus in order to convert a 40-digit number or complement to an 80-digit version it is necessary to extend it by 40 copies of its most significant digit, in the direction of increasing significance.

In a computing machine therefore which is designed to operate with 40-digit words, but which is arranged to utilise a two-line Accumulator it is necessary to provide means for converting to 80 digit form 40 digit number words fed from the main store to the accumulator. This may be effected by the complement converter arrangement illustrated schematically in FIG. 15 and which is inserted in the path from the Outward Transfer Gate OTG of the store MS and the writing input of the Accumulator A. An "and" gate 70 is fed with the word from the Outward Transfer Gate OTG and the $P_{39}$-pulse waveform. If the word represents a complement, a "1" digit pulse will be present in the 40th digit position of the word and will be selected by the $P_{39}$-pulse and will cause triggering of a trigger circuit 71 which is arranged to be retriggered at the end of the $S_3$ beat (i.e. the $S_1$ beat of the following bar) by a differentiated version of the Halver–S waveform. The trigger circuit 71 when operated opens a gate 72 which allows the Dash waveform (equivalent to a train of digit pulses) to be fed to the write input of accumulator A during the whole of the $S_3$ beat. By providing an appropriate Y-Shift waveform to the Y-deflecting plates of the tube 16 of the accumulator the two 40 digit parts of the word will be stored on two separate lines.

In the symbolic notation employed to specify the types of instruction which a machine of the kind to which the invention relates may be adapted to obey, the complement conversion operation is conveniently signified by a primed content letter. Thus $s'$, A signifies that the 80-digit form of the 40-digit word in address $s$ of the Main Store MS is written into the Accumulator A, occupying both lines of that store. Other operations which may be performed and which are analogous to the corresponding 40-digit operations are denoted by:

| | |
|---|---|
| $-s'$, A | $a-s'$, A |
| $a+s'$, A | $a\&s'$, A |
| $a$ or $s'$, A | $as'$, A |
| $2s'$, A | $a_l$, S |

Of these instructions the last signifies that the content of the last significant line ($a_l$) of the Accumulator A is written into an address in the Main Store MS. If a machine of the type described in any of the previous embodiments is provided with a two-line Accumulator and complement converter as illustrated in FIG. 15, then if the instructions listed above are utilised in place of the corresponding instructions for simple 40-digit numbers, no account need be taken of the 80-digit mode of operation so far as the arrangement of a programme for the solution of a problem is concerned.

In order that the two line Accumulator may function properly as part of a machine of the kind considered, the $a_l$ line must be scanned during the $A_2$ beat of a four-beat bar (or the action beat of the Main Store in a two-beat machine) and the $a_m$ line (i.e. the most significant line) must be scanned during the following beat. A transverse (Y) deflecting waveform as indicated in FIG. 16($a$) is therefore applied to the Y-deflecting means of the accumulator cathode ray tube which is then normally caused to scan each line during alternate beats. For the simplest form of operation one or other of the Halver waveforms will suffice as a Y-Shift waveform for the Accumulator A. This form of Y-Shift waveform however has to be modified if certain operations are required.

If a "test" instruction as previously described is being carried out whereby the control instruction word held in the control system CL or CLS of the machine is modified in dependence upon the sign of the number held in the Accumulator A, it is necessary, if the normal rhythm of working is to be preserved, that the nature of the most significant digit (i.e. the 80th digit) must be observed before the end of the $A_2$ beat or its two-beat rhythm equivalent. During the obeying of a "test" instruction therefore a process called "temporary reversal" is used. Under the control of the test instruction word the Accumulator Y-Shift waveform is modified as indicated in FIG. 16($b$) so that the line ($a_m$) holding the most significant digits is scanned first. This is done simply as indicated by preventing the reversal of the Y-Shift waveform during beat $A_2$ (or its equivalent) and the 80th digit is therefore examined at the instant when the 40th digit is scanned in normal operation. During the obeying of such a "test" instruction the actual line of the Accumulator which is scanned during the beat following $A_2$ is actually immaterial.

The process whereby the two-line Accumulator may be used for the addition of long numbers will now be considered. Four numbers $b$, $c$, $d$ and $e$ to be added, each of, say, 120 digits are initially each stored upon three lines of the Main Store MS. Each number will thus be split into three portions (e.g. $b_1$, $b_2$, $b_3$ of which $b_1$ is the least significant) each of which is held upon a single 40-digit line. An instruction symbolised as $a+s$, A is used. This instruction implies that a 40-digit word from address $s$ in the Main Store MS is added, without extension to the content of the $A_l$ line of A, any carry digits which may occur being placed in the $A_m$ line. The programme for adding the numbers is thus as follows:

(0), A (This instruction erases the contents of both $A_l$ and $A_m$)

$a+b_1$, A    $a+d_1$, A
$a+c_1$, A    $a+e_1$, A

At this point the least significant part of the sum has been obtained and is stored on $A_l$, and carried digits being at the least significant end of the $A_m$ line of the Accumulator. It is now required to place the content of $A_l$ in a suitable location in the Main Store MS to clear $A_m$ and to put the carry content of $A_m$ on $A_l$ preparatory to the next steps of addition in which $b_2$, $c_2$, $d_2$ and $e_2$ are added to $a_l$ as before.

These three operations are conveniently performed by a composite instruction which is in reality three separate instructions which are capable of being executed together. This composite instruction which for convenience will be referred to as the $\theta$ instruction is symbolised by:

$a_l$, S; (0), $A_l$; Rev. A

The requirements of the $\theta$ instruction are achieved by interrupting the regenerative loop of Accumulator A (by an erasing wave applied to the writing portion) while $a_l$, the content of $A_l$, is being written into MS. This leaves $A_l$ clear with the carried digits remaining on $A_m$. At the end of this $A_2$ beat the temporal order of scanning of $a_l$ and $a_m$ is reversed so that for the next sequence of instructions what was originally the $A_l$ line becomes the $A_m$ line and vice versa. This process is called "permanent reversal" and is achieved by controlling the Accumulator Y-Shift generator by the $\theta$ instruction to produce the Y-Shift wave indicated in FIG. 15($c$). The $\theta$ instruction is such that reversal of the significance of the $A_m$ and $A_l$ lines always takes place on the occurrence of this instruction and thus any one line of the accumulator has no permanent $A_l$ or $A_m$ significance. The Rev. A facility may also be provided as a separate instruction for use when required during programming.

The complete programme of instructions required to add the four 120 digit numbers, $b$, $c$, $d$, $e$, thus becomes:

(0), A    $a+d_1$, A
$a+b_1$, A    $a+e_1$, A
$a+c_1$, A
$a_l$, S; (0), $A_l$; Rev. A
$a+b_2$, A    $a+d_2$, A
$a+c_2$, A    $a+e_2$, A
$a_l$, S; (0), $A_l$; Rev. A
$a+b_3$, A    $a+d_3$, A
$a+c_3$, A    $a+e_3$, A
$a_l$, S; (0), $A_l$; Rev. A and finally $a_l$, S (if a carry into the 4th block of 40 digits has occurred)

Obviously subtraction of numbers containing more than 40 digits could be carried out by a process similar to that described above for addition.

One generator arrangement for providing the different forms of Y-Shift waveform required for the tube 16 of the Accumulator A is shown at AYSG in FIG. 15 and comprises a gate circuit G10 which is normally open but which can be closed by a control voltage derived from a trigger circuit TC10. The gate G10 controls the passage of a differentiated version of either one or the other of the Halver waveforms as a triggering medium to a flip-flop square wave generator FF supplying the Y-deflecting plates of the tube. The particular one of the Halver waveforms to be effective upon generator FF is controlled by further gate circuits G11, G12 which are respectively in series with the two Halver waveform supply leads and are themselves controlled by voltages derived from opposite output terminals of a second trigger circuit TC11 so that when one gate is open the other gate is closed.

The second gate circuit TC11 is of the type requiring only a single triggering input to change it from one to the other of its alternative states and this triggering input is supplied through gate circuit G14 with the Prepulse waveform. This gate circuit G14 is controlled by voltages delivered from the Main Store staticisor MSTR so as to be normally closed but opened only when the staticisor is set with the particular $f$ digit combination which characterises an instruction requiring "permanent reversal."

The second trigger circuit TC10 has its triggering input derived by way of gate circuit G13 from the differentiated Halver-S waveform and is reset by the differentiated Halver-A waveform. The gate circuit G13 is arranged normally to be closed but can be opened by control voltages derived from the Main Store staticisor MSTR upon the presence in the latter of the particular $f$ digit combination which signifies an instruction requiring "temporary reversal."

The flip-flop generator FF is polarity-sensitive, i.e. it is triggered in one direction only by negative pulses and in the opposite direction only by positive pulses.

The operation is as follows. Normally both trigger circuits TC10, TC11 are quiescent and gate G10 permanently open with one or the other of the gates G11, G12 also open dependent upon the particular current condition of the trigger circuit TC11. If "temporary reversal" is ordered by an instruction word the gate G13 is opened and the trigger circuit TC10 is triggered by the next negative-going edge of the Halver-S waveform at the end of beat S2 to close the gate G10 and thus inhibit any further triggering of the generator FF so that the Y-Plate waveform on the tube 16 remains in the condition in which it existed during the previous beat. The trigger circuit TC10 will be reset by the similar negative-going edge of the Halver-A waveform at the end of beat $A_2$ so as to reopen the gate G10 and allow the continued supply of whatever one of the Halver-A or Halver-S waveforms was being supplied previously to the generator FF. Upon the ordering of "permanent reversal" by any instruction word, gate circuit G12 will be opened and will pass the next following prepulse at the end of beat $A_2$ which causes reversal of the trigger circuit TC11 to change over from one of the alternative Halver waveforms to the other. The gate G14 will be closed again before the next prepulse unless the next instruction word is also one requiring permanent reversal so that the operation continues with the generator FF triggered by the new Halver waveform instead of the previous version used.

A special application of this two-line Accumulator is its use to form, by a process of repeated addition of partial products, the 80 digit result of the multiplication together of two 40 digit numbers. Multiplying arrangements of this type are described in U.S.A. Patents Nos. 2,404,047 to L. E. Flory et al., filed Jan. 21, 1943; 2,409,689 to G. A. Morton et al., filed Nov. 2, 1942, and 2,335,215 to L. E. Flory, filed Oct. 21, 1943. The multipliers described in these specifications employ a two line accumulator embodying an adding circuit and the store and circuit arrangement which form the essential features of the multipliers feed to the adding circuit a time delayed version of one of the number words to be multiplied corresponding to each "1" digit in the other number word. These multiplier arrangements in the simple forms described take no account of the signs of the numbers to be multiplied. If it is desired to take sign into account in such multipliers, both number words the multiplier and the multiplicand are treated as 39 digit numbers, the 40th digits indicating whether the representation is a positive number of a complement in the manner previously described. Words which represent complements are then decomplemented in known manner before utilisation in the process of multiplication and the signs of both multiplier and multiplicand are recorded by a trigger circuit arrangement. If the signs are such that the product is required to be negative, the final condition of the trigger circuit arrangement causes the partial products to be fed to the two-line Accumulator through a subtracting circuit instead of the normal adding circuit so that the final product built up in the Accumulator is in complement form.

The manner in which a selected 40 digit word may be obtained from an 80 digit word existing in the Accumulator, or the result, for example, of a multiplication, by discarding of appropriate digits in the directions of greater and lesser significance will not be described. Obviously the whole 80-digit word may be preserved if desired by feeding the $a_l$ and $a_m$ words separately to the Main Store MS by means of the instructions $a_l$, S and $a_m$, S. The process of extracting a desired group of 40 digits first involves the utilisation of the two instructions $a_l$, S and $a_m$, S which place the words $a_l$ and $a_m$ on two lines in the Main Store MS. By the ordinary process of multiplication the number $a_l$ is then multiplied by an appropriate power $2(2^{40-x})$ so that all the desired digits $a_l$ are moved onto the $A_m$ line. The $\theta$ instruction is then brought into operation so that the desired group of digits are segregated at the least significant end of the new $A_l$ line. The original $a_m$ number is now brought out of store MS and multiplied by $2^{40-x}$ in the normal way so that at the end of the multiplication process the required group of 40 digits is isolated on one line of the Accumulator A and may be transferred to the store MS if desired.

In the same manner in which the two-line Accumulator enables long numbers to be added or subtracted, the process of multiplication may be carried out by the use of $s$, D and $s$, R instructions which cause number words from the Main Store MS to be fed in unextended form to the appropriate places in the multiplier storage addresses D and R for the multiplicand and multiplier. For example, to multiply together two 120-digit numbers $b_1b_2b_3$ and $c_1c_2c_3$, the partial products $c_1b_1$, $c_1b_2$, $c_1b_3$, $c_2b_1$, $c_2b_2$, $c_2b_3$, . . . are formed in turn and the final product is built up on five lines $S_0$–$S_5$ of the Main Store MS.

The programme of operations to perform this process for the two 120-digit numbers is as follows:

| | |
|---|---|
| (0), A | $b_1$, R |
| $c_1$, D | |
| $a_l$ $S_0$; (0), $A_l$; Rev. A ($\theta$) | |
| $b_2$, R | $a_l$, $S_3$, $\theta$ |
| $a_l$, $S_1$, $\theta$ | $c_3$, D |
| $b_3$, R | $b_1$, R |
| $a_l$, $S_2$, $\theta$ | $a+s_2$, A |
| $c_2$, D | $a_l$, $S_2$, $\theta$ |
| $b_1$, R | $b_2$, R |
| $a+s_1$, A | $a+s_3$, A |
| $a_l$, $S_1$, $\theta$ | $a_l$, $S_3$, $\theta$ |
| $b_2$, R | $b_3$, R |
| $a+s_2$, A | $a_l$, $S_4$, $\theta$ |
| $a_l$, $S_2$, $\theta$ | $a_l$, $S_5$ |
| $b_3$, R | |

which leaves the 240 digit product on the six lines $S_0$–$S_5$ of the Main Store.

In addition to the facilities available with the two-line accumulator which have been referred to above, a further type of instruction, symbolised as $a_m+s$, A, may be provided in a machine incorporating the two line Accumulator. This instruction results in the content of the line $A_m$ being altered by the addition (or subtraction) of an unextended 40-digit word without influencing the content of line $A_l$. To provide this facility a "temporary reversal" process as previously described is called into play so that the line $A_m$ is scanned during beat $A_2$ (or its equivalent); any carry digit existing at the end of the word $a_m$ is not recorded.

As already explained in connection with the first embodiment of FIGS. 1–8 provision is usually made for handling instruction words within the machine in the same manner that number words are handled, so that arithmetical operations may be performed upon instruction words during the course of the solution of a problem. This facility of modifying instruction words greatly improves the flexibility of such a machine and is of considerable assistance to the programmer when setting up a problem for the machine. The simplest way of providing this facility is to make use of a common storage system in which no distinction is made between numbers and instructions. Alteration of an instruction word then occurs by placing the word in the accumulator during one bar and, during the next or a subsequent bar feeding the modifying word to the accumulator. The process of alteration of instructions thus occupies 3 bars for every instruction word to be modified. By the further modification which will now be described with reference to FIGS. 17, 18 and 19, the operating time previously consumed in effecting modifications to instruction words, when such modifications are required, may largely be saved.

FIG. 17 illustrates in block schematic form the necessary modifications to the machine shown in FIGS. 1*a* and 1*b*.

The control unit CL of the machine is substantially identical with that of FIG. 1*a* and comprises a cathode ray tube 25 providing two storage lines P.I. and C.I. and having a regenerative loop comprising a reading unit 28 and writing unit 29 coupled through an adding unit 30 as before. During normal operation of the machine the second input to the control adding unit 30, other than the input provided by the output from the reading unit 28 is provided by the +1 or +2 signal from the unit TU fed in this instance through a gate 80 which is appropriately opened during $S_1$ beats. Under special circumstances, as already explained previously, the second input to the adding unit 30 may be provided alternatively during $A_2$ beats by the output from the Main Store MS through the Outward Transfer Gate OTG. The appropriate Y-Shift waveforms to secure scanning of the C.I. and P.I. lines during correct beats are applied to tube 25 from the unit GYWG.

As already described, by application of a suitable erasing waveform to the read unit 28, the word written into the control unit CL from the output of the adding unit 30 can ignore any existing content of the operative line in the tube 25, the regenerative process being inhibited. It will also be apparent that when the regenerative loop is inhibited, it is possible by feeding digital signals to the first input of the adding unit 30 from an alternative source to provide a second external input to the adding unit. It is this further input which is employed, in the present embodiment, to accept the modifying word from a further or "B" store during $A_2$ beats when new "present instruction" words are being written into the P.I. line of the control unit, the regenerative loop being inhibited during the process by application of an erasing waveform. This further or "B" tube store BS comprises a cathode ray tube 80 with a simple regenerative loop of read unit 81 and writing unit 82 having a read output, a writing input 82 having a read output, a writing input and also an erasing wave input. The write input to the "B" tube store BS is derived from the Main Store MS by way of the Outward Transfer Gate CTG and a further gate 83 so that numbers may be fed to the "B" tube store during $A_2$ beats by normal operation of the machine as already described. The read output from the "B" tube store BS may be fed to the second writing input of the adding unit 30 of the control unit CL by way of a gate 84 which must be arranged to pass the "B" number during $A_1$ beats when modification of the "present instruction" is required. Gate 84 may thus be opened during $A_1$ beats when modification is required by the combined action of versions of the Action waveform and Counter 0 waveform and the staticised voltages produced in the Main Store staticisor FST by a selected digit or digits in the instruction word which imply that the present instruction word is to be modified. In the practical case being described, as will become apparent, the requirements are simplified by providing the "B" tube with two storage lines so that one of two modifying words may be fed to the control unit CL during every $A_1$ beat, the gate 84 being opened during every $A_1$ beat by its control with versions of the Action and Counter 0 waveforms, and the choice of feeding no modifying word to the control unit CL during a particular $A_1$ beat being obtained by providing that the content of the address line which is operative in the "B" tube during that beat is zero.

If the computing machine is operated as described in the embodiment of FIGS. 10–12 with two instructions recorded per line in the Main Store MS and in the control unit CL, then the first or lowest significant digits which, in the control instruction words were previously referred to as "column" or "C" digits and which will hereinafter be called "*b*" digits select, by triggering of an $F_0$ staticisor which controls the form of the instruction gate waveform fed to the Instruction Gate IG of FIG. 17 the desired half of the complete (double instruction) word on the P.I. line of control unit CL which is read out during $A_1$ beats, can be readily employed to control which line of the "B" tube store is scanned during the relevant half of any $A_1$ beat.

The "B" tube store is therefore provided with two lines, $B_0$ and $B_1$ and a Y-shift generator 85 which causes line $B_0$ or $B_1$ to be scanned as desired during any particular interval. Two modifying numbers may thus be held in each separate line of the "B" tube, but as explained, for simplicity the two words held in line $B_0$ are generally both zero. Which half of the total content of either $B_0$ or $B_1$ is effective in modifying a present instruction will be determined by the instruction gate waveform controlled by the $F_0$ staticisor as explained previously in connection with FIGS. 10–12. The corresponding "*b*" digits in the instruction words held in the Main Store MS must be so allocated that line $B_0$ or $B_1$ of the "B" tube store is specified as relating to each instruction and it is therefore apparent that the "B" tube Y-Shift generator 85 must be controlled by the significance of a selected one of the two "*b*" digits in each "present instruction" word and that this selection will be performed by means of the $F_0$ statiscisor.

Words may be sent to the "B" tube store BS by normal operation of the machine obeying, during $A_2$ beats, instructions which may be referred to, using the nomenclature previously employed, as *s*, $B_0$ and *s*, $B_1$. In order that these instructions may be effected it is necessary that the erasing waveform applied to the "B" tube regenerative loop should inhibit regeneration during beat $A_2$, and that the gate 83 should be opened during beat $A_2$. These conditions may be readily obtained by utilising suitable versions of the Action waveform released in a manner analogous to that already described by an appropriate function digit combination of the main store staticisor, which are common to the *s*, $B_0$ and *s*, $B_1$ instruction words.

At this stage it is necessary to consider another feature of the circuit arrangement, which while not being essential, simplifies the operation of the machine As all instruction words will have "*b*" digits which have no significance so far as the interpretation of the instruction itself is concerned, the remaining digits of instruction words do not have the same significance in the machine (particularly in respect of any input or output operations of the machine) as ordinary number words. For example in the case of the previous embodiment of FIGS. 10–12 in which 40 digit words, with the 1st and 21st digits acting as "*b*" digits, are employed a combination of digits which defines an address as a number will be shifted one digit in the direction of high significance, so that an address number *n* will be specified by a combination of digits which, if it was part of a number word and not an instruction word, would have a significance 2*n*. When modifying numbers are originally loaded into the Main Store MS they can be most conveniently handled as numbers which have their true significance as part, for example of an address number, but before being used to modify instructions these numbers must be doubled or multiplied by 2. This process is most conveniently carried out by inserting a doubling circuit 86 in the write input connection to the "B" tube store BS. This doubling circuit may comprise a simple delaying device such as a delay-line circuit or any other suitable known form of delay circuit which provides a delay period equal to one digit period. It now remains to consider the requirements of the "B" tube Y-Shift generator 85. As writing into the "B" tube 80 (line $B_0$ or $B_1$) occurs during $A_2$ beats only and reading from either line of the "B" tube occurs during $A_1$ beats only, the intervening beats in the four-beat bar may be employed for normal regeneration purposes. This line $B_0$ may be scanned during beat $S_1$ and line $B_1$ during beat $S_2$. During beat $A_1$ reading must be able to occur from line $B_0$ or $B_1$ and during $A_2$ writing must also be possible into either line.

The Y-Shift waveform required to enable these conditions to be met are indicated upon a time scale of a four-beat bar in FIG. 18. FIG. 18(*a*) represents the Y-Shift wave in the quiescent condition when instruction modification is not being carried out; the $B_0$ line is scanned during all beats except $S_2$, when $B_1$ is scanned. This wave also represents the condition when the "*b*" digits of the instruction words (the two half instruction words) read out of the Main Store MS during beat $A_1$ are both "0's" signifying the modifying word to be used is on line $B_0$. The waves of FIGS. 18(*b*) and 18(*c*) represent the conditions when left-hand and right-hand instructions respectively are the present instructions and the "*b*" digit of the instruction is a "1" indicating that the corresponding half of the number on line $B_1$ is to be used to modify the instruction. The wave changes over from the $B_0$ to the $B_1$ condition at the back edge of the $P_0$ or $P_{20}$ pulses respectively which correspond to the "*b*" digits. The full-line waveforms of FIGS. 18(*d*) and 18(*e*) represent the Y-deflection conditions required for writing into the $B_0$ and $B_1$ lines respectively of the "B" tube during $A_2$ beats. The dotted portions of these waves indicate that during beat $A_1$ the waves may correspond to the forms shown in FIG. 18(*b*) or 18(*c*) as instruction modification may occur in the beat $A_1$ preceding the beat $A_2$ during which writing into the "B" tube occurs.

These waveforms may be generated in obvious fashion using the technique employed in the machines already described previously in this specification and in the prior specifications previously referred to.

A practical circuit arrangement which may be employed to generate the Y-Shift waveforms of FIG. 18 is indicated in FIG. 19. The Y-Shift waveform is derived from the suppressor grid of valve V30 in a trigger circuit V30, V31. Triggering and retriggering of this circuit are obtained by means of two trigger valves V32 and V33 which have the Inverse Counter 0 and Counter 0 waveforms fed to their suppressor grids respectively. The Inverse Counter 0 waveform is positive-going at the end of beat $S_1$ and negative going at the end of beat $S_2$, while the Counter 0 waveform is the reverse of this. The grid of valve V33 is connected to the output of the particular staticisor section which is set up by that digit e.g. ($2^{15}$) which distinguishes the *s*, $B_1$ instruction from the other types of operation. The staticisor output is positive except when the *s*, $B_1$ instruction is being obeyed and normally therefore the differentiated Counter 0 waveform retriggers the circuit of valves V30, V31 at the end of each $S_2$ beat. When instruction *s*, $B_1$ is operating the valve V33 is cut-off on its control grid and a retrigger pip therefore not generated until the end of beat $A_2$ when the Halver-S waveform which is applied to the control grid through diode D38 raises the control grid above cut off.

The Inverse Counter 0 waveform holds the triggering valve V30 turned on at its suppressor grid during beats $A_1$ and $S_2$ but the Halver waveform applied through diode D39 only raises the normally negatively-biased control grid of the valve above cut off during action beats. Triggering can thus only occur during beat $A_1$ and will occur when the Halver-S waveform goes negative at the end of beat $A_1$ unless the circuit has been triggered earlier. If the left-hand half of the instruction word emanating from the Outward Transfer Gate OTG is to be modified a "1" digit will occur in the $P_0$ position while modification of the right-hand instruction word will be specified by a "1" digit in the $P_{20}$ position. The word from the Outward Transfer Gate OTG is accordingly fed to an "and" gate of diodes D40, D41 which is controlled by an appropriate "1" digit pulse. The controlling pulse is obtained, by way of a buffer circuit of diodes D42, D43, D44 from one of the two "and" gates of diodes D45, D46 and valve V34 and diodes D47, D48 and valve V35 which are fed with the $P_0$- and $P_{20}$-pulses respectively as one controlling input and with the oppositely poled versions of the $F_0$ wave respectively as the second or coincidence input.

Numerous modifications of the various embodiments and features described will become apparent to those skilled in the art as will also the application of certain features to other forms of electronic computing machines. For example the invention is not limited to machines which operate exclusively in the binary code; with the aid of known forms of coding and decoding apparatus it may be adapted to operate in the normal decimal system. Similarly certain features are equally applicable to machines operating in the parallel mode instead of the series mode. While particular reference has been made to the use of cathode ray tube storage devices, certain features of the invention may clearly be employed with other forms of storage device, for instance electromagnetic storage arrangements or supersonic delay lines either instead of or in conjunction with the cathode ray tube devices as described. The initial insertion of data into the machine may be effected other than by means of a manually operated typewriter as described, for instance, a punched card system may be used while for extracting the final or intermediate results, visual apparatus such as a monitor cathode ray tube or tubes, or trigger-controlled lamp devices or a magnetic tape recorder may be provided.

Referring now to FIGS. 20 and 21, these show in greater detail the form of the pulse generator circuit PPG of FIG. 1*b*. The device essentially comprises a group of 40 separate trigger/gate circuits connected in a chain whereby only one gate circuit is open at any one time instant.

One trigger/gate circuit alone will first be described with reference to FIG. 20 from which it will be seen that it comprises a single pentode valve V100 having its cathode connected directly to earth, its anode connected by way of load resistors R100, R101 to source of positive potential +300 v., its suppressor grid connected to pulse input terminal *a*, its screen grid connected directly to reset pulse output terminal *c* and also through resistor R102 to source of positive potential +500 v. and its control grid by way of resistors R103 and R104 to a source of negative potential −15 v. The junction of resistors R100, R101 is coupled by way of capacitor C100 to pulse output terminal *b* while the anode is also connected directly to trigger pulse output terminal *f*. A capacitor C101 is connected directly between the control and screen grids of the valve while the control grid is also connected to the anode of diode D100 and the cathode of diode D101. The anode of the latter is connected to the junction of resistors R103, R104 and also by way of capacitor C102 to trigger pulse input terminal *d*. The cathode of diode D100 is joined by way of resistor R105 to a source of positive potential +5 v. and also through series-connected resistor R106 and capacitor C103 to reset pulse input terminal *e*.

The operation of the circuit is as follows: Valve V100 is normally cut-off at its control grid due to bias voltage of −15 v. through resistors R104, R103. Both anode and screen potentials are therefore high. The Dash pulse waveform, in its inverted or paraphase form, i.e. with positive-going pulses instead of negative-going, is applied continuously to terminal *a*. Whilst the valve is cut-off at its control grid these have no effect. If now, a negative-going pulse, immediately preceding in time, that of the particular Dash pulse which is to be selected, is applied to terminal *d*, then upon differentiation by capacitor C102 and resistor R104, its positive-going trailing edge will drive the control grid positively to turn the valve on. Current now flows to the screen grid and the screen potential falls and acts, in the well-known Miller fashion, to hold the control grid potential at a predetermined value where the valve is passing current. The suppressor grid is still, at this time, at the resting level of the applied (inverse) Dash waveform which is such that the valve is cut-off at its suppressor grid. Upon the arrival of the next pulse in the Dash waveform, the voltage at the suppressor grid is raised sufficiently to turn the valve on to its anode and a corresponding normal or negative-going Dash pulse is generated at the valve anode and is made available at the pulse output terminal *b*. At the time instant marking the end of this Dash pulse, a sharp negative-going pulse is applied to the reset input terminal *e* and, passing through capacitor C103, resistor R106 and diode D100 serves to drive the control grid of valve V100 negative whereby this valve is again cut-off and remains so until the arrival of the next trigger pulse at terminal *d*.

The requisite triggering pulses for application to terminal *d* and the resetting pulses for application to terminal *e* are made available in a manner more readily explained with reference to FIG. 21 which shows, in schematic form, an assemblage of trigger/gate circuits as already described to form the complete pulse generator PPG of FIG. 1*b*. As will be seen from this figure a total of 40 circuits P0, P1 . . . P39 are provided, all supplied at their terminals *a* with the inverted Dash waveform. The trigger input terminal *d* of the first stage P0 is supplied with the Blackout waveform (FIG. 2(*iv*)) whereby this stage is turned on by the positive-going leading edge of the Blackout pulse. In consequence the first or *p*0 pulse of the next series of Dash pulses appears at the pulse output terminal *b*. This output pulse, in addition to being available at terminal *b*, is also available at trigger pulse output terminal *f*, see FIG. 20, and its trailing positive-going edge provides the requisite trigger pulse for the next stage P1 by the interconnection of such terminal *f* with terminal *d* of the said next stage. In consequence this next stage is turned on from the end of such *p*0 Dash pulse in readiness to pass the next, *p*1, Dash pulse. The act of turning on stage P1 causes, as already explained in connection with FIG. 20, a sudden drop in the screen grid potential of the valve therein and this is available at reset pulse output terminal *c* which, by interconnection with terminal *e* of the preceding stage P0, causes the transmission of such negative-going voltage to the control grid of valve V100 of such stage P0 to turn the latter off as already described. Precisely similar conditions apply in all the remaining stages except the last, P39, where, in the absence of any source of resetting pulses from any subsequent stage, a phase-inverted version of the Blackout waveform is applied to terminal *e* of that stage to turn-off the valve V100 therein by its leading (negative-going) edge.

Each stage P0, P1 . . . P39 is thus turned on sequentially during the period of one Dash pulse only of each 40 pulse series whereby one selected pulse of the series is made available at its associated output terminal *b*.

A brief description of the reading and writing circuits of a typical cathode ray tube store will be given with reference to FIG. 22 in which 110 indicates an electrostatic cathode ray tube having the usual electrodes including a cathode 111, a modulating grid 112 and X and Y deflecting plates 113, 114 respectively. A signal pick-up plate 115 is located closely adjacent the tube screen and provides output signals representative of the various charge patterns formed on such screen as the tube beam sweeps thereover in the manner described in detail in the aforesaid paper by F. C. Williams and T. Kilburn. These signals are applied to an amplifier 116 and thence to a gate valve V110 which is normally held cut-off by reason of the resting level of the output waveform from the amplifier but which may be turned on, once during each digit period, by the positive-going Strobe pulses of FIG. 2(*vii*) fed thereto through terminal 117 and diode D110. The charge pattern on the screen of the tube which represents the binary value "0" provides a negative-going transient pulse at the output of amplifier 116 whereas the charge pattern representative of binary value "1" provides a positive-going transient at such amplifier output. In consequence, the valve V110 is turned on by the Strobe pulse only when a "1" digit signal is received thereat.

The anode output from valve V110 is fed by way of a network including clamping diodes D111, D112 and D113 to the control grid of a cathode follower valve V111 which control grid is also supplied with the Dash pulse waveform, FIG. 2(*vi*) by way of terminal 118 and diode D114. As the control grid of this valve will not move negatively unless both inputs applied thereto move negatively, the cathode output therefrom provides a reshaped, i.e. Dash pulse upon the read output lead 119 whenever a positive or "1" signal is received from the signal pick-up plate 115 but not otherwise. As already indicated, it is necessary in some circumstances to inhibit the passage of signals altogether through the valve. This may be effected by the application through terminal 119 of a suitable negative Erase voltage to the suppressor grid of valve V110 sufficient to cut the anode of that valve off. The components so far described in connection with valves V110 and V111 constitute the Read unit of the device such as already indicated schematically at 13, 19 and 28 in FIG. 1 with the lead 119 the source of read ouput signals from such unit.

The Write unit of the device is constituted by valves V112 and V113 and diodes D115, D116 and D117. Signals from the cathode of valve V111 of the Read unit are fed, in the example shown which constitutes a simple storage device equivalent to the Main Store MS of FIG. 1*b*, to the control grid of valve V112 which operates as an amplifier which is normally fully turned on but which is repeatedly cut-off during each digit period by the application of the Dot waveform, FIG. 2(*v*) through terminal 120 and diode D115. The anode output of this valve V112, in the form of positive-going square pulses, limited at +50 v. amplitude by diode D117 is then applied to a cathode follower valve V113 and the cathode output of the latter is fed by lead 121 to the modulating electrode 112 of the cathode ray tube 110 to modulate the tube beam.

In the absence of any output from valve V111, a series of Dot pulses are used to modulate the tube beam but whenever a "1" signal is supplied from the amplifier 116, such Dot pulses have Dash pulses from valve V111 superimposed thereon whereby the tube beam is modulated by a Dash instead of a Dot to record "1" instead of "0." This effects regeneration of the previously recorded signal.

Instead of utilizing the signal output from valve V111, i.e. the Read output from the read unit, to control valve V112, external pulse signals may be applied on the write input lead 122 through diode D116 to the control grid of valve V112. This lead 122 constitutes the write input already referred to in connection with the various Write units such as those of 14, 20 and 29 of FIG. 1.

As already stated, the example given is that of a simple storage device. Where, as in the Accumulator A or the control unit CL of FIG. 1*a*, it is desired to incorporate an arithmetical device, such as a subtractor or an adder in the regenerative loop, this is effected by breaking the connection between the cathode of valve V111 and the control grid of valve V112 and then connecting the read output lead 119 to one signal input of the arithmetical device and the write input lead 122 to the output of such arithmetical device, the other signal input of such arithmetical device receiving the external signal.

The scanning movement of the tube beam by the applied X time base and Y deflection waveforms will be clear from the description already given. When, as in the simple Accumulator A of FIG. 1*a*, only one storage line is used, then obviously deflection in the Y direction is not required.

When more than one storage tube is used it is necessary to effect regeneration of all tubes during scan beats but to suppress all but the desired single tube during the intervening action beats. This is effected by the provision of a so-called black-out valve V114 connected between the control grid of valve V113 and the earth line. When valve V114 is conducting, the control grid potential and hence the cathode potential of valve V113 is lowered to an extent which causes suppression of the associated cathode ray tube beam whereas when such valve V114 is cut-off, the valve V113 operates normally as already described.

Valve V114 is suppplied at its suppressor grid with the Halver-A waveform, FIG. 3(*xv*) by way of terminal 123 so that it, and all other similar black-out valves, are cut off during scan beats, while its control grid is connected by way of a plurality of separate leak resistances R110*a* . . . R110*g* and terminals 124 to appropriately selected output terminals of those sections of the staticisor LST which are concerned with the digits of the instruction word governing tube selection. It will be understood that, where several or many tubes are employed extra digits, say those of P5 . . . P10, of the instruction word are allocated to tube selection and the number of sections in the staticisor LST increased accordingly. Only when all of the separate leak resistances R110 are connected to a suitable negative potential simultaneously, will the valve V114 be cut-off and until this occurs the valve remains conducting during action beats whereby the associated cathode ray tube beam is suppressed. As each of the connection combinations for the respective black-out valves is different, only one valve V114 will be cut off at any one time and the associated tube rendered active.

The valve V114 and its associated leak resistances constitute what is known as a "coding valve" arrangement and a precisely similar arrangement is usable for gate control and like purposes. A potential change at the anode of the valve, suitable for controlling a gate device, is available only with one particular combination of input potentials.

We claim:

1. In an electronic digital computing machine comprising at least one storage device for storing number manifestations data to be employed in the solution of a problem, at least one arithmetical organ for performing operations with number manifestations fed thereto from said storage device and a control system including control signal generating means for controlling the operation of the machine and ordering the necessary transference of number manifestations and the arithmetical operations to be performed in accordance with each of a number of successively selected instruction word manifestations also stored within a storage device of said machine, the provision of a subsidiary storage device capable of storing at least one instruction modifier word manifestation and the arrangement in such manner that, in the normal operation of the machine, as each instruction word manifestation is read out of its normal storage location and is fed to said control signal generating means of said control system, it is passed through a modifying device whereby it may be modified by the simultaneous application to such modifying device of an instruction modifier word manifestation from said subsidiary storage device.

2. An electronic digital computing machine as claimed in claim 1 wherein said modifying device comprises an adding circuit arrangement.

3. An electronic digital computing machine as claimed in claim 1 in which said control system includes a cathode ray tube storage device for registering the instruction word manifestation selected for machine operation control and in which said modifying device is disposed in the regeneration loop circuit of said cathode ray tube storage device.

4. An electronic digital computing machine comprising at least one storage device for storing number manifestations to be employed in the solution of a problem, at least one arithmetical organ for performing operations upon numbers fed thereto from said storage device and a control system for controlling the operation of the machine and ordering the necessary transference of numbers and the arithmetical operations to be performed in accordance with each of a number of successively selected instruction word manifestations also stored within a storage device within said machine, which includes modifying means for altering the form of a selected instruction word manifestation, said modifying means being arranged in the path by which each instruction word is read out from its normal storage location and is fed to said control system whereby the form of the instruction word which actually becomes effective in said control system may be altered from that in which it is initially supplied from its storage location.

5. An electronic digital computing machine according to claim 4 which includes a subsidiary storage device for storing at least one instruction modifying word manifestation.

6. An electronic digital computing machine as claimed in claim 5 in which said modifying means comprises an arithmetical circuit arrangement having first and second input terminals and means for feeding said selected instruction word manifestation to said first input terminal and said instruction modifying word manifestation to said second input terminal, said modifying means having an output terminal connected to supply said control system.

7. An electronic digital computing machine as claimed in claim 5 in which said subsidiary storage device has capacity for storing a plurality of complete and separate instruction modifying word manifestations each at a separate and individually selectable address location.

8. An electronic digital computing machine according to claim 6 in which said subsidiary storage device comprises a cathode ray tube store.

9. An electronic digital computing machine as claimed in claim 8 in which said subsidiary storage device has capacity for storing a plurality of complete and separate instruction modifying word manifestations each at a separate and individually selectable address location.

10. An electronic digital computing machine as claimed in claim 7 in which said subsidiary storage device includes signal controlled address selecting means and signal examining means connected to receive said selected instruction word as it is read out from its normal storage location, said signal examining means operating to examine predetermined digits of said selected instruction word manifestation and to provide an output signal to control said address selecting means in accordance with the form of said examined digits.

11. An electronic digital computing machine as claimed in claim 4 in which said modifying means comprises an arithmetical circuit arrangement having first and second input terminals and means for feeding said selected instruction word manifestations to said first input terminal and another word manifestation to said second input terminal, said modifying means having an output terminal connected to supply said control system.

12. An electronic digital computing machine as claimed in claim 10 employing instruction words of coded number form similar to number words used in the machine in which said signal examining means operate to examine the digit element of said instruction word manifestation which corresponds to the digit of lowest numerical significance of an equivalent number word to determine the operative storage location of said subsidiary storage device.

13. An electronic digital computing machine as claimed in claim 12 in which the portion of said instruction word manifestation serving to define the particular storage address location in the data storage device of the machine which is to be rendered accessible during the operation cycle is in the form of a group of successive digit-representing elements the least significant of which is in a position which corresponds to the digit having the next higher significance than said lowest significant digit in an equivalent number word and which machine also includes multiplier means connected in the signal input path to said subsidiary storage device for altering the significance of the digit representing elements of an input instruction modifying word in accordance with such difference of digit significance between instruction word manifestations and number word manifestations.

14. In an electronic digital computing machine a control system for governing the form of machine operation in accordance with an applied instruction signal, a source of instruction signals, a source of instruction modifying signals, a signal modifying device having an instruction signal input connected to said source of instruction signals, a modifier signal input connected to said source of instruction modifying signals and a signal output connected to said control system and means for controlling the flow of instruction modifying signals from said source to said modifying means, said flow controlling means being controlled by signals provided by signal sensing means also supplied with said instruction signal.

15. An electronic digital computing machine comprising a main data storage device for recording both data word signals and instruction word signals, said storage device having a signal output, a second word storage device for registering instruction modifying word signals, a control system including staticisor means for developing static output control potentials in accordance with the individual value of different digit signals of an applied instruction word, means for examining the form of at least one predetermined digit of an instruction signal and a signal combining circuit having first and second input terminals and an output terminal, circuit means connecting the output of said main data storage device to said first input terminal, circuit means connecting the output of said second storage device to said second input terminal, circuit means connecting the output of said signal combining device to supply said staticisor devices of said control system and means for applying the output instruction word signal of said main data storage device to said sensing means to control the application of an instruction modifying word signal to said signal combining means in synchronism with an instruction word signal read out from said main data storage device under the control of said sensing means.

16. In a data processing system operable in a sequence of instruction cycles including means for cycling said machine through a series of such instruction cycles one cycle at a time, means for storing an instruction manifestation comprising one instruction portion and another instruction portion and means controllable during one said cycle by a portion of said instruction manifestation for selectively producing or not producing alteration of said instruction manifestation during said one cycle.

17. In a data processing system operable in a sequence of instruction cycles including means for cycling said machine through a series of such instruction cycles one cycle at a time, means for storing an instruction manifestation comprising one instruction portion and another instruction portion, means storing a modifying value, and means controllable during one such cycle by a portion of said instruction manifestation for selecting a modifying value and producing alteration of said instruction during said cycle.

18. In a data processing system, operable in a sequence of instruction cycles including means for cycling said machine through a series of such instruction cycles one cycle at a time, and including an instruction modifying element, means for storing an instruction manifestation comprising a one porton to initiate an instruction modification, means controllable during one cycle by said one portion for initiating an instruction modification operation and means controlled during said one cycle to feed said instruction manfestation to said instruction modifying element.

19. In a data processing system, operable in a sequence of instruction cycles including means for cycling said machine through a series of such instruction cycles one cycle at a time, and including means for storing value manifestations, means for modifying an instruction manifestation, means for storing an instruction manifestation comprising a one portion, and means controllable during one cycle by said one portion to select a value from said storing means and apply said value to said modifying means, and means operable during said one cycle to apply said instruction manifestation to said modifying means.

20. In a data processing system including address modification means, an instruction manifestation including an address portion, means controlling said system for individual instruction periods, means for storing value manifestations, connected to said address modification means, means for transferring an address portion manifestation to said modification means during one of said individual instruction periods, other means for transferring a value manifestation to said address modification means during said same instruction period, means for examining said instruction manifestation, and means controlled by said examining means to render said other transferring means operable whereby an address is modified.

21. In an address modification system, an instruction manifestation including an address portion, means storing value manifestations, each value at a different address, address modifying means connected to said storing means, means for selecting a value manifestation at a chosen address and for transmitting said value manifestation to said modifying means, means for examining said instruction manifestation and means controlled by said examining means for selectively permitting said selective and transmitting means to be operative or inoperative in accordance with the result of said examination.

22. In a data processing system, including means for controlling said processing and comprising an instruction manifestation storing means said instruction including an address portion, means controlling said system for individual instruction periods, address modification means for receiving said address portion, means operative during one such instruction period for transferring said address portion to said modification means prior to the utilization of said instruction for controlling said system, means for storing values, and means controlled by said instruction manifestation during said one instruction period for selectively transferring or not transferring one of said stored values to said manifestation means, prior to utilization of said instruction to control said system.

23. In a data processing system including an accumulator and instruction modification means, means storing a manifestation of an instruction having a one portion, means for testing said instruction manifestation and means controlled by said testing means for selectively transferring or not transferring said one portion to said instruction modifying means.

24. In a data processing system including address modification means, means storing an instruction manifestation including an address portion, means for storing value manifestations, first means connecting said last named storing means and said address modification means, second means connecting said instruction manifestation storing means and said address modification means, means examining said instruction manifestation and means controlled by said examining means to permit said first means to be operative or inoperative dependent upon the value of an examined portion.

25. In a data processing system including data processing control means controlled by an instruction manifestation, an instruction storing means for storing a manifestation of an instruction having a one portion, instruction modification means between said storing means and said control means, means for transmitting said instruction manifestation to said modifying means, means for examining said instruction and means controlled by said examining means to permit said modification means to be selectively operative or inoperative dependent upon the value of said instruction examined by said examining means, to modify said one portion of said instruction.

26. In a data processing machine operable in a sequence of instruction cycles including means for cycling said machine through a series of such instruction cycles one cycle at a time each under control of an individual instruction, means for storing an instruction manifestation comprising a one portion, means controlled by individual instruction manifestations for operating said machine during one cycle, means for modifying an instruction, and means controlled by said one portion for rendering said modifying means operative and means for applying the output of said modifying means to said instruction control operating means during said one cycle.

27. A device as in claim 26, and including an accumulator and means exclusive of said accumulator for modifying said instruction manifestation.

28. A device as in claim 27, and including a source of address modifier manifestations, and means controlled by said one portion for directing said modifier manifestation to said modifying means.

29. In a data processing machine operable in a sequence of instruction cycles including means for cycling said machine through a series of such instructions one cycle at a time, a value register, means for storing value manifestations in said register, means for storing an instruction manifestation comprising one portion defining an address and a portion defining a function, means including said value register and operative during one such cycle for altering the address of said instruction by the amount stored in said value register, and means controllable by said function portion during said one cycle for selectively initiating or not initiating alteration of said address dependent upon the value of said function portion.

30. In a data processing machine operable in a sequence of instruction cycles including means for cycling said machine through a series of such instruction cycles one cycle at a time and including a register, means for storing number manifestations in said register, means for storing an instruction manifestation comprising one portion identifying an instruction modifying operation and a portion comprising the portion to be modified, means controllable during one cycle by said one portion for selectively initiating or not initiating an instruction modifying operation, and means operative during said one cycle performing an arithmetical operation upon said portion to be modified and the number manifestation in said register, upon initiation of said instruction modifying operation.

31. In a data processing machine operable in a sequence of instruction cycles including means for cycling said machine through a series of such instruction cycles one cycle at a time, instruction modifying means having two inputs, means for storing an instruction modifier manifestation, means for storing an instruction manifestation including one portion for controlling an instruction modification and a portion to be modified, means controllable during one cycle by said one portion for routing said modifier manifestation to one of said two inputs and means routing the manifestation of said portion to be modified to the other of said two inputs of said modifying means.

32. In a data processing machine operable in a sequence of instruction cycles including means for cycling said machine through a series of such instruction cycles one cycle at a time, an instruction modifying element, means for storing an instruction modifier manifestation, means for storing an instruction manifestation including one portion controlling an instruction modification and another portion comprising that portion to be modified, and means controllable during one cycle by said one portion to control the routing of said modifier manifestation to said modifying element and means to control the routing of said other portion manifestation to said modifying element whereby said other portion is modified in said cycle.

33. In a data processing machine operable in a sequence of instruction cycles including means for cycling said machine through a series of such instruction cycles one cycle at a time, instruction modifying means having two inputs, means for storing an instruction modifier manifestation at selectable addresses, means for storing an instruction manifestation including a portion for controlling an instruction modification, a portion comprising the portion to be modified and a portion for determining the address from which a modifier will be selected, and means controllable during one cycle by said first named portion and by said address determining portion for selectively routing a modifier manifestation at a designated address, to one of the inputs of said modifying means, and said portion to be modified, to the other of said two inputs.

34. In a data processing machine operable in a sequence of instruction cycles including means for cycling said machine through a series of such instruction cycles one cycle at a time and including an addressable register, means for storing modifier number manifestations in said register at different addressable locations therein, means for storing an instruction manifestation comprising one portion identifying an instruction modifying operation, a portion comprising a portion to be modified and a portion designating the address in said register from which the modifier number manifestation is to be obtained, means controllable during one cycle by said one portion for selectively initiating or not initiating an instruction modifying operation, means operative during said one cycle for selecting a modifier number manifestation under the control of said address designating portion, and means operative during said one cycle to perform an arithmetic operation upon said portion manifestation to be modified and the number manifestation selected by said address designating portion.

35. In a data processing system including address modification means, an instruction manifestation including an address portion, means controlling said system for individual instruction periods, means for storing value manifestations, means for connecting said storing means to said address modification means, means for transferring said address portion manifestation to said modification means, means for examining said instruction manifestation, and means cooperating with said transferring means and controlled during a single instruction period by said examining means to render said connecting means operative to transfer a value manifestation to said address modifying means to modify an address manifestation during a single instruction period.

36. In a data processing system including data processing control means, instruction modification means, an instruction manifestation including a one portion, means for transmitting said one portion to said modification means, means for examining a portion of said instruction manifestation, and means controlled by said examining means to permit said modification means to be selectively operative or inoperative, said modifying means being in the path of the instruction manifestation to said data processing control means.

37. In a data processing system including data processing control means, instruction modification means, an instruction manifestation including a one portion, means for transmitting said one portion to said modification means, means for examining a portion of said instruction manifestation, means controlled by said examining means to render said modification means selectively operative or inoperative, and a source of value manifestations from which said modifying value manifestation is obtained.

38. A device as in claim 37, and including means for selecting one value manifestation from said source in accordance with the value of the examined portion.

39. A data processing system comprising an adder, an indexing register for storing manifestations of data therein, connected to said adder, a program register for storing a manifestation of an instruction, connected to said adder, said instruction having a portion comprising an indexing section, means for testing said indexing section for an indexing indication, means for directing the instruction manifestation through said adder and means controlled by said testing means for directing the manifestation of the data in said index register through said adder in synchronism with the instruction manifestation to thereby modify the instruction manifestation.

40. In a data processing system for selectively processing data stored at predetermined addresses under the control of instruction word manifestations specifying predetermined addresses, the combination of an adder, an instruction register for sequentially storing the manifestations of instruction words and connected to said adder, an auxiliary register for storing manifestations of data, connected to said adder, means for passing an instruction word manifestation through said adder, means for testing the manifestations of the instruction word for a data modifying indication, and means controllable by said testing means for selectively modifying an instruction word manifestation by the data manifestations in said index register, by passing a data manifestation through said adder simultaneously with the passing of said instruction word manifestation.

41. In a data processing system for performing arithmetic operations on data under the control of instruction words, the combination of an address modification means, means for storing data manifestations in said address modification means, instruction word manifestation storing means for storing an individual instruction word, said word including an address portion, means for examining said instruction word for a manifestation indicating an address-modify instruction, means controlled by said examining means for altering the data comprising the address portion of the instruction word manifestation by the value of the data in said address modifying means, and means utilizing the modified address manifestation for continued operation of said data processing system in accordance with said modified address.

42. In a digital computer operating from an internally stored program comprising information to be operated on and commands specifying the operation including input means for recording the program to be introduced directly into the computer and to be executed by same, said program comprising groups of sub-programs having a group of commands, each command specifying an operation to be performed by the computer and an address corresponding to a stored location of information upon which the operation is to be performed, means for storing the information and the commands to be executed at preselected storage locations, register means for receiving the program, means including said register means for receiving and selectively modifying the address portions of preselected commands comprising a sub-program, means for sensing the commands to actuate said modifying means when preselected commands are registered, and means for transferring the commands including the modified commands of a sub-program out of said modifying means whereby the program may be directly executed by the computer.

43. In a digital computer operating from an internally stored program comprising information to be operated on and commands specifying the operation and an address corresponding to the storage location of information upon which the operation is to be performed, means for internally storing a program to be executed by the computer, an input device for reading a program to be stored by said internal storage means, storing means associated with said computer for receiving the program from said input device, means coupled to one of said storing means for receiving and selectively modifying the address portions of the commands of said program, means for sensing the commands to actuate said modifying means when preselected commands are sensed, and means for receiving the program from said modifying means and transferring same.

44. In a digital computer operating from an internally stored program comprising information to be operated upon and commands specifying the operation, including input means for recording a program to be introduced directly into the computer and to be executed by same, said program comprising groups of sub-programs having a group of commands, each command specifying an operation to be performed by the computer and an address corresponding to a storage location of information upon which the operation is to be performed, register means for storing the information and the commands to be executed at a preselected storage location, register means receiving the program to be stored from said input means, means coupled to one of said register means for selectively modifying the address portion of preselected commands comprising a sub-program, another register means coupled to said modifying means for storing modifying digits to be applied to said modifying means, means for sensing the program as it is received by said one register means for actuating said modifying means when preselected commands are sensed, and means for receiving the program from said modifying means and transferring same to said one register means.

45. In a digital computer operating from an internally stored program as defined in claim 44 wherein said modifying means comprises an adder.

46. In a digital computer operating from a stored program comprising information to be operated upon and commands having address portions and another portion, specifying the operation, means for storing information manifestations and the manifestations of the commands to be executed at preselected storage locations, means for receiving and selectively modifying the address portions of command manifestations and including means for sensing said other portions of said command manifestations to actuate said modifying means.

47. In a digital computer operating from an internally stored program comprising information to be operated upon and commands specifying the operation, and an address corresponding to the storage location of information upon which the operation is to be performed, said commands including a portion to selectively indicate whether an address modification operation will or will not be performed, means for internally storing a program manifestation, means for receiving and selectively modifying the address portions of the commands and means for sensing the respective commands to actuate said modifying means when said commands are respectively sensed and a modifying indication is obtained.

48. In a digital computer operating from a stored program comprising information to be operated on and commands specifying the operation, each command specifying an operation to be performed by the computer and an address, means for storing information manifestations and manifestations of commands to be executed, at preselected storage locations, means for receiving and selectively modifying the address portions of command manifestations and means for actuating said receiving and modifying means under control of a command manifestation, said receiving and modifying means being located in the path traversed by said commands in moving from one situs of said command manifestation to another situs of said command manifestation.

References Cited in the file of this patent

UNITED STATES PATENTS

| | | |
|---|---|---|
| 2,604,262 | Phelps et al. | July 22, 1952 |
| 2,898,041 | Crawley et al. | Aug. 4, 1959 |

FOREIGN PATENTS

| | | |
|---|---|---|
| 734,073 | Great Britain | July 27, 1955 |
| 507,354 | Belgium | June 15, 1951 |
| 527,354 | Belgium | Apr. 15, 1954 |

OTHER REFERENCES

Lectures—"Theory and Techniques for Design of Electronic Digital Computers," vol. I, 1947, University of Pennsylvania, Moore School of Elec. Eng., Philadelphia, Pa., pages 10–1 to 10–26.